US010838920B2

(12) United States Patent
Carpentier et al.

(10) Patent No.: US 10,838,920 B2
(45) Date of Patent: Nov. 17, 2020

(54) PLUG-IN FUNCTION PLATFORM AND METHODS

(71) Applicant: Esoptra NV, Boechout (BE)

(72) Inventors: Paul Carpentier, Boechout (BE); Jan Van Riel, Geel (BE)

(73) Assignee: ESOPTRA NV, Boechout (BE)

( * ) Notice: Subject to any disclaimer, the term of this patent is extended or adjusted under 35 U.S.C. 154(b) by 492 days.

(21) Appl. No.: 15/675,193

(22) Filed: Aug. 11, 2017

(65) Prior Publication Data
US 2018/0322136 A1  Nov. 8, 2018

Related U.S. Application Data

(60) Provisional application No. 62/501,822, filed on May 5, 2017.

(51) Int. Cl.
| | |
|---|---|
| *G06F 9/445* | (2018.01) |
| *G06F 16/16* | (2019.01) |
| *G06F 9/451* | (2018.01) |
| *G06F 16/188* | (2019.01) |
| *G06F 9/455* | (2018.01) |
| G06F 3/0481 | (2013.01) |
| G06F 3/0484 | (2013.01) |
| H04L 29/08 | (2006.01) |
| H04L 29/06 | (2006.01) |

(52) U.S. Cl.
CPC ........ *G06F 16/168* (2019.01); *G06F 9/44526* (2013.01); *G06F 9/452* (2018.02); *G06F 9/45558* (2013.01); *G06F 16/188* (2019.01); *G06F 3/04817* (2013.01); *G06F 3/04842* (2013.01); *G06F 2009/45595* (2013.01); *H04L 67/02* (2013.01); *H04L 67/2842* (2013.01); *H04L 67/36* (2013.01); *H04L 67/42* (2013.01)

(58) Field of Classification Search
CPC combination set(s) only.
See application file for complete search history.

(56) References Cited

U.S. PATENT DOCUMENTS

| | | | |
|---|---|---|---|
| 6,356,863 B1 * | 3/2002 | Sayle | G06F 16/192 |
| | | | 703/27 |
| 2012/0143931 A1 * | 6/2012 | Rosenberger | G06F 16/14 |
| | | | 707/828 |

(Continued)

*Primary Examiner* — Hien L Duong
(74) *Attorney, Agent, or Firm* — Beyer Law Group LLP

(57) ABSTRACT

A server executes in a virtual machine and facilitates execution of lightweight plug-in functions that respond to user interface commands from a client device. The functions augment the commands with additional processing even though they may not implement a user interface, they generate data in real time, they access any data repository or data source, can be written in any programming language, and they perceive that they have infinite storage. The client device need not have custom software and implements a traditional file-folder user interface using standard applications. Folders and file contents displayed on the client device need not exist until specifically requested by the user. Plug-in functions have their own root file system but may share a network namespace. Data may be input to a function using a folder name or a micro Web server. Two functions share a database connection to a remote computer. Files stored in a local cache are moved to remote storage transparently when a function needs more space.

4 Claims, 29 Drawing Sheets

(56) References Cited

U.S. PATENT DOCUMENTS

| | | | |
|---|---|---|---|
| 2013/0326400 A1* | 12/2013 | Hosotsubo | G06F 3/0482 715/786 |
| 2016/0140447 A1* | 5/2016 | Cohen | G06N 5/02 706/52 |
| 2017/0060887 A1* | 3/2017 | Murphy | G06F 16/125 |
| 2018/0329607 A1* | 11/2018 | Han | G06F 3/04817 |

* cited by examiner

Creation of Root File System

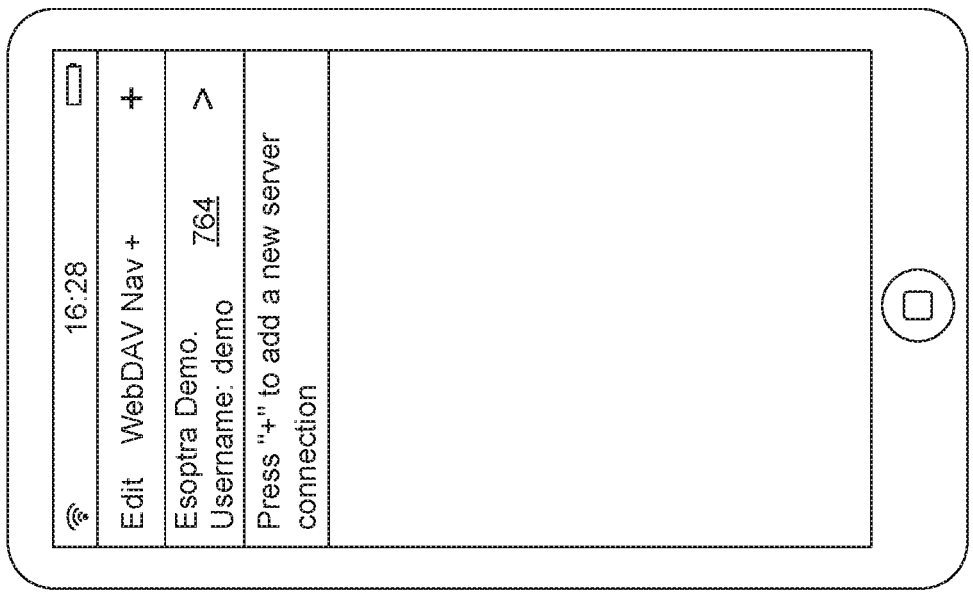
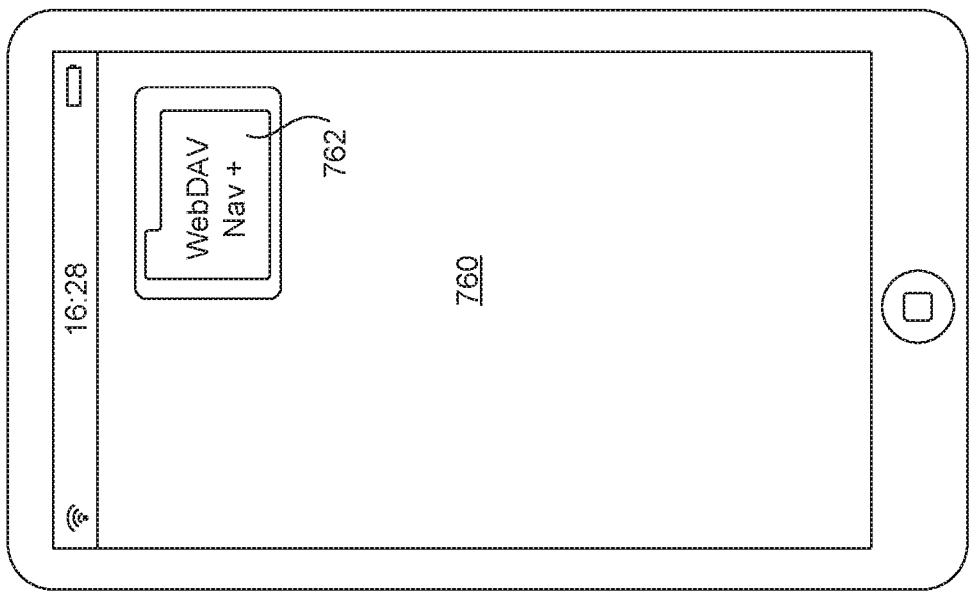

Caching Subsystem

Cache Object

Back-side Caching Architecture

PLUG-IN FUNCTION PLATFORM AND METHODS

This application claims priority of U.S. provisional patent application No. 62/501,822, filed on May 5, 2017, which is incorporated herein by reference in its entirety.

FIELD OF THE INVENTION

The present invention relates generally to development and execution of functions to manipulate data for end users or other programs. More specifically, the present invention relates to lightweight functions that augment a traditional user interface even though they may not implement a user interface, that generate data in real time, and that perceive that they have infinite storage.

BACKGROUND OF THE INVENTION

A wide variety of types of data repositories are currently in use such as traditional file systems on disk, object stores, and structured databases as well as other data sources such as Web services, etc. These data repositories may be located within corporate data centers, in cloud storage, on mobile devices, on computers within an enterprise, within legacy databases, on wearable devices, etc., basically, on any centralized or distributed storage location from where the data may be sourced. In addition, each of these repositories may have its own Web site and applications layered on top. A data source may also be the result of some processing such as document conversion. Additionally, a user may bring their own data for processing or storage.

Further, there are many data types used, different channels to access that data, different user devices, different network connections, and many technologies used such as Web, client-server, mobile Web, etc., not to mention the entire Internet of Things which is still being developed. There are also complications in providing the correct data in the right format to users caused by applications such as ERM, CRP, etc., (which are problematic when replicated or synchronized data is used that is stale or that may be too expensive to preemptively provision on a regular basis). Big data also introduces complications because of the sheer volume of data and the difficulty of bringing that information to users for human consumption.

In short, the world is drowning in more and more data, more places where it is stored, more ways to access it, and more ways to present it. Many companies attempt to transfer and replicate data to a central location in order to make that data accessible for their business practices, but, in general, these efforts cannot scale especially considering the number of user interfaces that may be required. As a consequence, the aggregated total cost of ownership is rising and an enterprise simply cannot afford to, or be able to, keep using current technologies in order to deal not only with greater quantities of data but also with greater diversity and number of repositories, each requiring their own user interface. In fact, it has been estimated that for a given custom application that presents back-end data to users, that the user interface and user experience may cost up to 90% or more of the entire project; not to mention that end users cannot comfortably master and use a large number of different user interfaces on a daily basis.

Accordingly, a new platform and methods are desirable to allow an end user to have simple and intuitive access to back-end data from one or more sources, or a mashup thereof, at minimal cost and with less development time.

SUMMARY OF THE INVENTION

To achieve the foregoing, and in accordance with the purpose of the present invention, a platform is disclosed that hosts lightweight plug-in functions that are able to retrieve data from, and store or transmit data to, a variety of storage locations or other API endpoints and that they themselves do not necessarily need to implement a user interface.

The platform makes use of existing user interfaces such as the well-known hierarchical file and folder presentation of a file system which is leveraged on the consumer (end-user) side while the generation of such files (content) and folders is driven by the quickly-developed custom plug-in functions on the server side. Thus, a form of virtualization of a file system using a programmable file server emerges.

The present invention overcomes the disadvantages mentioned above in different manners. For one, rather than preemptively downloading, storing, synchronizing, computing or combining data ahead of time, the data needed by the user for a particular application is simply left where it is in its original data repository and only retrieved or generated when needed, in real time. Simple, lightweight plug-in functions are used to retrieve that data, to write to it, to process it, or to combine it with other data, etc., and only when specifically required by the user. Such a plug-in function is not required to perform administrative or management functions such as authentication and authorization, allocation of resources, metrics, data storage management, network communications, etc. The plug-in function is narrowly focused on reading data from, or writing data to, the specific data repository or repositories needed for the user application at hand. The plug-in function may also process that data or combine it with other data in order to present the appropriate result to the user. A plug-in function can access any data repository or data source, and can process and combine the data in any way the developer desires.

In addition, in order to reduce costs and to allow for quicker development and implementation, the data is presented to the user in a standard format, rather than requiring the plug-in function to implement a user interface. In a specific embodiment, this format is the familiar hierarchical file system. It is realized that many business use cases are well served by simply representing the back-end data as folders and files using standard Web-based protocols. In other words, the user sees the familiar folders and files that he or she is accustomed to. These folders and files may be created on the fly, in real-time, as the plug-in function executes. The user views a hierarchical file system of structured information that may not exist as files and directories anywhere on a disk of a computer server, but rather is computed on the fly, in real time as needed, from any accessible data repository or data source.

The present invention is applicable to handling a wide variety of types of files such as medical images, photographs, videos, invoices, financial records, spreadsheets, presentations, database records, device output, big data, artificial intelligence, etc. The present invention is also applicable to a wide variety of business use cases in areas such as finance, insurance, industry, government, oil and gas, information technology, media & entertainment, engineering, CAD/CAM, etc.

In a first embodiment a method and system reads data on a client computing device using a plug-in function of a remote computer. The function executes and returns a list of contents to be displayed in a hierarchy of a user interface of the client device; the contents do not yet exist on any storage device.

In a second embodiment a method and system reads data on a client computing device using a plug-in function of a remote computer. The client device selects a file, the function executes and creates the file, and returns the contents of the file for display on the client device.

In a third embodiment a method and system writes a file from a client computing device into a folder using a plug-in function of a remote computer. The function executes and stores the file in storage, returns a file name for display in the folder on the client device, the function not implementing any user interface.

In a fourth embodiment a method and system execute two functions on a computer server, each function having its own root file system and the two functions sharing the same namespace. Layers of executable code are fetched and unpacked for each function, each function is executed, and each function retrieves data from a remote enterprise computer using the same network of a virtual machine.

In a fifth embodiment a method and system execute a plug-in function that does not execute any user interface on a remote user computing device. The plug-in function is called by a server process on a server computer and the function executes. The function creates a file and sends the file to the user computing device for display.

In a sixth embodiment a method and system read data on a client computing device by first receiving a command from the user to create a new folder having a folder name. A plug-in function executes in order to create the new folder and to display it on the computing device, and then uses the folder name as input in order to produce a result.

In a seventh embodiment a method and system write data from a client computing device by first receiving a command from the user to create a new folder having a folder name. The plug-in function executes in order to create a new folder and to display it on the computing device. If function also receives a digital object added to the folder by the user on a computing device and processes the digital object to produce a result.

In an eighth embodiment a method and system input metadata from a client computing device. First, a plug-in function executes on a remote computer in daemon mode and displays on the client device a user interface that includes a folder icon. The function sends a Web page for display on the computing device and it receives a metadata value input by the user. The function executes using the metadata value in order to produce a result.

In a ninth embodiment a method and system input metadata from a client computing device. First, a remote computer receives a command from the client device to create a new folder with a folder name A plug-in function executes and creates the folder with the folder name and returns the folder for display on the client device. A metadata value is assigned to the folder name and the function executes using the metadata value in order to produce a result.

In a tenth embodiment a method and system allow a client device to access a remote database via two plug-in functions. The first function opens a connection with a database. The client device requests access to the database using the second function. The second function accesses the database using the connection opened by the first function and response to the client device.

In an eleventh embodiment a method and system execute a plug-in function on a computer server in order to implement an additional step not included in a user interface command from a client device. The computer server receives a pathname and the user interface command from the client device. The plug-in function executes and implements the command as well as implementing the additional step and returns the result to the client device for display.

In a twelfth embodiment a method and system write a file from a plug-in function to local disk. A unique file name is created from the regular file name and the file is written to a user folder of a file system on the local disk using the unique file name in order to identify the file on the disk.

In a thirteenth embodiment a method and system manage space of a local disk by first determining whether to make more storage space available on the local disk. If so, then the file is selected to be removed from the local disk, the file is copied to remote storage and space is freed up on the local disk that has been used by the file.

BRIEF DESCRIPTION OF THE DRAWINGS

The invention, together with further advantages thereof, may best be understood by reference to the following description taken in conjunction with the accompanying drawings in which:

FIG. 10A illustrates an embodiment in which the end-user device is a mobile telephone.

FIG. 10B illustrates a list of servers that may be connected to on the screen.

DETAILED DESCRIPTION OF THE INVENTION

Figure 1:
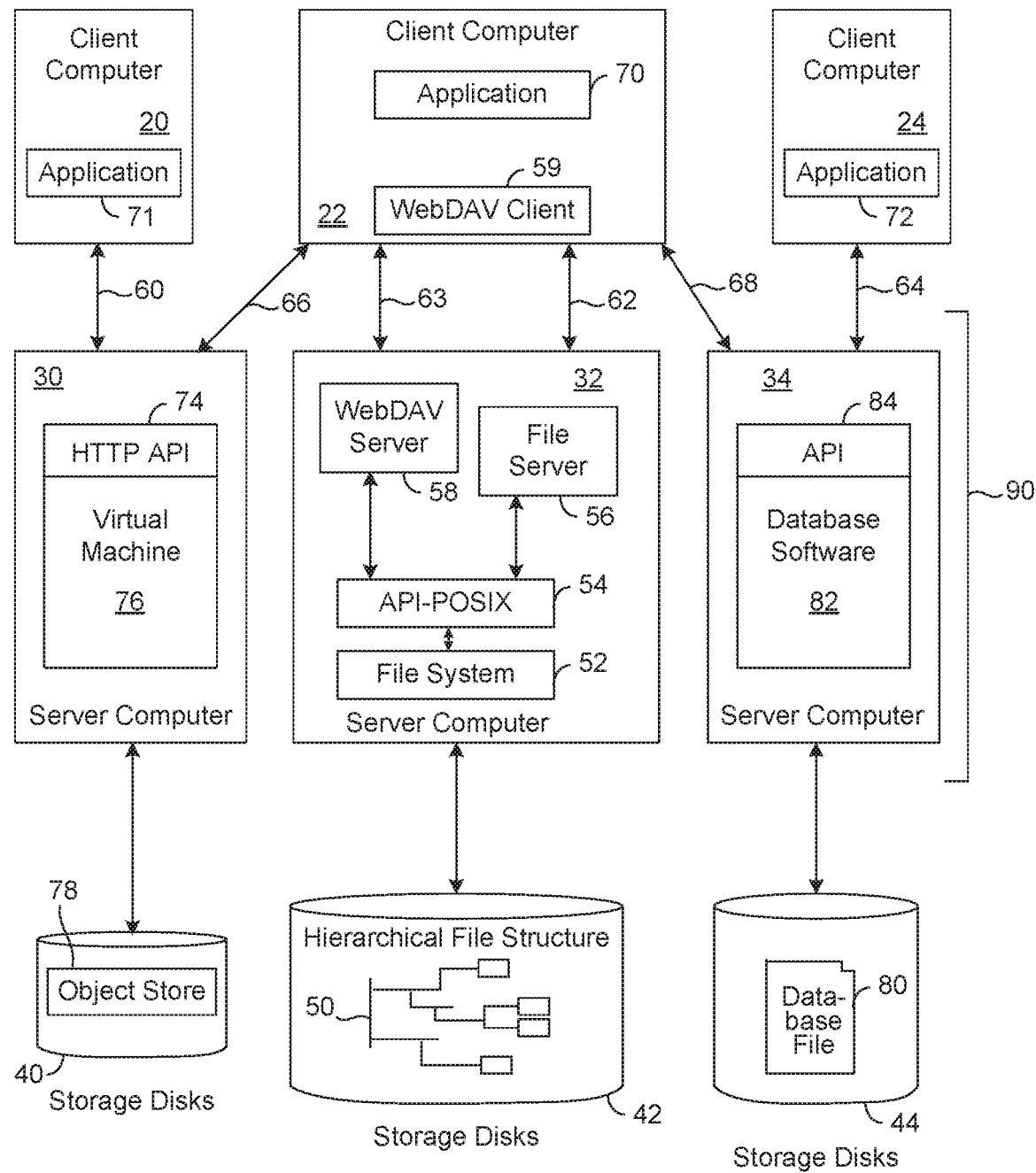
FIG. 1 illustrates an example of prior art system used by applications to access stored data.

FIG. 1 illustrates an example of prior art systems 10 used by applications to access stored data. Such systems include any number of client computers 20-24 that communicate with corresponding server computers 30-34. One example of a data storage technique uses a file server and a file system. Server computer 32 communicates with a physical disk or disks 42 on which is stored a hierarchical file structure 50 including the familiar folders and files. A file system 52 (typically running in the kernel) translates API calls from API 54 (such as POSIX) into requests for the folders and files stored on disk. File server software 56 then makes the file system available to applications running locally or running remotely on a client computer over a network. For example, a network communication protocol 62 such as NFS or SMB (clients not shown) may be used to communicate with client computer 22 upon which is executing an application 70 (such as browser). The end result is to make the file structure on disk 42 available to the application on the client machine as if the application were making its own API calls on the server computer.

In another example, a newer network protocol 63 such as WebDAV may be used for communication between the client and server computers. In this example, a WebDAV server 58 executes on the server computer and communicates using that protocol over a network with a corresponding WebDAV client 59 on the client computer. Again, the end result is to make available to an application on the client computer the file system and corresponding file structure on disk 42. The various calls from the client computer using for example NFS or WebDAV (such as get, put, etc.) are used to expose file structure 50 on the disk and the disadvantage is that the data is only available on disk in that format to the application 70.

Of course, as mentioned above, there may be many other types of data storage techniques that are used. Also shown is a client computer 20 communicating over a suitable network connection 60 with a server computer 30. This server computer may implement any number of virtual machines 76 each of which includes a suitable API 74, and communicating with a disk or disks 40 that implement an object store 78 (client not shown), used for storing digital objects each of which is identified by a UUID. Similarly, a suitable application 71 executing upon client computer 20 uses API 74 in order to expose the object storage on disk. Again, the various calls over a network connection 60 are used to expose the object storage on disk and the application is limited to that particular type of storage.

Another data storage technique uses a database. Client computer 24 communicates over a suitable network connection 64 to the server computer 34. This server computer includes a suitable API 84 for communicating with database software 82 that stores structured data in a database file 80 upon one or more disks 44. An application 72 executing on client computer 24 uses API 84 in order to expose the structured database file on disk. The calls over the network connection 64 expose that database file to the application on the client computer. Again, the application is limited to storing and retrieving data within the structured database.

As mentioned above, any application executing upon a client computer or other device must contend with a variety of different data storage techniques if it needs to retrieve data from, or write data to, different storage locations. In addition, the application programmer may also be responsible for writing software code (depending on the application) to handle authentication and authorization, allocation of resources (CPU time, disk storage, etc.), and above all, the user interface. In fact, it has been estimated that designing and implementing the user interface for a given application may cost upwards of 90% of the overall cost of developing an application.

One disadvantage of these existing systems is that they rely on a file and folder structure of which the layout (hierarchy) and content (file data) must be known and created upfront, prior to access. Typically, a file server is used for this purpose. This server is populated with files (actual content) and folders (actual layout) and thus some form of synchronization or replication of such files and folders is needed in order for the files and folders to be ready for viewing or other use ahead of time, entailing preemptive (batch) processing with scheduling, resource and cost consequences.

In cloud or mobile applications and in Web applications this problem is partially addressed whereby the content behind a URL may be dynamically generated, but this solution requires the creation of a client UI or Web UI application. This application is then limited to access by a human user. Applications (machine users) that may already know how to work with a file system cannot easily use such a Web UI interface, if at all.

A custom client application could be developed to overcome existing limitations or disadvantages. This frequently occurs, resulting in many costly client applications being written. The programmer must deal with all aspects of the system above and beyond storage and formats of backend repositories. This includes security, resource management, deployment, billing, etc., and not just with application data.

Thus, the major disadvantage of the existing solutions is one of complexity, cost and time-to-market, which is why many important albeit somewhat more tactical projects never begin. The gap between available data in back ends and consumable data in front ends is wide.

Thus, a custom application written for client computer 22 or other device can be extremely expensive (in terms of time and cost) to develop and implement. Not only must the custom application be written to communicate with different data storage locations (depending upon which data is required) using network communications 62, 63, 66, 68, it must also be written to provide a custom user interface to the user depending upon which device is being used, the nature of the application and data, and the needs of the user. Moreover, as mentioned above, the programmer may also need to implement management functions such as authentication, authorization, allocation of resources, etc. All of this means that developing a new application that may require data from different locations and may need a custom user interface will be expensive and time-consuming.

Custom server applications exists and are being developed, usually in the form of a Web server or REST API server. A REST API server is only useful when the client application is programmed to use the REST API. This is now mostly done by Web applications that come from the server and run in the browser. For browser applications, usually no application software is required to be installed on the client but then the solution is limited to use within the browser.

Accordingly, new techniques are desired to make it easier, faster and less expensive for an application programmer to develop an application that may need to read and write data in order to present information to an end user. Our novel system solves the intermediary problem leaving the developer to only worry about data access from the server side which dramatically lowers the barrier. This allows for more opportunistic and tactical solutions to get to market quickly, but still in a managed way on the server.

System Overview

It is realized that the network communication protocols 60-68 are sending standard HTTP calls (such as get, put, etc.) over a network to a file server, and are receiving standard HTTP responses. It is further realized that a novel system may be inserted in between the client computer and the data repositories, intercepting these HTTP calls in order to provide distinct advantages.

Figure 2:
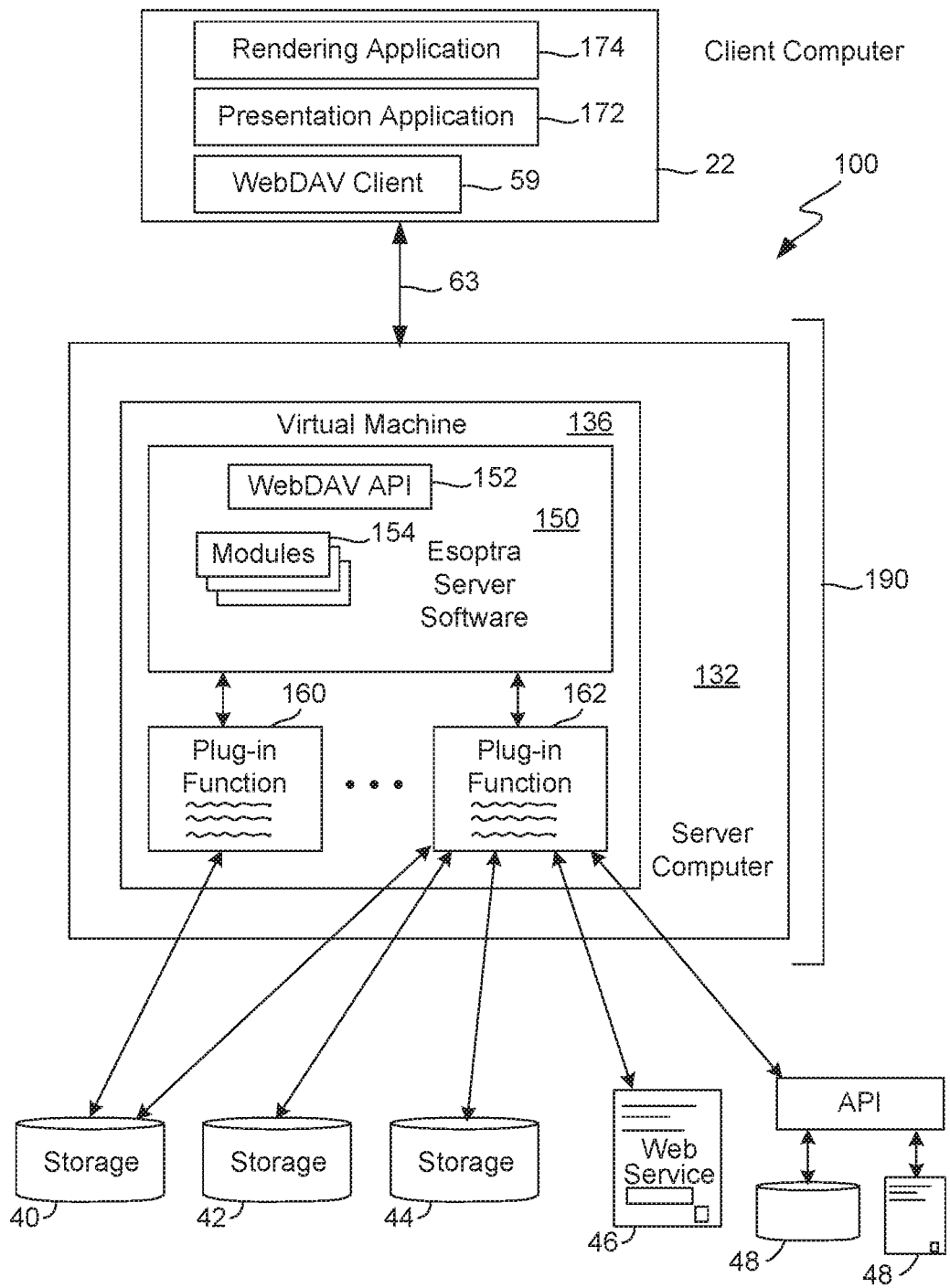
FIG. 2 illustrates the novel system that overcomes disadvantages of the prior art system shown in FIG. 1.

FIG. 2 illustrates the novel system 100 that overcomes disadvantages of the prior art system shown in FIG. 1. For one, all of the hardware and software shown in region 90 of FIG. 1 is replaced by the more simplistic hardware shown in region 190 of FIG. 2. In addition, there is no custom software needed or installed on any of the client computers or devices; all that is needed is standard application software to implement a presentation layer, such as WebDAV client or an Internet browser. The user interface is fixed in that a well-known hierarchical structure is used, i.e., the traditional folders and files. And, the application developer need not concern himself or herself with administrative or management functions such as authentication, authorization, allocation of resources, etc. Importantly, from an enterprise standpoint, the data in storage locations 40-48 (or other data repositories or data sources) may simply remain there "at rest." There is no need to move the data from its original storage location to a central location in order to facilitate application programming. Of course, regular backups of that data may be made, but the data need not be moved in order to facilitate any application programming.

Client computer 22 includes WebDAV client 59 (included with most operating systems) presentation application 172 and rendering application 174. Advantageously, the user interface is fixed and standard. Presentation application 172 may be any standard application executing on the client computer in which folders and files are presented or displayed. For example, application 172 may be a generic browser (e.g., Explorer, Firefox, Safari) that displays folders and files. Or, in the embodiment in which the plug-in function appears as a folder inside of a mounted drive icon on the client computer, the WebDAV client 59 may be used. On mobile devices using the iOS or Android operating system, many third-party WebDAV browser applications are available. In addition, a custom application may be written that uses a REST API to communicate with server 150 and to display the folders and files, although it is not necessary to write a custom application. In general, any application 172 that uses an HTTP-based protocol will be suitable.

Rendering application 174 may be any standard application executing on the client computer able to display data. For example, once a plug-in function is executed and a user views a file in a folder using the presentation application, the rendering application may be used to open and view the contents of that file. By way of example, applications such as PDF Reader, Vizable or Excel may be used. The application may be opened before opening the file, or, double clicking on the file may cause the application to be opened.

Shown in FIG. 2 is a server computer 132 upon which is executing virtual machine 136. Executing within the virtual machine is server software 150 which includes a WebDAV API 152 for use in communicating with WebDAV client 59 on a client computer 22. Of course, other network communication protocols may be used for communication between the client computer and the server computer; for example, if the protocol is NFS, and the client computer includes an NFS client, then server 150 will include an API for an NFS file server. Preferably, an HTTP-based communication protocol is used. In a specific embodiment, WebDAV API 152 is not necessarily a WebDAV server, but is an API designed to make the corresponding client (in this case, WebDAV client 70) believe that it is talking to a WebDAV server. As will be explained in detail below, WebDAV API 152 exposes all of the data repositories 40-48 below to the client computer and not just to a single data repository.

Also included within server 150 are a number of software modules that perform the functionality described herein and shown in the below flow diagrams. In general, server 150 moves data back and forth between the client computer and data repositories, provides administrative and management functionality, deploys and invokes the plug-in functions shown and described below, and provides an optimal environment in which the plug-in functions can execute.

Any number of plug-in functions 160-162 may be loaded into the virtual machine, deployed and invoked by server 150, and will execute in order to provide any functionality required by an enterprise or end user, such as writing data to, or reading data from, any data repository, combining data, performing a search function, etc. A plug-in function is "plug-in" software in the sense that it is not compiled along with server software 150; it is meant to be "plugged in" at a later time to perform a specific function. While server 150 is meant to be provided by a single entity (for example, Esoptra NV) in order to support the deployment of the plug-in functions, each plug-in function may have a different purpose from any other plug-in function and each may be written by a different entity. While the plug-in function is invoked from server 150, it is not compiled into that server and is a separate process.

In general, a plug-in function may manipulate the data it retrieves and deliver to a user of the computing device that data in any form so that any standard rendering application on the user's device can display that data. For instance, if it is known that end users prefer the Vizable application, and that application is available on an end user device, then the plug-in function is programmed to create a file for the end user in a CSV format (one format preferred by the Vizable application).

As shown, each plug-in function may communicate with any of the data repositories and data sources 40-44 mentioned earlier (using suitable protocols) such as object stores, file services, file servers, databases, remote Web services, etc. A plug-in function may choose to communicate with only a single repository (as in the case of function 160), or, a function may communicate with any number of repositories (as in the case of function 162). It is also possible that a plug-in function may simply perform a processing function and will not communicate with a data repository or that the data to be processed is delivered by the user (e.g., see Photo example below). Indeed, it is the developer of the plug-in function who dictates what computations the plug-in function shall perform in order to perform a specific task. The developer also determines which data repositories to access, and which protocols are used to access those repositories. Thus, a plug-in function is not locked into only using one specific type of data repository (such as a file server). In fact, a plug-in function may be written in any suitable programming language that is capable of executing upon the virtual machine such as C, C++, C#, Java, Python, JavaScript, Go, Rust, Bash, etc.

Other examples of data sources that may be accessed by a plug-in function include any Web service 46, other remotely-accessible database or process 48, real time channels, AI engines, big data stores and data warehouses (which are a combination of storage and processing), IoT sensor networks, etc. An example of a Web service is a service or function provided by Google, Inc. in which a plug-in function provides a particular set of data, the service manipulates, transforms, performs a search, etc., and then returns the resulting data to the plug-in function. In addition, using any suitable API, a plug-in function may access non-standard databases 48 such as legacy databases or a variety of remote processes 48.

By using the above system, the developer of a plug-in function need only concern himself or herself with accessing the desired data, performing computations or combinations with that data, and need not be concerned with administrative functions nor with implementation of a user interface. As mentioned earlier, a standard hierarchical file system user interface is being presented to the user, meaning that the developer of the plug-in function need not perform any user interface design or implementation. As shown in FIG. 2, client computer 22 includes WebDAV client 59 and presentation application 172 such as a browser. Client 59 sends standard HTTP calls (such as get, put, etc.) to the WebDAV API 152 and in return receives standard HTTP responses.

The browser then displays the folders and files of the hierarchical file system (as will be described below), and a particular file may be viewed using any standard software application such as a PDF reader, Excel, Picture Viewer, Vizable, Word, Power Point, QuickTime, etc. Displaying the folders and files on the client computer may be automatic, depending upon the operating system. On a desktop computer executing Window 10, for example, the built-in WebDAV client performs the display, but the user only sees Windows File Explorer. On an Apple operating system an explicit mounted disk performs the display. On a mobile operating system such as iOS there are specialized operating system components that use WebDAV under the covers that allow one to upload or download, for example. Display may not always be automatic based on the HTTP response, but in some environments (operating system, browser) some defaults will apply. Microsoft "Office" applications are well integrated with the Windows operating system and allow for additional features such as single sign-on authentication based on the HTTP response.

Notably, there is no custom software required on the client computer or on any end-user device in order to access and view the information provided by a particular plug-in function. In order to provide an end-user application, a developer simply writes a plug-in function, it is executed within server 150, and the results of that execution will be displayed to the end user on a client computer in a file system hierarchy. Although this fixed user interface is described as the traditional folders and files metaphor, other forms of a fixed user interface may also be used such as dynamic graph-based browsers of hierarchical structures (colored balls or rectangles of varying sizes interconnected by straight or curved lines).

Figure 3:
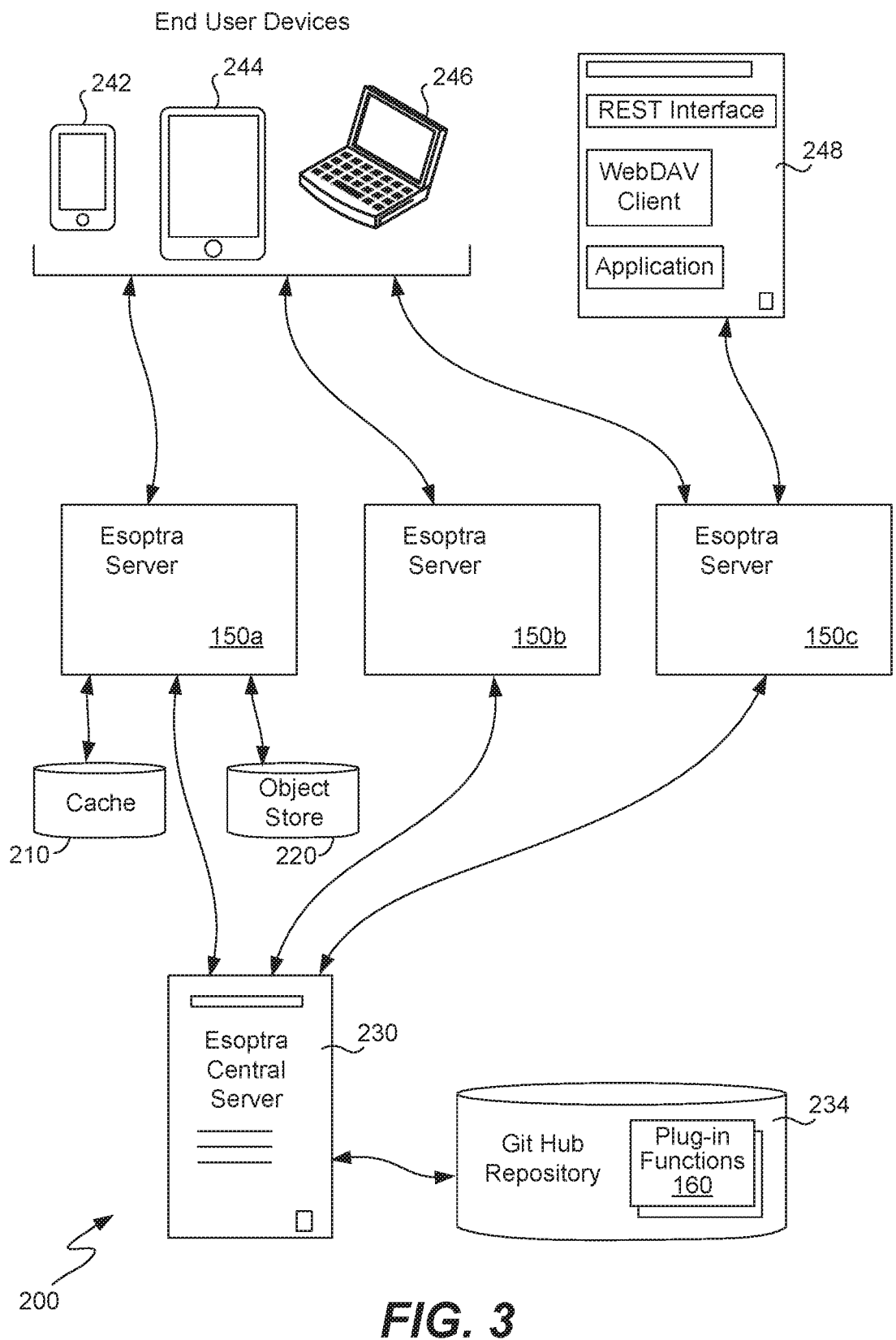
FIG. 3 illustrates a higher level view of one possible implementation of the system.

FIG. 3 illustrates a higher level view 200 of one possible implementation of the system 100. Any number of servers 150*a*, 150*b*, 150*c* each execute on a dedicated host computer or within a virtual machine on a computer server within, for example, a cloud computing platform, a data center within an enterprise, or perhaps within specific platforms such as Amazon Web Services, Azure, VMware, etc. As mentioned earlier, and as will be described in greater detail below, server 150*a* is compiled software available from Esoptra NV that facilitates execution of the plug-in functions and assists with communication between a variety of data repositories and end-user devices. In one specific embodiment, server 150*a* is a statically compiled binary executable for use on Linux X86_64 systems with kernel version 3.16 or higher; it is written in the Go programming language and executes on the Debian 8.2 operating system. The server assumes ownership of host networking, creates its own routing table, replaces firewall rules, creates virtual Ethernet adapters, a Linux bridge and multiple internal networks, one per share. Also, the server is compiled before execution but the compiled code does not include any plug-in functions.

While it is contemplated that plug-in functions will typically read from or write to a proprietary database of an enterprise, it is also possible that a plug-in function will simply need to write data to its own, dedicated storage location for future use. With that in mind, also provided is a cache 210 and an object store 220 to which the plug-in function may write data and from which it may read data. Access is provided by modules of server 150*a* and may be implemented in various manners. Cache 210 is made available to any plug-in function executing on that virtual machine in association with server 150*a* to provide rapid, temporary storage. Typically, the cache will be local, physical drives that are directly connected to the computer server on which the virtual machine runs.

Object store 220 is remote storage that is typically provided to the plug-in function over a network connection, although it may be located within the same service as server 150*a* (e.g., both server 150*a* and object store 220 are hosted within AWS). The object store is provided so that the plug-in function may store data into long-term storage when the user or enterprise is agnostic about where that data is stored (e.g., storage of photographs for later search and retrieval). Examples of suitable object stores include SWARM from Caringo, Inc., Amazon Web Services S3, Microsoft Azure Blob Storage, etc.

Executing upon a virtual machine in another server computer is central server software 230 that provides additional services for any of servers 150. For example, this server may provide a Web interface to a plug-in function "store" that allows users and enterprises to search for suitable plug-in functions, download them to one of servers 150 and then execute them. Accordingly, a repository 234, such as a GitHub repository, stores the source code and executable binary code for plug-in functions. From this repository, a plug-in function may be selected and then transferred to one of the servers 150 for execution. Again, a plug-in function may be written in any suitable programming language capable of execution or interpretation on one of the virtual machines in which server 150 is hosted. As a plug-in function is executed in its own isolated environments, if it were to be populated with a runtime for an interpreted language (e.g., bash or JavaScript) then it is feasible for this code to be interpreted instead of compiled and executed.

In addition to the plug-in function "store," central server 230 also provides a usage metering service which allows the central server to keep track of which entity is using a plug-in function, how often and for how long (using CPU cycles, network bandwidth, persistent storage capacity, I/O transactions etc.), reporting on usage, and sending invoices to users and enterprises.

Via the WebDAV interface described, each of servers 150 is in communication with any of a variety of end-user computing devices 242-246. For example, a mobile telephone 242, a tablet computer 244, or a laptop or desktop computer 246 each may be used to view the file system hierarchy presented by the plug-in function, in addition to opening such folders, closing folders, opening files and folders, creating new folders with new names, moving files between folders, etc., in general, all of the traditional interactions available to a user in a file system hierarchy.

In addition to receiving commands from, and displaying information to, an individual using a client device, a plug-in function may also be in communication with an application of a server computer 248 using an HTTP-based protocol such as a REST interface or a SOAP (Web service) interface. As shown in FIG. 3, a plug-in function via server 150c may be in communication with any suitable application or Web site executing upon a server computer 248 instead of (or in addition to) communicating directly with and providing data to a computing device for display to a user. In this embodiment, as will be explained in greater detail below, server 150c also provides a REST API so that any software application (as opposed to an individual) may send requests to a plug-in function. For example, a Web site executing upon an enterprise computer server may need to access specific data, and in order to do so, a software program implementing that Web site may send requests to, and receive responses from, a plug-in function executing in conjunction with server 150c using a REST API of that server.

Esoptra Server

Figure 4:
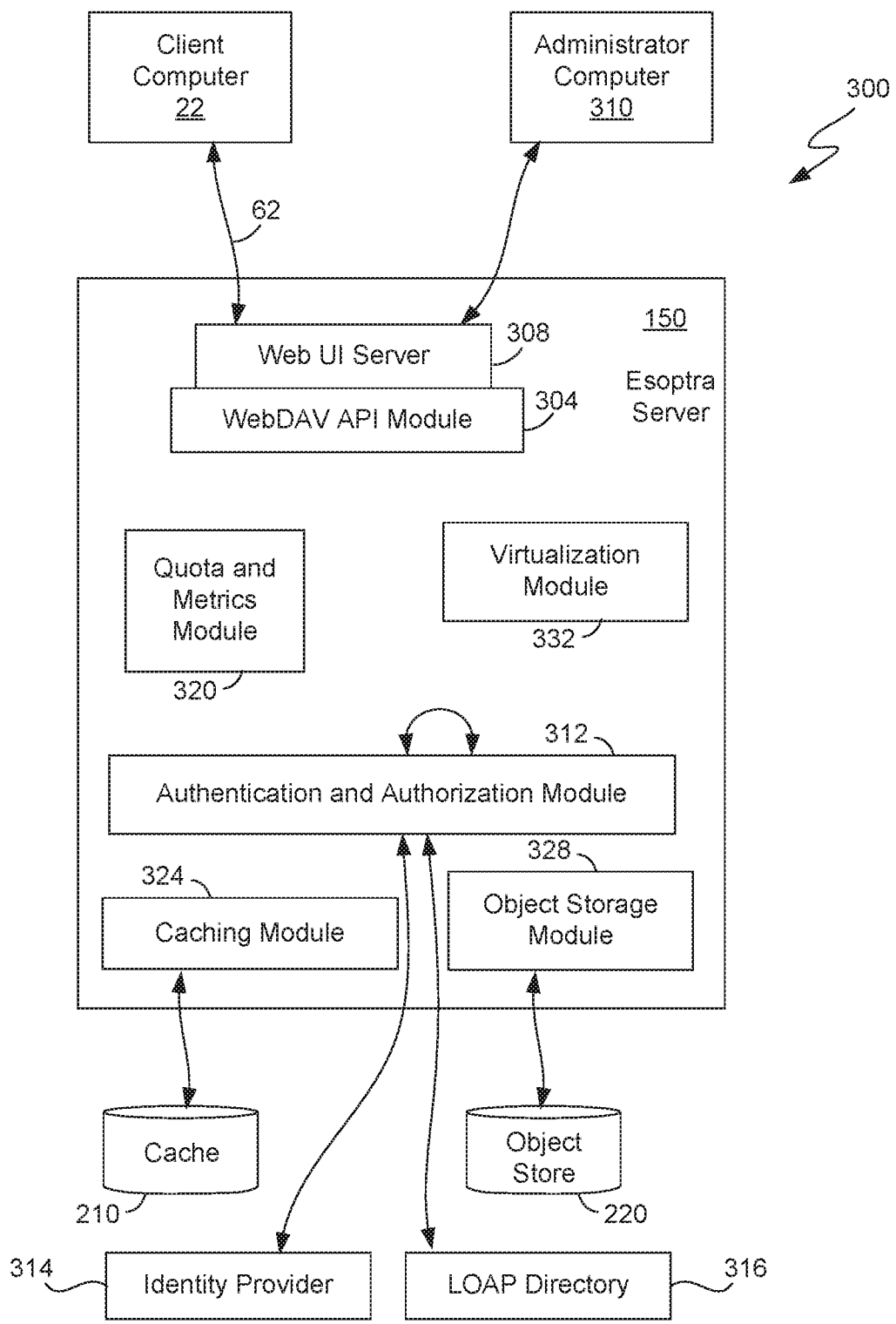
FIG. 4 is a block diagram showing in greater detail the software modules of a server.

FIG. 4 is a block diagram 300 showing in greater detail the software modules of a server 150. As mentioned earlier, server 150 handles as much administrative, management and security functionality as possible so that the writer of a plug-in function need only be concerned with the data he or she needs to manipulate and will be able to write the plug-in function more quickly and at lesser expense. And, as explained earlier, the plug-in function need not implement a user interface because a standard, fixed user interface is provided on the client computer by a standard presentation application. Server 150, then, provides functionality that is independent of the purpose of any plug-in function, and that functionality may be used by any plug-in function executing on the virtual machine.

A WebDAV module 304 provides an API for communicating with a WebDAV client 59 of any client computer and appears to the client computer as if it were an actual WebDAV server. As with any WebDAV server, module 304 listens for requests over HTTP and also sends responses over communications 62. Module 304 thus provides a data path from the client computer to a plug-in function. The WebDAV protocol provides the file system hierarchy, e.g., the WebDAV client sends requests for file and folder information contained in some parent folder and then displays files and folders of a response.

Although WebDAV is the preferred protocol and is able to provide a presentation application with a file system hierarchy for display, other protocols may also be used. By way of example, one may implement an NFS protocol (or similar) which is not HTTP based, or a proprietary protocol for specific performance or functionality reasons. Or, the One Drive service available from Microsoft Corporation may be used, as well as other services and protocol such as Google Drive, DropBox and many similar services. In general, any suitable technology and protocol may be used that allows the presentation application to present a fixed user interface to the user regardless of which plug-in function is executing.

Provided in a layer on top of module 304 is a Web server user interface module 308 that provides the data path between the client computer and a plug-in function, thus providing a view of the data for a user. Module 308 communicates with a presentation application such as a browser on the client computer and also communicates with a browser of an administrator computer 310. The administrator uses an application such as a CLI utility with a REST API to communicate with module 308. Also included within module 304 is a server-side REST API that provides the control path for the administrator on a dedicated port. This API includes typical commands such as "start-up share," "shutdown plug-in function," "create user," etc.

An authentication and authorization module 312 handles the authentication of any user logging in from a client device and also the authorization of that user with regard to which plug-in functions he or she may use. This module may use the services of an identity provider 314 (such as OpenID Connect, OAuth2 Passwords, Active Directory, Google, Facebook, etc.) to authenticate a user, and may use a corporate LDAP directory 316 to authorize a particular user. This module may include its own authentication and authorization software instead of relying upon outside services.

The central object for module 312 is a group. Users may be made members of a group and plug-in functions are associated with a group (as decided by an administrator), thus, via the group, users gain access to a particular function. The server has a built-in facility (REST API and Web UI) for user and group management per share. Each function assumes that all requests are properly authenticated and authorized, as this functionality is handled by module 312, not by the function. More sophisticated authentication and authorization based on identity providers (decided by the administrator) may be configured in the server. In the case of Active Directory it may be the Active Directory administrator who decides which user has access to which group and thus which function. The collection of functions visible to any one user is the superposition (i.e., the union) of all of the function sets associated with the groups of which that user is a member. Thus, each plug-in function need not be concerned with nor needs to implement any authentication or authorization of a user, providing easy scalability for any number of users.

A quota and metrics module 320 provides for allocation of resources and for measuring those resources used. For example, it allocates resources such as CPU, memory, storage and bandwidth between the plug-in functions executing upon this virtual machine and it also measures which particular individual or enterprise is using these resources and plug-in functions. A tenant-share technique for grouping plug-in functions and assigning them to particular users is described below.

An object storage module 328 communicates over a network with object store 220 and allows a plug-in function to store digital objects into long-term storage, handling all of the management aspects of that storage so that the plug-in function need not be concerned with management of that storage. The caching module 324 communicates over a local network with cache 210 and allows the plug-in function to store files using a file system into short-term storage, handling all of the management aspects of that storage so that the plug-in function needs not be concerned with management of that storage.

Virtualization module 332 uses features of the Linux kernel to provide isolation to each plug-in function so that the plug-in function does not have any dependencies and will not be in conflict with other plug-in functions running on the virtual machine, as is described in greater detail below.

Plug-in Function Hierarchies and Virtualization

Figure 5:
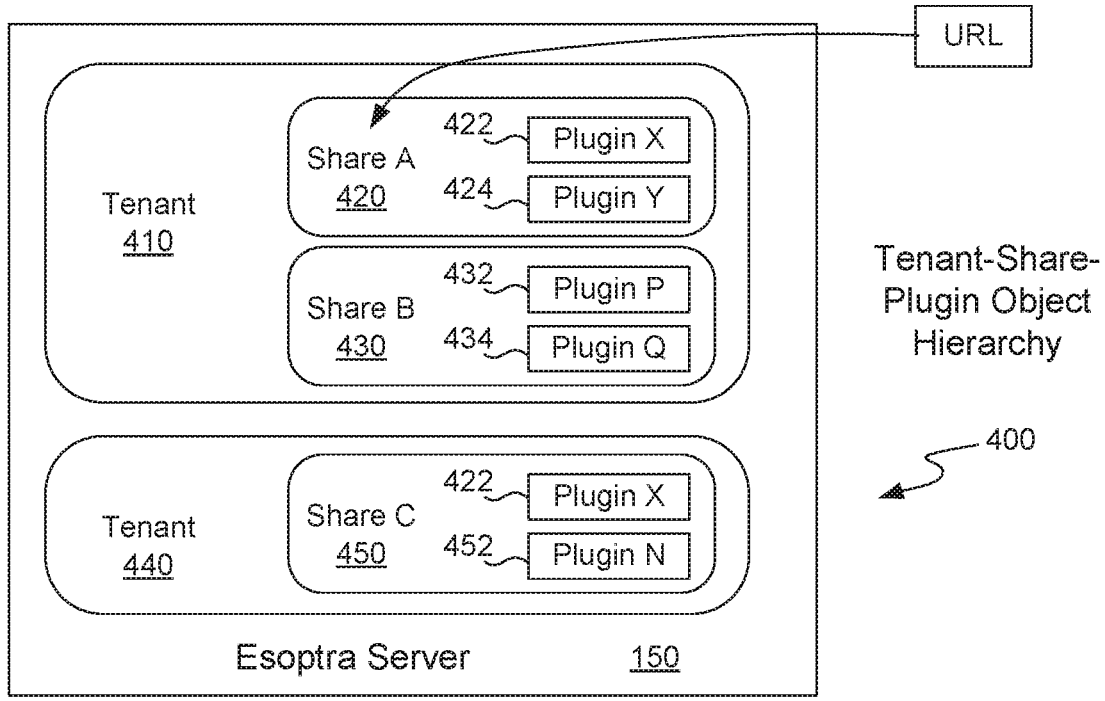
FIG. 5 is a block diagram of a tenant-share-plug-in object hierarchy within one of the servers.

FIG. 5 is a block diagram of a tenant-share-plug-in object hierarchy (in the meaning of object-oriented programming) within one of the servers 150. A tenant class is instantiated and each instance of that class represents an account within system 200, each tenant (such as tenant 410 or tenant 440) represents a different entity such as an individual, enterprise, department, ad hoc group, etc., which is ultimately responsible for (and likely paying for) any metered usage of server 150. Although tenant 410 is shown as only being represented within server 150, each tenant may be represented upon any of a number of servers 150 and may be responsible for the execution of various plug-in functions on these different servers. In order to facilitate storage of data and the metering of that storage, there is a unique identifier associated with each tenant instance and this identifier may be used in different ways to track data stored by the tenant such as by using it as a prefix (first path component) for any digital object stored in the object store.

As mentioned, a tenant instance for each tenant exists at runtime and among other properties, includes a list of shares for each tenant. Like a tenant, a share is a logical concept for which there is a share class that is instantiated to create share instances, such as share 420 and share 430. Unlike a tenant, a share is a unique within a tenant and shares cannot be shared between tenants. Each share creates an artificial grouping of plug-in functions, such as share 420 that includes functions 422 and 424. As shown, share 430 includes functions 432 and 434. Among other properties, each share instance includes a list of its associated plug-in functions. A unique identifier of each share is used as the second path component when naming objects in an object store.

A share instance is also used as the entry point for an end user and as such, each share instance has a property which is the IP address and port of that share. The WebDAV module 304 provides one WebDAV listener per share to facilitate communication between the share and the end user. Because all plug-in functions associated with a single share use an IP address of the share's subnet they all appear to be on the same network (i.e., they are on the same subnet), which will be discussed in greater detail below. For example, a VPN may use a share to allow secure access to data within a corporate firewall by the share's plug-in functions, even if server 150 and the plug-in functions execute in a public cloud.

Similar to tenants and shares, there is a class for plug-in functions and each plug-in function has an associated runtime object. Note that while a share may be associated with any number of different plug-in functions, a given plug-in function may execute within the context of different shares, e.g., function 422 executes in the context of share 420 and within the context of share 450. The grouping of plug-in functions by shares facilitates the use of virtualization technology as explained below. It is the share that invokes a plug-in function, and also performs source network address translation to allow its plug-in functions to reach out to remote network-based services. The name of a plug-in function is the name of a root folder within a share.

A configuration file also exists that includes information on each tenant (i.e., on each individual, enterprise, etc.), information on each share, and information on each plug-in function. Specifically, the server maintains a tree of .yaml configuration files including one for each tenant, share and plug-in function. This .yaml file is created and updated as a consequence of making control path REST API calls (e.g., via the CLI) indirectly by an administrator.

Figure 6:
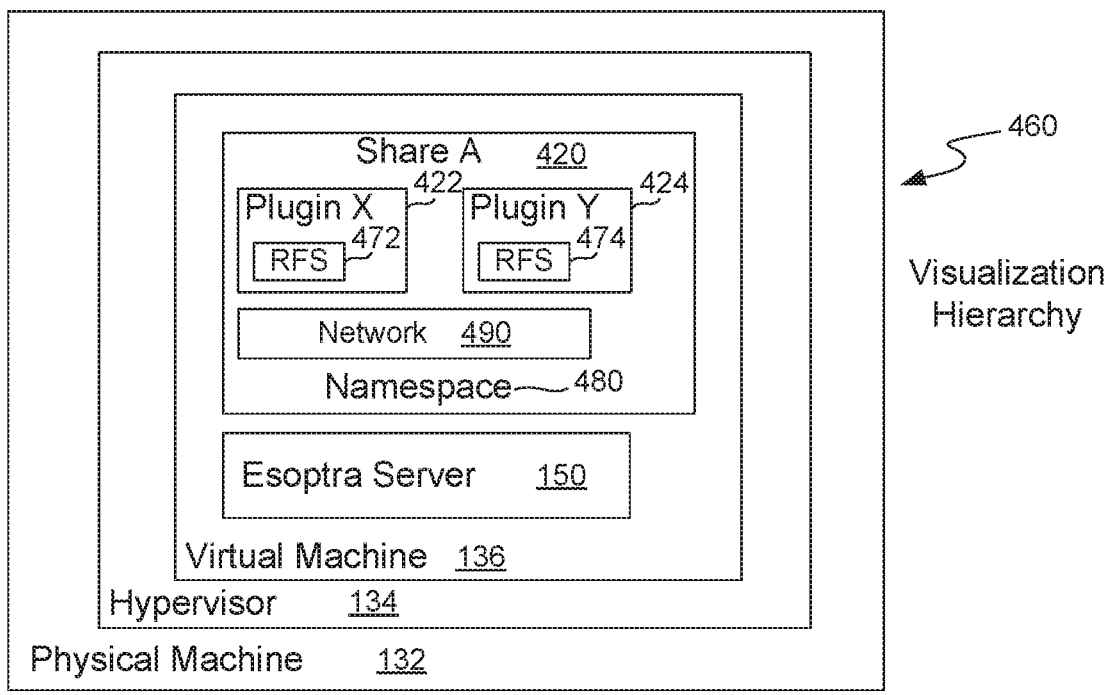
FIG. 6 is a block diagram of a visualization hierarchy that includes plug-in functions.

FIG. 6 is a block diagram of a visualization hierarchy 460 that includes plug-in functions. As is known in the art, a hypervisor 134 may execute upon a physical machine 132 in order to host any number of virtual machines 136. As explained earlier, server 150 executes within this virtual machine along with any number of plug-in functions 422, 424 that it invokes.

In order to provide isolation for each plug-in function during execution, the present invention utilizes virtualization technology available from the Linux kernel, but in a novel manner, different from currently used virtualization technology. Typically, in order to provide complete isolation during execution, a process is arranged to execute inside a so-called software "container" which allows the process to execute without conflict. A common software application that implements containers, Docker, requires that each process in a container not only has its own root file system (RFS), but also that each process has its own exclusive namespace. The present invention, however, implements isolation in a different manner in order to provide advantages in accordance with the purpose of the invention.

As with software containers, each plug-in function 422, 424 is invoked by server 150 with its own root file system (RFS) thus providing each plug-in function with the isolation it needs in order to prevent conflicts with other processes installed within the virtual machine. But, unlike current technology, each plug-in function is not provided with its own namespaces. It gains a network namespace nested within the share's network namespace and shares other namespaces such as the process (PID) namespace with the share.

One of the goals of the present invention is to facilitate the development of plug-in functions by an enterprise; in order to access the various data repositories of that enterprise, and to make the development of plug-in functions less expensive and less time-consuming, it is realized that a non-shared namespace per plug-in function would be disadvantageous. Consider the example of a suite of plug-in functions needed by an enterprise in order to access one of its own databases behind a firewall. If a VPN were to be set up to allow a single plug-in function to access that database then a certain amount of networking is needed to allow that plug-in function to use the VPN. By allowing the suite of plug-in functions to share the same network namespace as the first plug-in function, the entire suite may share the network and all may use the VPN. This result is not possible using a traditional software container for isolation, such as is done in Docker. If a software container were to be used, then each function would have its own exclusive namespace, and the networking must be set up for each function individually, thus creating more work for the developer of each function and making function development more difficult.

More specifically, to share a network namespace, the server creates an internal software-defined network with a software bridge and firewall-based software routing (iptables). Each share has its own subnet (i.e., a private network for the share). All plug-in functions of a share are connected to that share's subnet. The IP address of the host computer of the server is the gateway to the outside world; internally it looks like a true TCP/IP network and is built as a software-defined network. Thus, it looks as if a share has its own network with plug-in functions that look like networked devices. The network is a non-Internet routing network 10.X.Y.Z/8, much like a home network (which would be 192.168.Y.Z/16). The firewall uses SNAT (Source NATting) to give this network access to the Internet.

Accordingly, one embodiment of the present invention allows plug-in functions within a particular share to share a network namespace; e.g., functions 422 and 424 share namespace 480, effectively meaning that they are all on the same network 490. More specifically, plug-in functions that share a namespace share an IP stack and also share a set of process identifiers. Thus, the concept of a share allows plug-in functions to be grouped together so that they may share various namespaces, including a common network namespace. The server uses virtual Ethernet pairs (veth pairs) to create isolated networks, and creates a veth pair between each share and the host computer and between each plug-in function and share. Thus, plug-in functions of a share are on the same subnet.

In one specific embodiment, the server runs under Linux, and Linux provides for multiple namespaces. In this embodiment we currently use Network, PID, UTS and Control Groups. Each share has its own Network, UTS and PID namespace. Each plug-in function also has an additional nested network namespace. Tenants, shares and plug-in functions each have a corresponding "cgroup" for accounting and quota management. A network namespace effectively looks like a separate IP Stack. A process namespace effectively looks like a separate set of process identifiers.

Although providing each plug-in function with its own RFS, and allowing plug-in functions to be grouped together to share a namespace is the preferred embodiment, it is contemplated that the present invention may also be implemented using a traditional software container in which each plug-in function is assigned its own namespace.

Figure 7:
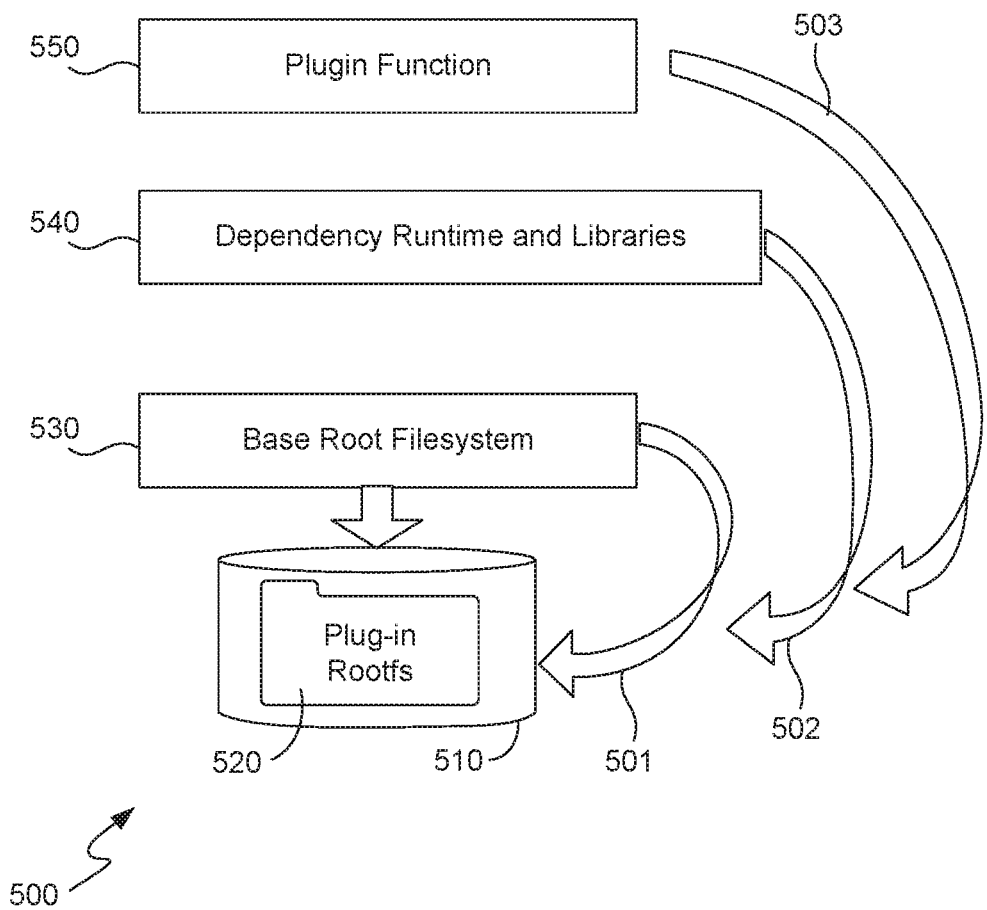
FIG. 7 is a diagram illustrating how a root file system for a plug-in function may be created.

FIG. 7 is a diagram 500 illustrating how a root file system for a plug-in function may be created. As described above, each plug-in function executing upon a virtual machine in association with server 150 has its own root file system in order to provide isolation. Shown is a local folder on the physical disk 510 of the server computer 132 upon which the virtual machine is executing. The root file system is unpacked into the folder on that disk entitled "Plug-in Rootfs" 520.

Preferably, the root file system is built in layers, the first layer being the base root file system 530 which typically includes the base layer for a particular programming language such as C#, Python or Java files. Because this base layer includes code needed by any plug-in function written in that specific programming language, this base layer will typically be provided on local disk by the entity responsible for server 150. Using the language Python as an example, this base layer includes compiled code for the Python runtime environment and is typically stored in a zip file "base.tar.gz." The root file system may be simple or as sophisticated as a Java virtual machine.

The second layer is the dependency layer 540 and typically includes extra libraries in a particular programming language that a plug-in function or functions will need. Because this second layer will likely include dependencies that many related plug-in functions will need (such as those related plug-in functions created by a single enterprise or by a systems integrator), it is likely that this layer will be created by the enterprise or systems integrator and will be stored in a repository 234 for use by related plug-in functions written in a specific programming language. This layer is extracted on top of the base layer in the host folder for the plug-in function. For Python plug-in functions, this layer includes Python classes and libraries and is typically stored in a zip file "dependencies.tar.gz."

The third layer is the actual code for the plug-in function 550, written in any suitable programming language that can be executed on the virtual machine. The plug-in function is written for a very specific data manipulation task, and as such, its binary code will be stored in the repository 234. For Python, this is the actual Python code that performs the task.

As will be explained in greater detail below, when a plug-in function is deployed these layers are unpacked, one at a time 501-503, on top of one another, into folder 520 on the physical disk. Collectively, these layers provide the root file system for the plug-in function.

Deployment of Plug-in Functions

Figure 8A:
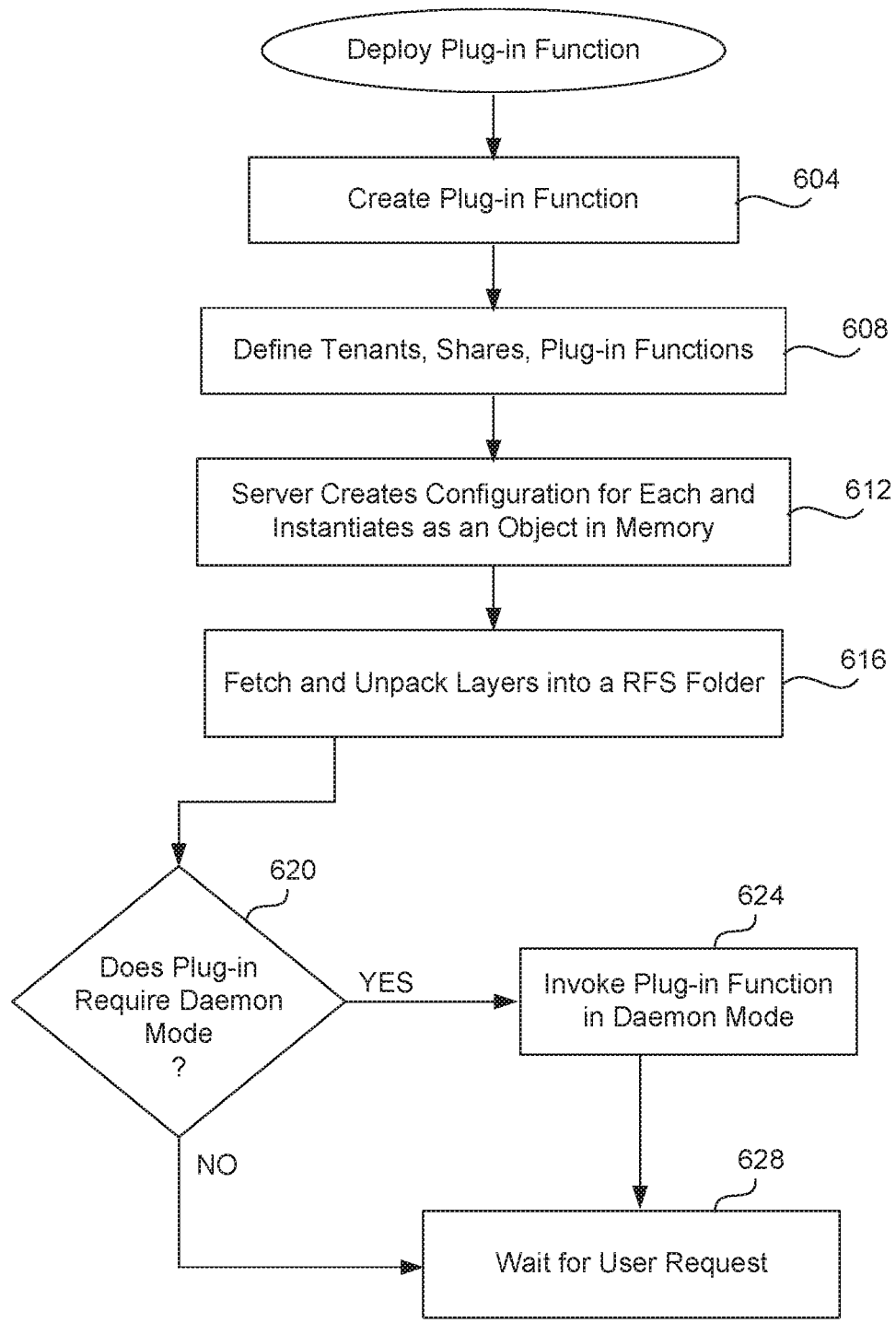
FIG. 8A is a flow diagram describing how a plug-in function is deployed upon a server 150.

FIG. 8A is a flow diagram describing how a plug-in function is deployed upon a server 150, i.e., those steps necessary to place a plug-in function on server 150, ready to execute. Aside from the actual writing of the plug-in function, the deployment of the plug-in function is handled by an administrator or automatically by server 150, thus taking the burden off the developer. As mentioned above, there is a control path REST API in server 150 for management of the server. An SDK to develop client-side management applications is used to develop a separate executable which is a CLI management tool used in a Linux console or Bash script. Using the CLI (or SDK or raw REST API) an administrator navigates and manages the tenant-share-plug-in-function hierarchy including uploading layers and setting various properties. Upon deployment, layers are extracted and the root file system is actually installed in a folder on the server's disk. The plug-in function is then ready for invocation by the server triggered via user HTTP requests. Details of this deployment now follow.

In a first step 604 of FIG. 8A, a developer writes a plug-in function in a suitable programming language to perform a specific data manipulation task. Each plug-in function may be stored in repository 234 and as described above, and may include different layers, preferably each layer stored as a ".zip" file.

In order to facilitate presentation of a standard file system hierarchy on the client computer, each plug-in function implements a subset of a set of commands that form the API of the plug-in functions. While it is not necessary that every command be implemented, a plug-in function should not implement other commands since those others will not be called. By implementing the commands of this API, the function supports the user actions in the presentation layer on the client computer (e.g., open folder, rename a folder, etc.), those actions that are familiar to the user when interacting with folders and files. A function may also augment each command with other functionality as the developer desires.

Table 1 lists those commands of the API, the specific user action within the presentation application on the client computer that causes that command to be sent from the WebDAV client to the plug-in function, the result displayed on the client computer, and the action that the plug-in function may take to implement that command (among other actions that the function may also take in order to augment that command) Advantageously, the plug-in function, depending upon the needs of the developer, may take other actions in addition to what is normally expected from one of these standard user interface commands, using for example, which folder is opened or removed, the name of a folder, to where an entity is moved, etc. For example, moving a file (or folder) into a folder also adds the name of a user associated with that file into a group associated with the folder, or, other processing may occur based upon the folder or file name. Or, removing a file or folder is delayed for a length of time depending upon the context, or other processing occurs based upon the name or contents of the folder or file. Or, upon deletion of a file, other clean-up tasks are performed, i.e., saving a copy, updating a database, etc. Thus, standard file/folder user interface semantics are augmented with functionality that can be much more than the simple functionality that a user expects with the traditional user interface of a file system hierarchy. The formats required of the plug-in function are JSON request and response bodies, except for actual file data which is in binary.

TABLE 1

| Command | User Action | Displayed Result | Plug-in Function Action |
|---------|-------------|------------------|-------------------------|
| stat | indirect | name, size, flags | Provide meta-data on file or folder. |
| list | open a folder | contents of folder | Return list of server plug-in functions at root level or return contents of subfolder. |
| get | read a file | contents of file | Generate file contents and return. |
| put | drag/drop file to/into a folder; upload file into a folder | file now appears in folder | Store and process file. |
| mkdir | create a folder | new folder appears | Stores folder metadata and may generate subfolder hierarchy. |
| remove | remove file or folder | entity removed | Cleanup or other processing. |
| move | move file or folder | entity moved | Validate the move. Perform other processing based upon entity moved or into which folder it is moved. |
| options | indirect on startup | invisible | Return commands that are implemented. |
| open | indirect on startup | invisible | Returns context dictionary specific to function. |
| version | indirect on startup | invisible | none |
| help | Author only | invisible | none |

Plug-in Function API

In step 608 an administrator over a suitable network connection 69 defines tenants, shares and plug-in functions for a particular server 150 using the above-mentioned hierarchy, typically using scripts or commands Each of these entities will have properties, and properties of each plug-in function include a unique identifier, which layers constitutes the function, and a URL or content address of each layer. The URL or content address allows server 150 to later find and retrieve the plug-in function. Next, in step 612 the server automatically creates a configuration file on disk (e.g., using the scripts from the administrator) for each tenant, share and plug-in function, and instantiates each as a runtime object in memory. Each runtime object include suitable properties, for example, each share includes networking properties in order to implement namespace sharing between related plug-in functions as described above. Through these mechanisms, a server 150 is aware of its tenants and shares and which plug-in functions will be used. In step 616, for each plug-in function, server 150 fetches and unpacks each layer of the function into a root file system folder on a local disk of server 150. This step occurs for each share on the server.

Figure 8B:
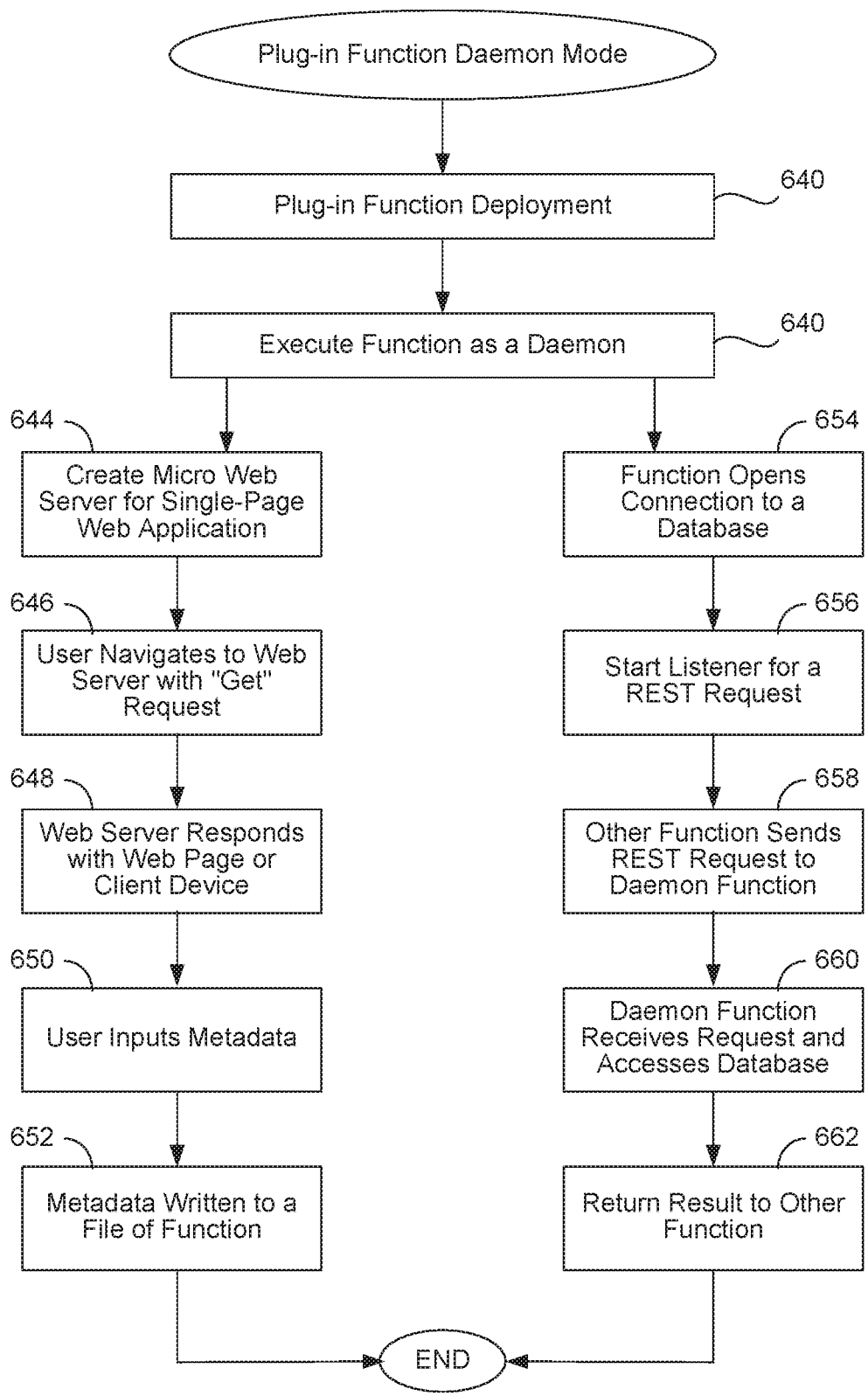
FIG. 8B is a flow diagram describing how a plug-in function is started in daemon mode.

Next, in step 620 the server determines whether a particular plug-in function implements the "start" command In this step, the server queries the function with the "options"

command, and the function returns the commands that it does implement (e.g., get, put, list, etc.). As mentioned earlier, a function may run in a "command-line" mode—a transient mode in which the function executes when called and then terminates—or may run in a "daemon" mode—a mode in which a process is created for the function when executed and the process continues to execute. A function that implements "start" can run in daemon mode. If the function does implement this command, then in step 624 the server invokes the function in daemon mode (FIG. 8B below). If not, then control moves to step 628 in which the server and the plug-in function wait for any request from the user to invoke the function, as will be explained in greater detail below. The function will be loaded from the root file system folder on the local disk into the virtual machine in step 624 for functions that execute as a daemon, and will be loaded over and over again each time a function is executed in command mode, e.g., in step 720.

FIG. 8B is a flow diagram describing use of the daemon mode for a plug-in function. This technique starts up a plug-in function in daemon mode, allowing the function to run continuously, which provides a micro Web server specific to the plug-in function that implements a user interface just for that plug-in function. Use of the daemon mode also allows a plug-in function to maintain a continuous connection to a database which also has advantages.

The daemon mode may be used in conjunction with any of the commands implemented by a plug-in function (such as reading or writing data), or may be used ahead of time to gather metadata or other instructions for the plug-in function. Executing a plug-in function in daemon mode allows the function to continue executing for a long period of time, for example, as long as the server 150 is executing, and allows the plug-in function to gather input from the user via a micro Web server or to maintain a database connection.

In step 640 the plug-in function is deployed as is discussed above, and in step 642 the server creates a process and executes the plug-in function in that process as a daemon as discussed above with respect to step 624. At this point the plug-in function is executing continuously and no further explicit action need be taken, other than waiting for user requests. Advantageously, though, the continuously executing plug-in function may be used for two optional purposes as described below beginning in steps 644 or step 654.

In step 644 the plug-in function creates a micro Web server that implements a single page Web application specifically to allow the user to provide input to that plug-in function. The single page Web application may have any format desired by the developer and may request any input data. This internal Web server is listening on an internal port not accessible to the user. The server returns to the client device a single icon to be displayed on the client device (such as a "gear" icon, a "settings" button, or other icon indicating that user input is available). In step 646 the user navigates to the micro Web server (e.g., via a browser on the client device) by selecting this icon which in turn creates a standard "get" HTTP request which is sent to the server on its port. The server, in turn, then passes this request to the plug-in function which is listening on an internal port.

Next, in step 648 the micro Web server responds with the single Web page application which is displayed on the client device. In step 650 the user inputs the metadata requested on the Web page (such as queries, tags, labels, keywords, user information, time of upload, etc.). Once input, this data is written to a file of the plug-in function using a "put" request from the client device to server 150. This file will be a hidden file invisible to the user, but it has a special file name known to the plug-in function as containing metadata, instructions, etc. Typically, this file will be stored in cache 210 using the back-end caching technique described below. The plug-in function will then use the metadata in this file to perform searches, to store files, or to otherwise modify the processing of the plug-in function.

As another option, in step 654 the daemon function opens a connection to a database (such as a local or remote database, or a pool of connections) and maintains that connection. Any suitable API of the database may be used and the goal is to maintain a connection for as long as possible. Because opening and maintaining a connection to a database takes a relatively long time and affects performance, opening and maintaining a connection that may be used by other plug-in functions (which they themselves do not need to open and maintain) greatly speeds up response times for these plug-in functions. Typically, the same plug-in function which began execution in step 642 may be invoked and executed again (or many times) in a different process in a command-line mode. This other plug-in function advantageously may then make use of the open connection to the database established by the daemon function in step 654. Plug-in functions which are not the same as the daemon function may also make use of the open connection.

Accordingly, in step 656 the daemon function starts a listener for a specific REST API request. Generally, an inter-process communication technique is needed to allow plug-in functions to communicate with one another on the same host. Although a variety of techniques may be used, in this example, the daemon function implements a REST server and any other plug-in functions in command-line mode act as REST clients. The daemon function will now be able to respond to any requests from other plug-in functions with respect to its connection to the database.

In step 658 the other plug-in function sends a request regarding the database via the REST API to the daemon plug-in function and awaits a response. This request may be any request of a database such as read data from, or write data to, the database. The developer (or developers) of these plug-in functions have written the functions to take advantage of this inter-process communication technique to allow any number of plug-in functions to use the open connection established by a single daemon plug-in function. In step 660 the daemon function receives the request, accesses the database using its open connection, performs the read or write (as the case may be) as requested by the other function, and receives the result from the database (such as requested data or confirmation of a write). In step 662 the daemon function then relays this result via the REST API to the other plug-in function.

Of course, a plug-in function may be started in daemon mode for a variety of other reasons. For example, if continuous background processing is required, or if it is advantageous to perform a write some time after it has been requested by the user, then a plug-in function may be started in daemon mode to provide those advantages.

Read Data Using a Plug-in Function

Figure 9A:
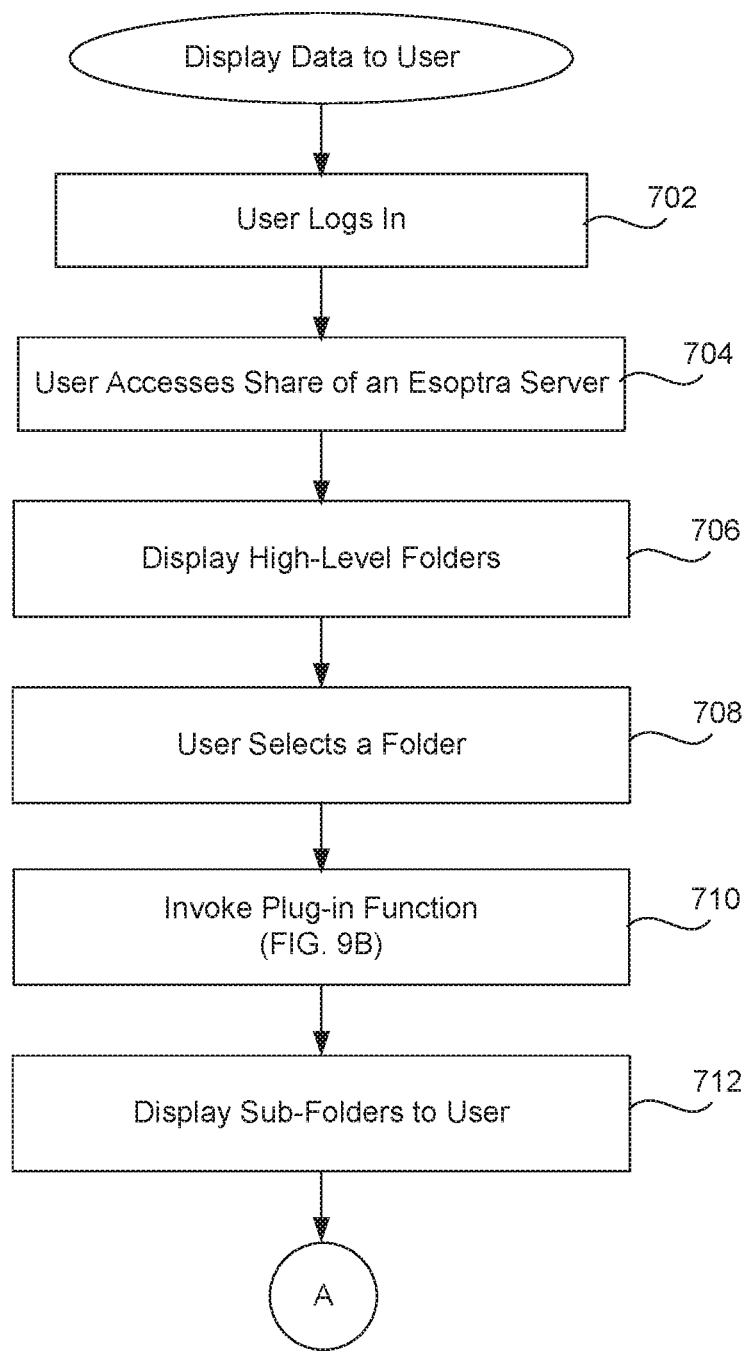
FIGS. 9A-9C are a flow diagram describing one embodiment by which a plug-in function is used to read and display data to a user.
Figure 9B:
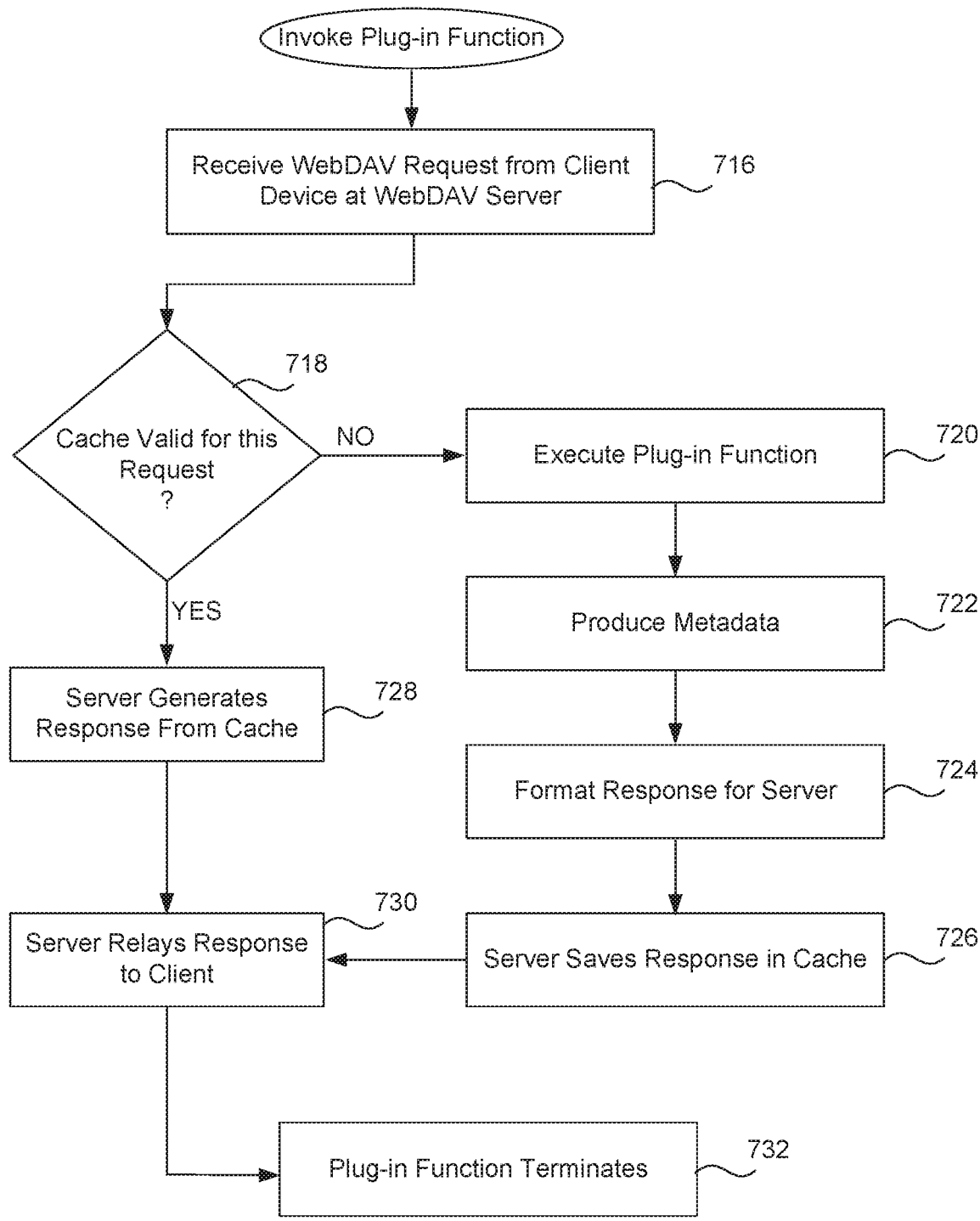
Figure 9C:
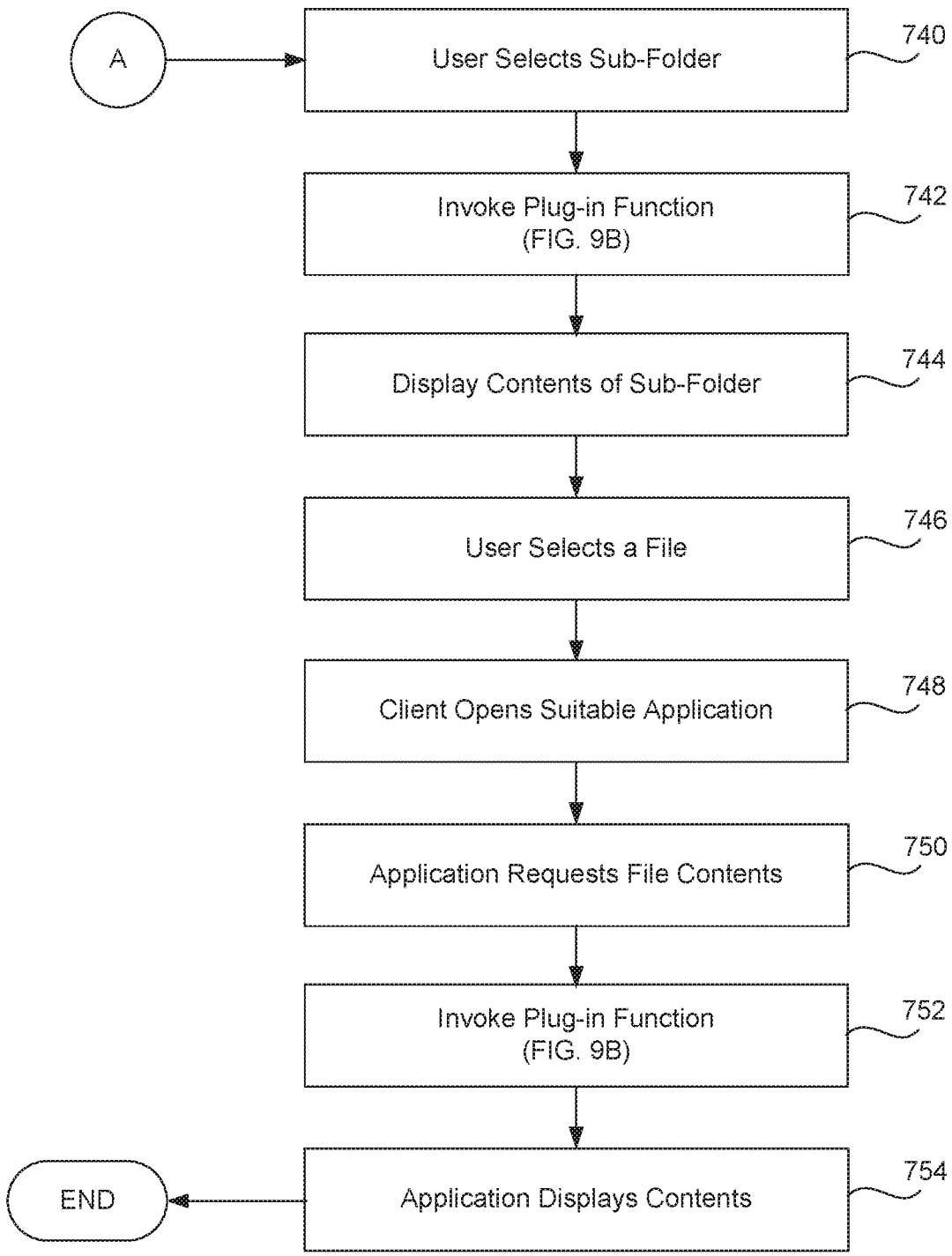

FIGS. 9A-9C are a flow diagram describing one embodiment by which a plug-in function is used to read and display data to a user. In this example, a plug-in function "EOD" has previously been created, stored in repository 234, and has been deployed within server computer 132 as previously described. The function EOD (which stands for end-of-day trading value) presents a folder to the user, which when opened, displays folders for various stock exchanges, each of which when opened displays files that list the end-of-day value for any of a variety of commodities. One advantage of the present invention is that, as far as the user knows, all he or she is doing is opening folders and selecting files; the user is unaware that a plug-in function is actually executing behind-the-scenes, gathering information, creating folders and files on the fly, and displaying data to the user in real-time. While it appears to the user that the folders and files inside of the high-level EOD folder exist somewhere permanently from the outset, these folders and files are not created until the EOD plug-in function executes, and even then only those folders and files that are immediately required for displaying in the file browsing interface or rendering in the end-user application.

One advantage of one embodiment of the present invention is that the hierarchy of folders and files that is shown in these examples does not actually exist anywhere in memory or in storage until the plug-in function executes and generates that hierarchy, and then only the subset that is immediately required. Unlike a traditional file server, a developer does not have to create this hierarchy and particular files ahead of time; the hierarchy and file contents need only be generated by the plug-in function when needed, i.e., when the user taps a folder to open it or taps a file in order to view its contents. While the user interface may display an icon of a file and the file name, the actual data of that file has not been generated or retrieved yet; the plug-in function does not need to generate or retrieve the data until the user specifically requests it. Advantageously, the hierarchy that the plug-in function creates can be as deep or as wide as wanted, and is practically unlimited. A traditional hierarchy of a file server is limited by disk space available.

FIGS. 10A-10F illustrate an end-user computing device 242-246 that a user is using to access the plug-in function, retrieve and display data. In this example, the computing device is a mobile telephone, although it could be any of a variety of end-user computing devices. In fact, the device may be a computer 248 in which an application is using a REST interface to interact with a server 150 in order to navigate, retrieve and display the data below described, in which case the actions attributed to the user below may be performed by the application. And, although the below description describes the user using a finger to make selections on a touchscreen, any other suitable input device may be used such as computer mouse, stylus, track pad, voice commands, etc.

In a first step 702 the user logs in to a suitable server 150 using its authentication and authorization module 312. As mentioned above, depending upon the end-user device, a user may access server 150 using a standard browser of a computer, using a mounted drive icon displayed on a computer screen, or using the WebDAV protocol. This protocol is built into most computers and is also available as an application on a mobile device.

FIG. 10A illustrates an embodiment in which the end-user device is a mobile telephone 760 on which is executing the application WebDAV Nav+762, an implementation of the WebDAV protocol, which appears as a familiar folder. In this example, the user has already been authenticated by the server (either by the presentation of a username/password dialog box, or by using a pre-filled profile storing both those items). Upon selecting icon 762, the application presents a list of servers that may be connected to and the screen appears as shown in FIG. 10B. In this example, there is only a single connection 764 available to a server 150 named "Esoptra Demo."

In step 704 the user accesses a particular share of server 150 (such as share 420) by selecting connection 764. In this example, a connection is established between device 760 and share 420 using the WebDAV protocol. In another example, a URL typed into a standard browser may access the share directly, such as shown in FIG. 5. Because a share is technically an endpoint (i.e., an entry point of server 150), it is able to identify the group of plug-in functions associated with that share, such as functions 422 and 424 that all share the same namespace in the network. The request from the application to the server uses the WebDAV protocol verb "propfind" sent to the root (/) of the share to list its contents. The WebDAV listener of that share returns a list of folder names each one representing a plug-in function of that share.

Figure 10D:
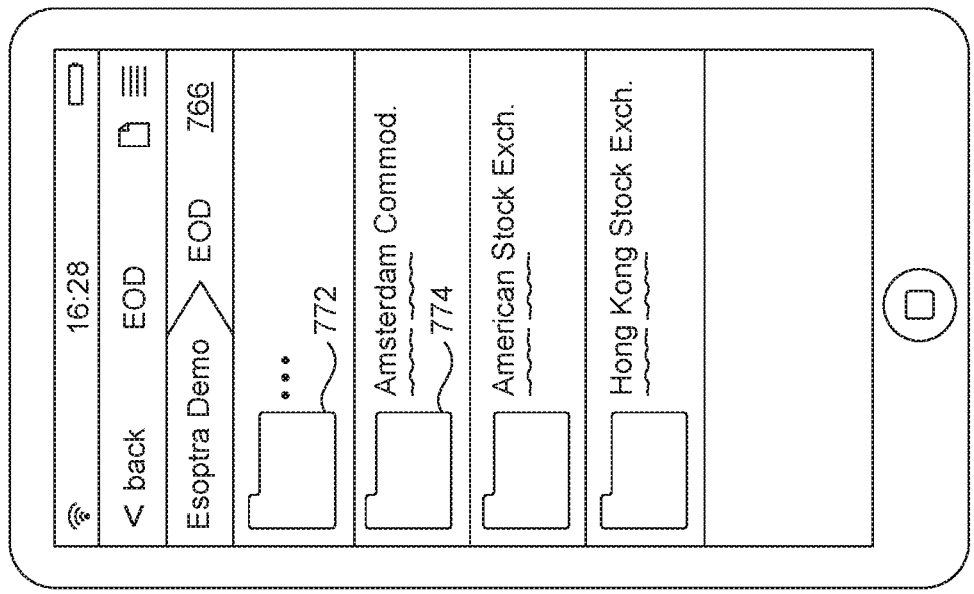
FIG. 10D shows a response that includes three different folders.
Figure 10C:
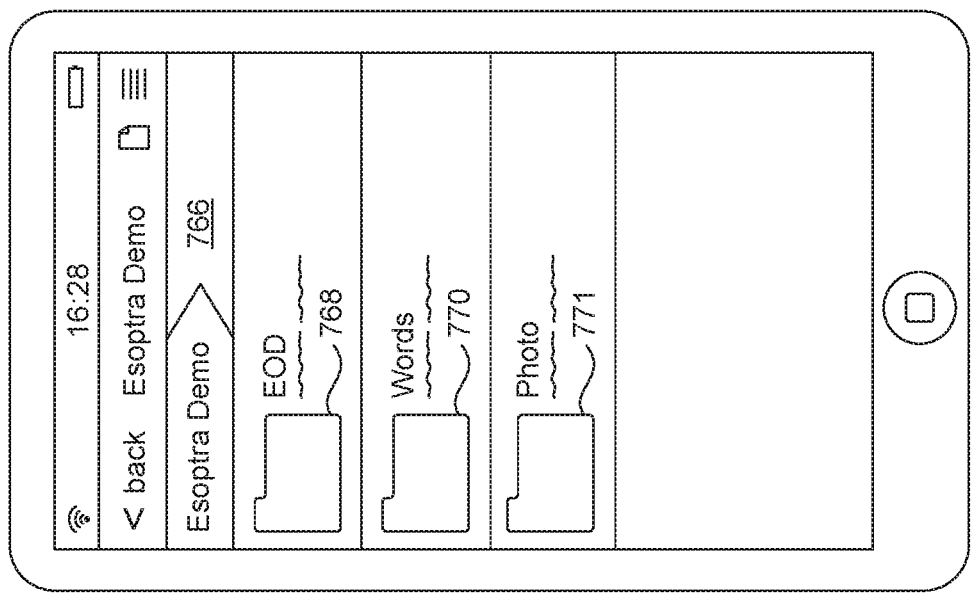
FIG. 10C illustrates the high-level folders within the "Esoptra Demo" that are displayed to the user.

Next, in step 706, in response to selecting 764, the high-level folders within the "Esoptra Demo" are displayed to the user and appear as shown in FIG. 10C. Once selected, server 150 displays the names of those plug-in functions available within that share and that are available to the particular user who is logged in. Shown are three high-level folders EOD 768, Words 770 and Photo 771. Region 766 displays the current hierarchy, i.e., folders 768, 770 and 771 are within the share named "Esoptra Demo." The server is aware of which plug-in functions to display because these plug-in functions have been earlier deployed as described in FIG. 8A. Not all plug-in functions of a particular share may be available to all users who log in and connect to that share. For instance, a user logging in to share 420 may only have access to function 422 and not to function 424. When a user is authenticated, the server compiles a list of groups that the user is a member of. A user can be a direct member of a group (directly assigned by the administrator) or an indirect member via an identity provider (e.g., Active Directory). Once all groups are known, the server compiles the broadest set of authorizations, i.e., the list of functions associated with each group and computes a unique set including read/write access properties. Thus, the server determines which users of the share can access which plug-in functions indirectly via groups.

The ability to restrict which plug-in functions are visible to certain users is an advantage over a traditional file server in which all files and folders within a high-level folder are typically visible to any user who opens the high-level folder. By restricting access to only certain users, the advantage is that a particular user will see a unique view of the list of functions and within each function it is possible to create a file/folder hierarchy that is specific to that user, i.e., certain files or folders may be specific to the user or specific to the user's role (group membership). It can show more, fewer or different files depending on who you are, thus making it look like a file server was created specifically and exclusively for you. Another advantage is that file and folder names (metadata) that you should not see may simply not be exposed to you either.

At this point, none of the functions 768, 770 or 771 have begun gathering data or performing the function that they have been programmed to do, and, as far as the user knows, these are not functions that will execute but are merely the names of folders that contains data that the user wishes to view. Of course, icons 768, 770 and 771 and even the names of these folders may take different forms and have different names, and need not necessarily look like a traditional folder or file, or have the exact name of the corresponding plug-in function. The user is aware, however, that the folder "EOD" contained subfolders of various stock exchanges, and within these stock exchange folders, there are various files that list the end-of-day values for various stocks, bonds and commodities. The user need not be aware, though, that when he or she selects "Esoptra Demo" 764 for the first time and views the folder EOD 768, that the subfolders and files of folder EOD 768 do not exist yet and have not yet been stored in any storage.

Because the user wishes to view closing prices for a particular commodity, he or she selects folder 768 in step 708. At that moment of selection, the plug-in function EOD will be invoked in step 710 and then in step 712 the subfolders of folder 768 will be displayed to the user as will be described in greater detail below with respect to FIG. 10D. The user is likely unaware that even though he or she is simply performing a very familiar action (opening a folder by selecting, double-clicking on it, etc.), that what actually is happening is that the plug-in function is invoked, begins executing, and begins to gather and display data that had not previously existed in the hierarchy that is displayed. The advantage is that the collection, processing and storage of desired data need not occur until the user actually requests the data.

FIG. 9B is a flow diagram describing how a plug-in function is invoked when a user selects a folder, selects a file, or takes another similar action on the user interface. Depending upon the user action and the context, the WebDAV request described below may include any of the following commands that the plug-in function will handle: stat, list, get, put, mkdir, remove, and move. For example when a user taps on a folder the user expects that the folder will be opened and its contents displayed, thus, the command "list" will be sent. When the user selects or double clicks on a file the user expects that the file will be opened and its contents displayed, thus, the command "get" will be sent. When the user uploads a file, the command "put" is sent; when the user creates a folder the command "mkdir" is sent; and when the user deletes a file or folder the command "remove" is sent. Dragging a file into a folder causes the command "move" to be sent. What the user may not realize (or what the user may have been told) is that the plug-in function may be augmenting this expected visual user interface with other processing that is not traditional, or not normally expected as part of the standard user interface command.

When the user taps on icon 768 in FIG. 10C the user desires that the folder is opened and any contents displayed; accordingly, the client device 760 via its WebDAV client 59 generates a WebDAV request in step 716. This is a request to open the folder EOD, which includes a "list" command along with the components of the path which are simply "/EOD." The request is received at the WebDAV module 304 of server 150 and is directed to share 420. As explained in step 612, share 420 is a runtime object. And, although it is described herein that the user is performing actions on the user interface in order to generate the above command and path, in fact, at a minimum what is needed for the request is the path that includes any folders and file names, and the relevant command such as "put," "get," "list," etc. It is not strictly necessary that the user perform certain actions.

All requests are HTTP requests which use a combination of a request line with the relative path, e.g., "/EOD," a command, e.g., "list," and a set of headers, one of which is the hostname or IP address. This is what is actually sent on the wire. Prior to that, the application (an HTTP client) has established a connection with the share (the host:port part of the URL). Thus, effectively the URL is split up into pieces.

Next, in step 718 the share determines if the cache 210 is valid for this plug-in function for this particular user for this request i.e., should the plug-in function be executed or can the result stored in the cache from the last execution of the plug-in function be used again? First, the share determines to which plug-in function the request is addressed by comparing the first component of the pathname, "EOD," with the names of plug-in functions associated with that share. Secondly, the share determines if the cache is valid for this user. Because each user has a separate folder in the cache and each file or folder in that folder has an expiration timestamp set by the function, the share determines validity by that timestamp. Also, the share determines if the cache is valid for this request based upon the amount of time that has passed since the last similar request. Based upon the path (in this example "/EOD") the share determines if this is the first request or if a request had been previously made. If the first request (indicating that the plug-in function has not yet responded to a request for this path yet) or if the time limit for the cache has expired, then control moves to step 720. If not the first request and if the cache has not expired, then control moves to step 728.

In step 720 the plug-in function begins execution which may be handled in a variety of manners depending upon the computer and operating system. In one embodiment, a process is first created in the operating system by the server 150, the process joins a specific namespace, and a system call is made to "jailroot" using the kernel. The plug-in function code then begins execution in this process. The server 150 then calls the function, passing the command from the user (e.g., "list") and the pathname. As explained above, a plug-in function may be written to perform any type of data gathering, data processing or data writing task. In this example, the EOD function has been written to display folders including stock exchanges and commodities when the high-level EOD folder is opened. Accordingly, the EOD function inputs the "list" command and produces the data that will be eventually displayed in FIG. 10D.

Once finished producing the response to the "list" command, in step 722 the plug-in function also produces standard and extended metadata. Standard metadata includes metadata associated with folders and files such as whether the item is a folder or file, date, time, etc., typical information that is useful to the user of the device when viewing the response. Also produced is extended metadata, the extended metadata including a time limit on how long the cache for this particular request (path and command) will be valid. In other words, "/EOD, list" is a different request from "EOD, stat."

One type of extended metadata are flags, timestamps and other metadata indicating how long the recently produced data will be valid in the cache for a particular user. For example, FIG. 10D shows a response that includes three different folders; if the developer of the EOD function has programmed the function to list different exchanges every week, then the time limit may be one week. Thus, by producing time limit metadata in this step and storing it in the cache along with the response, the server 150 is able to determine in step 718 if the cache is still valid. A second type of extended metadata relates to flags placed on files in the cache indicating whether the file is editable or removable by the user. Such metadata is useful to the plug-in function to help it interprets user commands. These flags are used in the browser Web UI to help render it or disable actions (a grey menu item) allowed on a file or folder. One important flag is the "virtual bit" which is set when the item is a virtual file (i.e., a file owned by the function) and is cleared when it is a file that was uploaded (owned) by the user, i.e., a non-virtual file.

Next, in step 724 the plug-in function formats its response (including the produced metadata) for server 150. Even though the plug-in function may perform any task it desires, if it responds to a particular command (such as the "list" command), it puts the response to that command in a particular format. In this example, a response to the "list" command provides a list of names, whether the name is a file or folder, and metadata such as date, time etc. In one specific embodiment this list is provided as a JSON array.

In step 726 the server saves this response in the cache 210. At this point, the response does exist in memory and in the cache, but may only exist for as long as the cache is valid. The response may be removed from the cache when the server determines that space is needed in the cache. A response (or any data) is stored in the internal format of the cache which, in one embodiment, is a collection of objects with unique identifiers and a set of metadata files ("roster" files), one per folder, that contains names of files, subfolders and other item metadata. Roster files are also objects with a unique identifier. This internal format is created specifically for its ease of use with a back-end object store repository; of course, other internal formats may be used. More details on the cache and an object store are described below.

In step 730 the server then relays this response back to the client device and the screen of the device now appears as shown in FIG. 10D. Region 766 still lists the current hierarchy being viewed; icon 772 represents the parent folder 768 and the ability to jump up one level; and three subfolders are displayed, Amsterdam Commodities 774 and the American and Hong Kong stock exchanges. Returning now to step 728, if the cache had been valid, then in step 728 the server is able to generate this response from the data in the cache and control then moves to step 730 where the same response from the cache is displayed on the client device. Finally, in step 732 the plug-in function terminates as it has performed its function in response to the user tap on icon 768.

Returning now to step 712 of FIG. 9A, the subfolders are displayed on the device as shown in FIG. 10D in response to the user tapping icon 768. Note that even though the plug-in function has just created these three folders, and they have just been displayed, at this point in time they do not have any contents. In other words, the contents will be created when the plug-in function is invoked again in response to a user action. In order to simplify this example, folder 774 is displayed instead of the actual exchange to which it belongs, EuroNext Amsterdam. In a more complex example, tapping icon 768 also displays a folder EuroNext Amsterdam, which when tapped then displays the folder Amsterdam Commodities 774.

Next, in step 740 the user decides to view the end-of-day values for Amsterdam Commodities and taps on icon 774. Once the user taps on this icon, in step 742 the plug-in function will be invoked again as has been described in FIG. 9B. This time, though, the WebDAV request will include the pathname "/EOD/Amsterdam Commodities," a command to open the folder (i.e., the "list" command), both of which will be provided to the plug-in function. As described in FIG. 9B, if the cache is valid for that request then the response is generated from the cache, if not, then the plug-in function will generate the response.

Figure 10F:
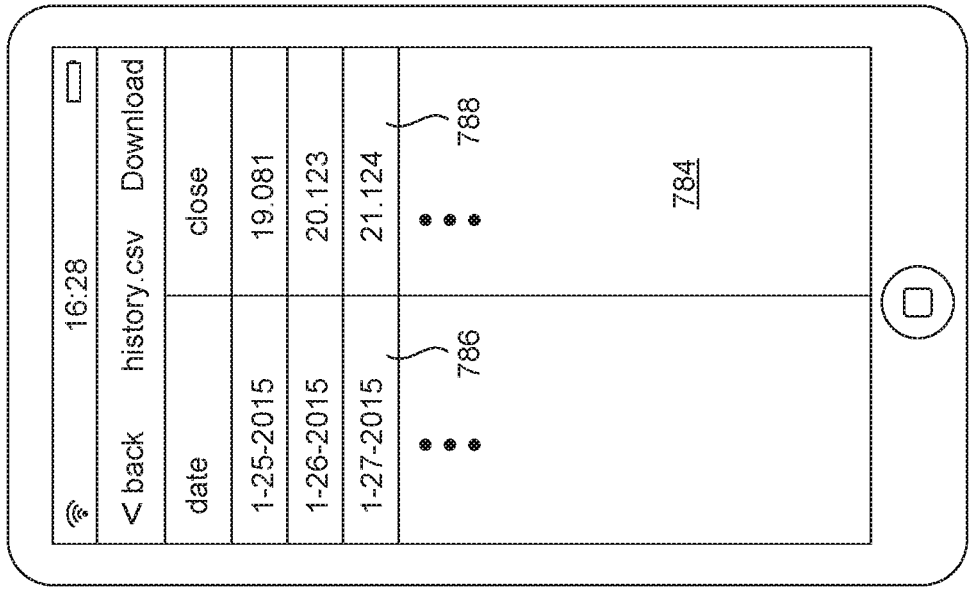
FIG. 10F illustrates the display of the device in response to the user tapping on a file.
Figure 10E:
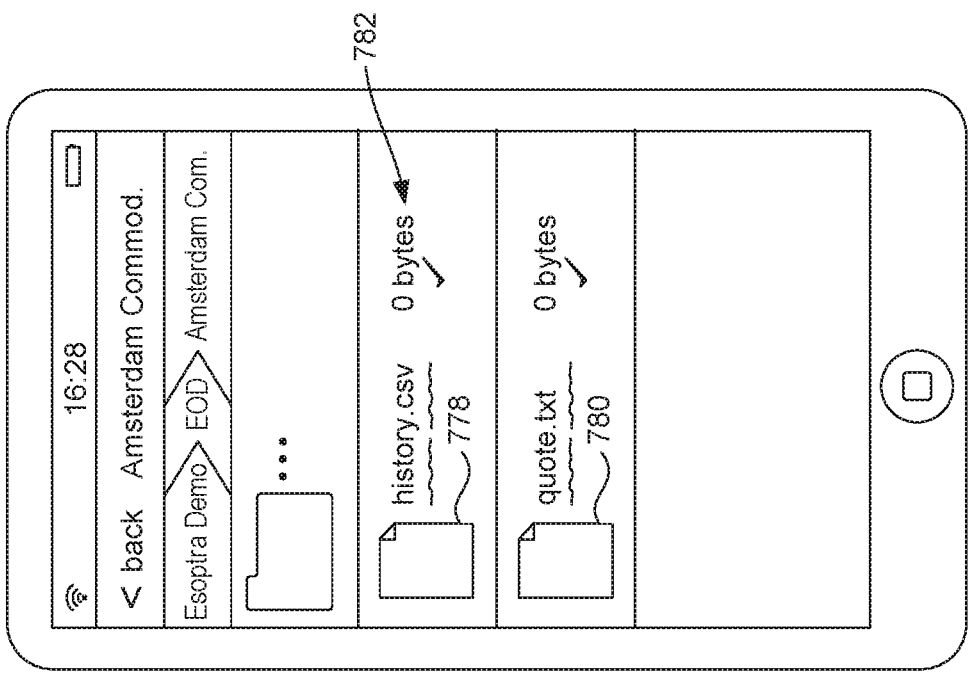
FIG. 10E illustrates the display of the device in response to the user tapping on an icon.

FIG. 10E illustrates the display of device 760 in response to the user tapping on icon 774. Step 744 displays the contents of this subfolder; shown are two files included within this subfolder, file 778 which is in the CSV format, and file 780 which is in the TXT format. Note that file 778 has 0 bytes 782, indicating that at this point the file (and the other) is empty. The files are empty because even though the name and type of each file is displayed, the plug-in function has not yet generated or retrieved the data to populate these files.

Next, in step 746 the user selects one of these files because he or she wishes to view its contents. The user selects the file using any suitable interface such as a finger on a touchscreen, a computer mouse, a track pad, etc., and, as known in the art, device 760 provides an interface to allow the user to select which application shall be used to open the file. Accordingly, in step 748 a default application may be provided by the device or the user may select a suitable application to open. For example, upon file selection a default text editor may automatically open the file, or, the user may be allowed to select a more sophisticated application (such as "Vizable" which requires a CSV format) using a standard interface window such as the "Open With" window. In either case, the application is opened and begins execution (if not already executing).

Next, in step 750 the application requests the contents of the selected file 778 by triggering a request for the file contents; the plug-in function will be invoked in step 752 again as has been described in FIG. 9B. This time, though, the WebDAV request will include the pathname "EOD/Amsterdam Commodities/history.CSV," a command to read the file contents (i.e., the "get" command), both of which will be provided to the plug-in function. As described in FIG. 9B, if the cache is valid for this request then the response is generated from the cache, if not, then the plug-in function will generate the response. Thus, if the contents of the file have not already been generated or retrieved, the plug-in function generates or retrieves the file contents at this time. Unlike the above steps 710 and 742 which listed folder contents, step 752 includes the "get" command meaning that the plug-in function may format the response in step 724 in the CSV format, and the response relayed back to the client in step 730 will be the actual contents of the file. In this example, the EOD plug-in function has been written to present files 778-780 when their parent folder is tapped, and has been written to produce data for file 778 in a CSV format when that file is selected so that a suitable application on the client device (such as "Vizable") can render the data taking advantage of that file format. In this example, the function needs to gather data in order to produce the file and does so by accessing data repositories as programmed by the developer.

FIG. 10F illustrates the display of device 760 in response to the user tapping on file 778. In step 754 the application opened in step 748 displays the contents of the file as shown at 784. Column 786 lists dates and column 788 lists the closing value on that day for the particular commodities. Note that the file data 784 did not exist within the file 778 until that data was generated or retrieved by the plug-in function in step 752. In a variation, the plug-in function may be programmed to retrieve data and create file 784 when folder 774 is tapped, and store file 784 in its cache.

Write Data Using a Plug-in Function

Figure 11A:
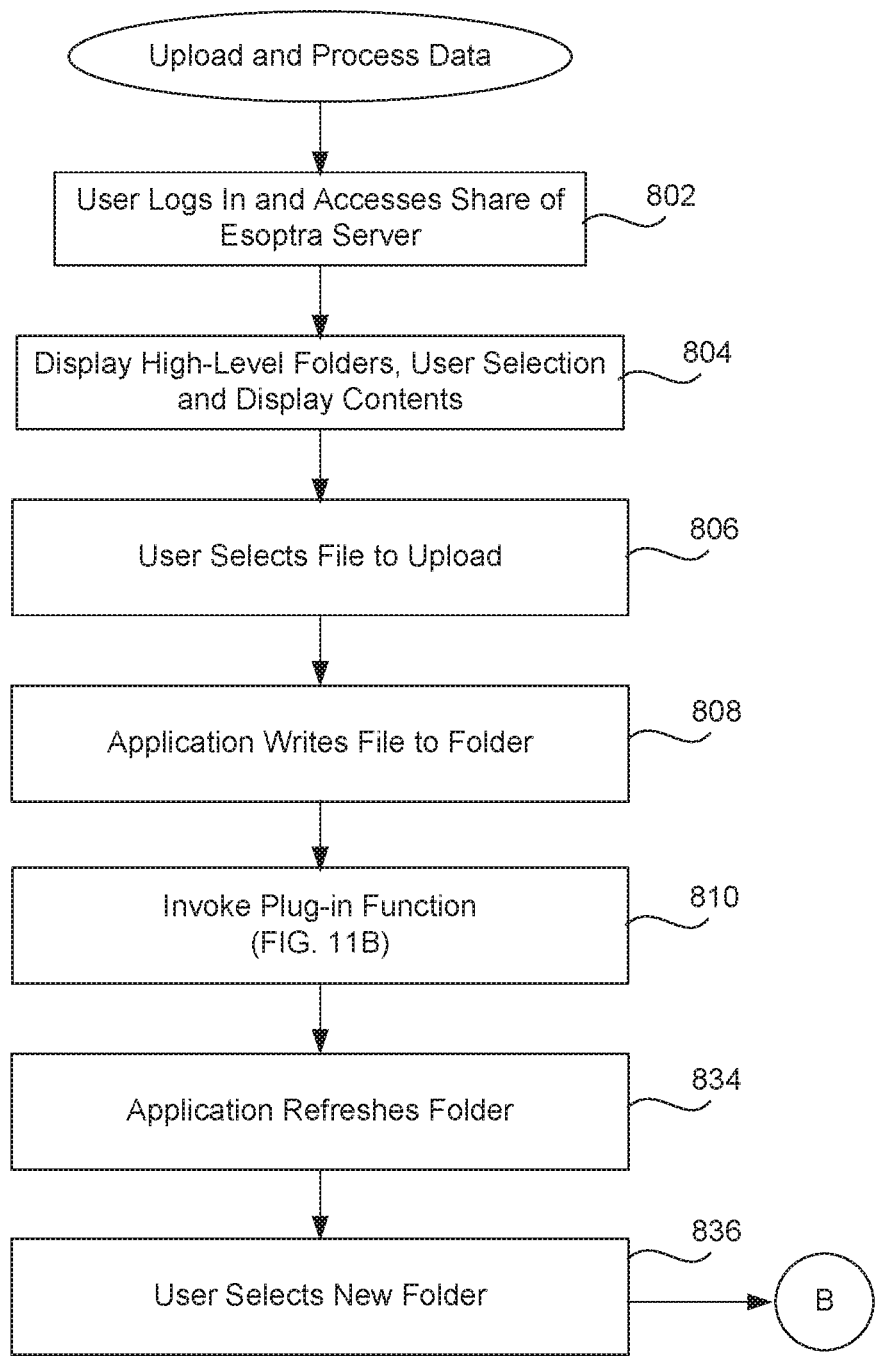
FIGS. 11A-11C are a flow diagram describing one embodiment by which a plug-in function is used to upload data and then process that data.
Figure 11B:
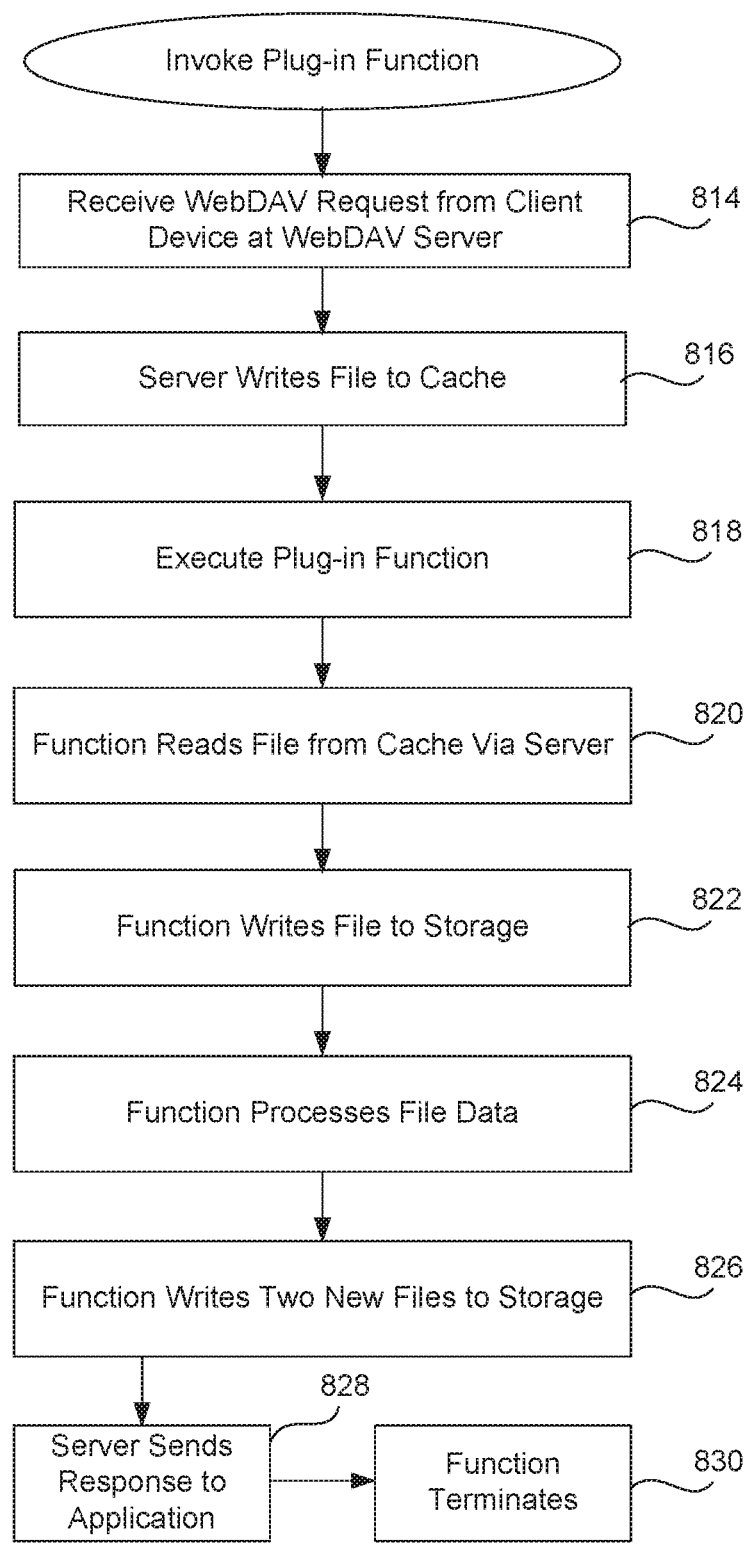
Figure 11C:
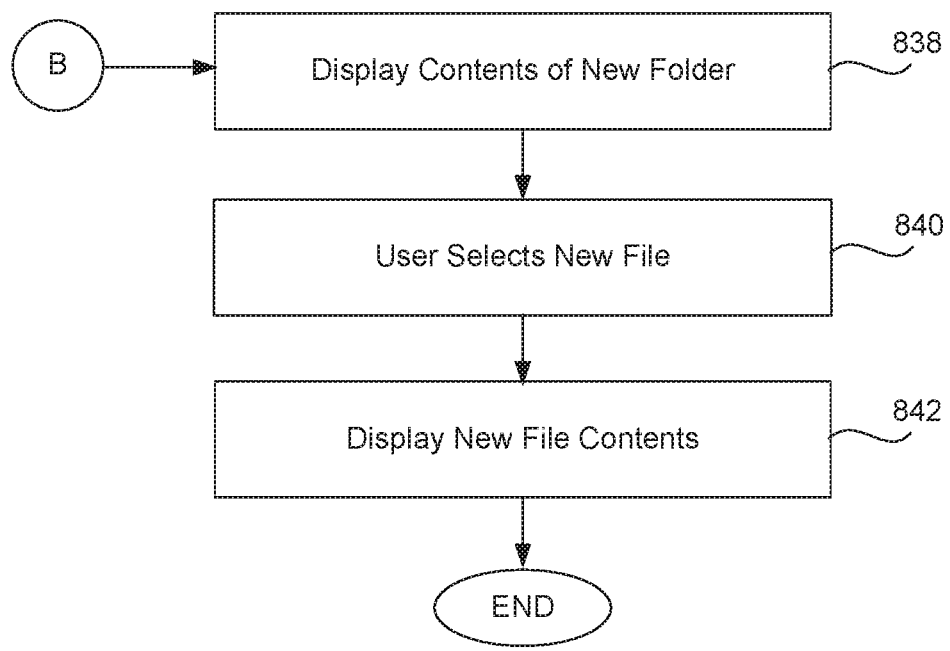

FIGS. 11A-11C are a flow diagram describing one embodiment by which a plug-in function is used to upload data and then process that data. In this example, a plug-in function "Words" has previously been created, stored in repository 234, and has been deployed within server computer 132 as previously described. The function Words presents a folder to the user that, when a text file is uploaded to that folder, the function stores that text file, calculates a word frequency count and creates two new files with the results. As mentioned, one advantage of the present invention is that, as far as the user knows, all he or she is doing is opening folders and adding files; the user is unaware that the plug-in function is actually executing behind-the-scenes, creating folders and files on the fly, and displaying data to the user in real-time. While it appears to the user that certain files inside of a folder exist, these files are not created until the user adds a file and the plug-in function executes.

FIGS. 12A-12F illustrate an end-user computing device 242-246 that a user is using to access the plug-in function, add, retrieve and display data. In this example, the computing device is a tablet computer, although it could be any of a variety of end-user computing devices. In fact, the device may be a computer 248 in which an application is using a REST interface to interact with a server 150 in order to navigate, upload, retrieve and display the data below described, in which case the actions attributed to the user below may be performed by the application. And, although the below description describes the user using a finger to make selections on a touchscreen, any other suitable input device may be used such as computer mouse, stylus, track pad, etc.

In a first step 802 the user logs in and access a share of server 150 as has been described above in steps 702-704. Although this example illustrates navigation using the WebDAV Nav+ application, a standard browser on a computer may also be used to perform the navigation. In step 804 the high-level folders (representing the plug-in functions) of the share are displayed to the user, the user selects one of those folders, and the contents of that folder are displayed. This step may be performed as previously described in steps 706-712 with the following modifications.

Figure 12B:
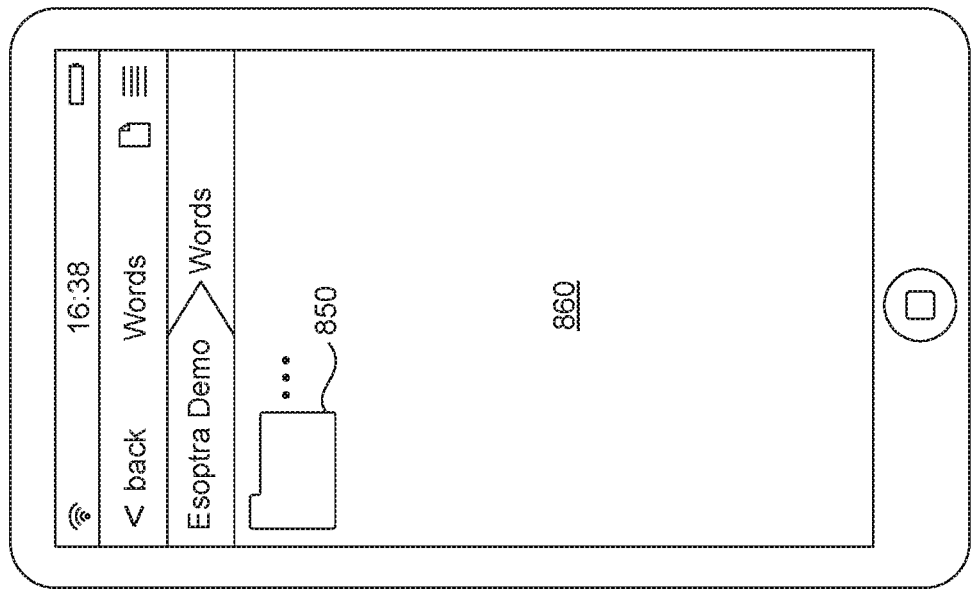
FIG. 12B illustrates the tablet after the user has tapped an icon, the plug-in function is executed, and has returned the contents of that folder.
Figure 12A:
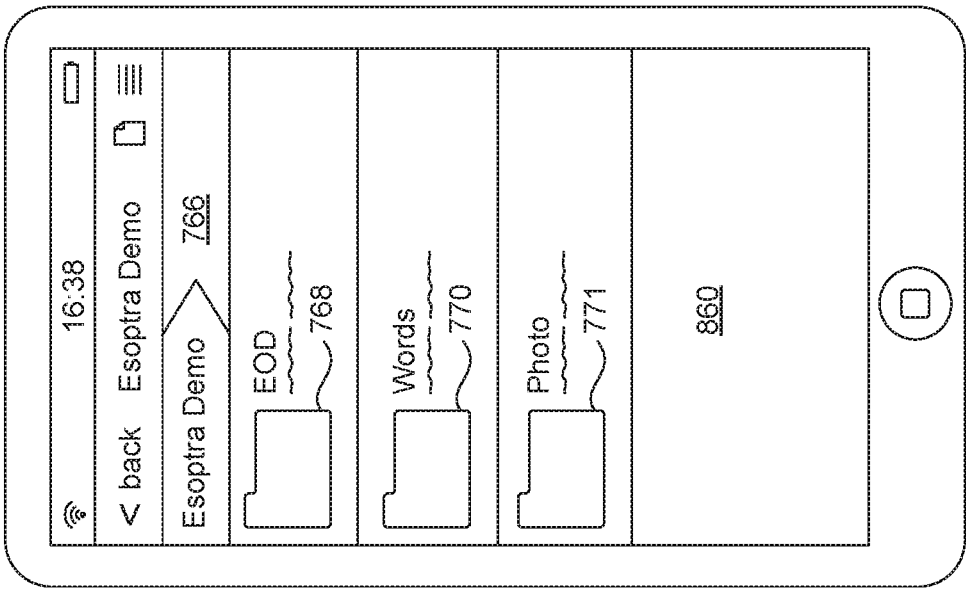
FIG. 12A illustrates the tablet computer after the display of the high-level folders and before the user has selected one of the folders.

FIG. 12A illustrates tablet computer 860 after the display of the high-level folders and before the user has selected one of the folders. Shown is the EOD folder 768, the Words folder 770 and the Photo folder 771 representing respective plug-in functions. FIG. 12B illustrates tablet 860 after the user has tapped icon 770, the plug-in function is executed, and has returned the contents of that folder. In this example, the folder at this point is empty; icon 850 represents the parent folder and the ability to jump up one level in the folder hierarchy. In this example a file will be uploaded to folder 770 that has just been opened. It is not necessary, however, to open the folder before uploading the file, although an open folder provides context.

Figure 12D:
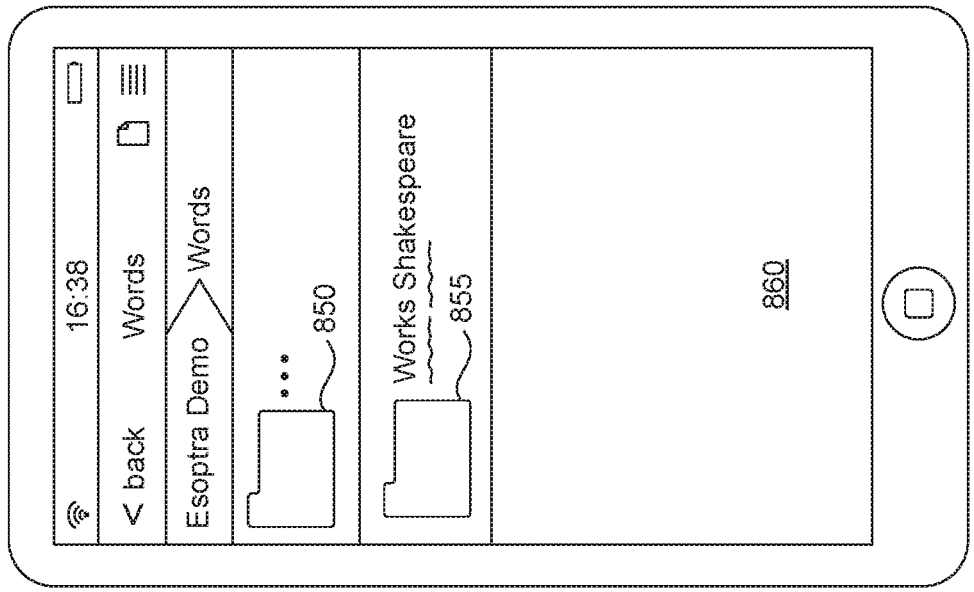
FIG. 12D illustrates the tablet after the refresh request and shows that the "Words" folder now includes the new folder "Works Shakespeare" that the plug-in function had created.
Figure 12C:
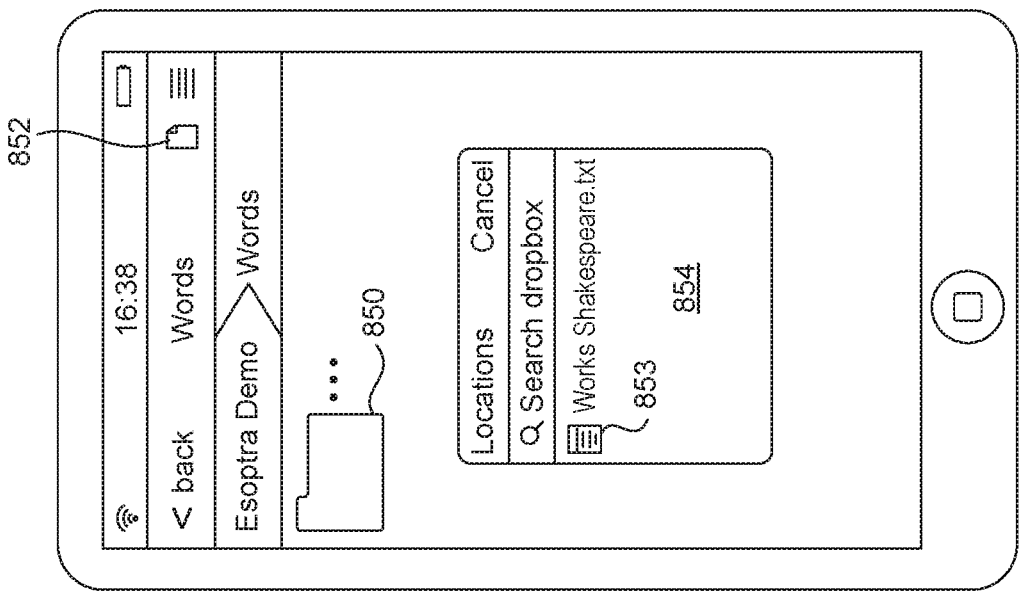
FIG. 12C illustrates how in step 806 a user selects a file to upload into a folder.

FIG. 12C illustrates how in step 806 a user selects a file to upload into folder 770. Selection of the file may be performed in different ways, such as by using a standard browser to navigate to a local file to be uploaded, clicking on or dragging a file, or by using a dialog box found within any browser or operating system. The file may be local to the tablet computer or may come from any remote server. In this example, the user selects icon 852 in order to choose a particular service for selecting a remote file (such as iCloud Drive, Google Drive, One Drive, Dropbox, etc., although that window is not shown) and has selected the Dropbox service resulting in dialog box 854 appearing on the screen. In this example, the only file within the Dropbox account is the file "Works Shakespeare.txt" 853 which the user selects using finger, mouse, stylus etc.

Once selected, the application being used to navigate on the screen (such as a standard browser or the WebDAV Nav+ application in this example) writes the file to the Words folder 770 in step 808. The application reads the contents of the file, and triggers a "put" operation for those contents to the relevant pathname which is "Words/Works Shakespeare.txt". The pathname and the "put" command are then received by server 150 and directed to the plug-in function "Words" in step 810.

FIG. 11B is a flow diagram describing how a plug-in function is invoked when a user selects a file to be uploaded using the user interface with the "put" command or similar. When a user puts a file into a folder (e.g., by selecting, dragging, using a dialog box, etc.), the user expects that the file will be moved or written to that folder, thus, in this example the command "put" will be sent. Accordingly, the client device 860 via its WebDAV client generates a WebDAV request in step 814. This is a request to place file 853 into the Words folder; the request includes the "put" command along with the above pathname, and the actual contents of the file. The request is received at the WebDAV module 304 of server 150 and is directed to share 430 which includes the plug-in function "Words." And, although it is described herein that the user is performing actions on the user interface in order to generate the above command and path, in fact, at a minimum what is needed for the request is the path that includes any folders and file names, and the relevant command such as "put," "get," "list," etc. It is not strictly necessary that the user perform certain actions.

Next, in step 816 the server writes (using front-side caching) the received file to its cache 210 for use in a later request (such as in step 818). The file will not actually exist in the cache until uploaded by the user. In step 818 the plug-in function "Words" begins execution and reads the file from the cache via the server in step 820 using standard input. In step 822 the function optionally writes the uploaded file to a storage location of its choice. As shown in FIG. 2, the developer of the plug-in function may write to any storage location 40-48 (and others) desired as the developer is the one writing the code. In this example, the developer also wishes to place the file inside of a new folder ("Works Shakespeare") which will also contain two new files, and thus writes the file to storage inside of the new folder. It is a developer choice to write the file to this new folder; the file will thus exist in the cache (using back-side caching, plug-in function storage) at this point.

Of course, the developer has complete discretion as to how he or she wishes to handle storage of this file, including nesting it within any number of folders, creating any number of new folders and new files; the developer may simply write the file to disk without placing it inside of the new folder or without creating any new files.

In step 824 the plug-in function processes the data in the file in order to create a frequency analysis of all words, and creates two new files: a CSV file and a PDF file, each containing a frequency count of each word within the original file. In step 826 the function then writes these two new files to the storage location inside of the new folder where the original text file 853 was also stored. The developer may also choose to write these two new files to different locations. In this example, the developer of the plug-in function has chosen to perform processing of the original file and creating two new files upon writing the original file. Of course, creating the two new files could occur at another time chosen by the developer, for example, upon read, when a user selects a file to be displayed (as occurred in steps 746-754). Typically, processing of an original file or data to create a new file may occur after the original file is written or when the user requests reading the original file. In the example of FIGS. 10A-10F, the developer has chosen to generate the contents of the file only when the user requests the file because the data changes daily. In the current example, the frequency counts in the new files will not change, so it is appropriate to create those two new files when the original file is written.

Next, in step 828 the server sends a response to the application of step 808 indicating that the writing was successful. Typically, this response consists of a code indicating success or a code indicating a particular error that occurred. In step 830 the plug-in function terminates as it has performed its tasks. Returning now to FIG. 11A, in step 834 the application (either the WebDAV Nav+ application or browser) refreshes the folder "Words" by triggering a request which includes the pathname of that folder and the command "list." Typically, a browser will implement a "list" request after a "put" request in order to refresh the current folder, although each browser may implement this functionality differently. Step 834 is performed as described in FIG. 9B with the path and "list" command.

FIG. 12D illustrates tablet 860 after the refresh request and shows that the "Words" folder now includes the new folder "Works Shakespeare" 855 that the plug-in function had created. Note that a user would normally only expect that the file 853 would appear, but in this example, the plug-in function has not only written that file, but also it has created two new files and placed them all in a new folder 855. Next, in step 836 the user desires to view the results and selects folder 855 on the device. This action triggers another request that includes the pathname "Words/Works Shakespeare" and the "list" command, as explained in FIG. 9B, resulting in step 838 which displays the contents of this new folder on device 860.

Figure 12F:
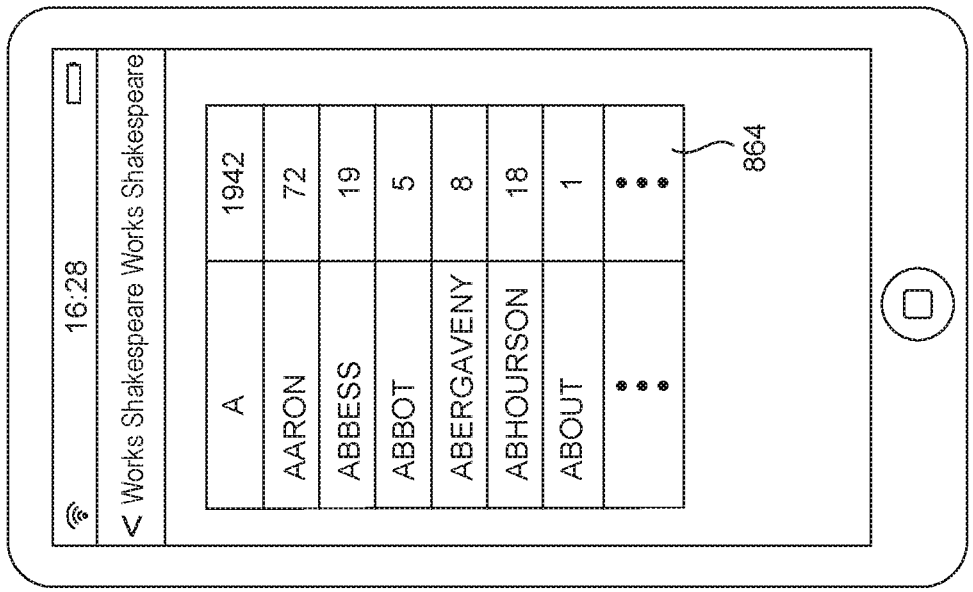
FIG. 12F shows a partial listing of the frequency count of that file.
Figure 12E:
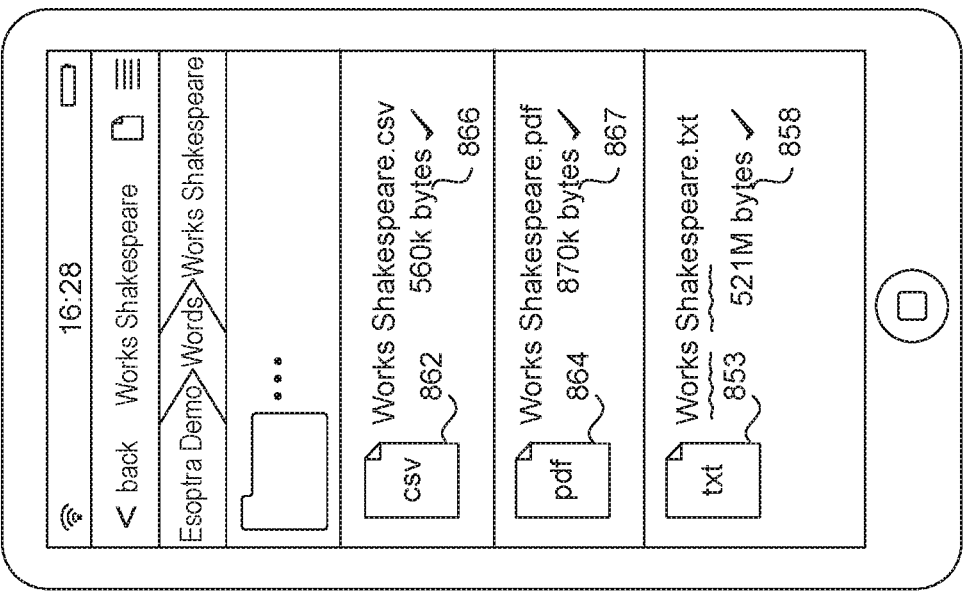
FIG. 12E illustrates the display of the device after steps 836 and 838.

FIG. 12E illustrates the display of device 860 after steps 836 and 838. Shown are the three files that the plug-in function has stored in a storage location, file 853 which is the original uploaded file, file 862 which is the frequency count in CSV format, and file 864 which is the frequency count in PDF format. Note at 866 and 867 that both of these files have specific sizes, meaning that they actually do exist and have been written to disk, unlike the example of FIG. 10E in which the file names of the files appear, but the file contents did not actually exist until the user selected one of the files. The developer may also choose to only create these files 862-864 when the files are selected by the user.

Next, in step 840, the user desires to view file 864 and selects that file using his or her finger. Upon that selection, another request is triggered that includes the pathname "Words/Works Shakespeare/Works Shakespeare.pdf" and the "get" command, as explained in FIG. 9B, resulting in step 842 which displays the contents of that new file on device 860. FIG. 12F shows a partial listing of the frequency count of that file.

Other Read Data and Write Data Examples Using a Plug-in Function

Other examples of reading data using a plug-in function include: creating an Excel file, in whole or in part, from SQL database queries; creating a presentation document from assembled fragments, images and text searches; and assembling a video to be streamed from a static mp4 file. Another example of using a plug-in function to write data allows information to be added to file. For example, when a file representing an invoice is dragged, dropped (or otherwise uploaded) into a folder on a computing device that represents a plug-in function (such as folder 770), the plug-in function automatically adds a timestamp to that file. The timestamp may be inserted directly into the file or added as metadata; the file is then stored as an object into an object store and the stored objects may then later be searched by time and date. The plug-in function may also convert the invoice to a different format, analyze its data, store invoices into different folders by category, etc.

Providing Input to a Plug-in Function

As mentioned and shown above, various embodiments of the present invention make use of the traditional file/folder user interface to provide a simplistic and familiar interface for the user, as well as to relieve the developer of a plug-in function from having to implement a particular user interface. Use of the file/folder interface, though, does not provide much opportunity for a user to input arguments to a plug-in function.

Accordingly, additional embodiments do allow a user to provide arguments to the plug-in function. One technique previously described with respect to FIG. 8B is to start a plug-in function in daemon mode, allowing the function to run continuously, which provides a micro Web server specific to the plug-in function that implements a user interface just for that plug-in function. Use of the daemon mode also allows a plug-in function to maintain a continuous connection to a database which also has advantages. Another technique (described immediately below) is to create a folder having a name which is actually an argument to a plug-in function. Allowing the user to create folders with functionally significant names is an important default user interface element of the invention that enhances the functionality of a plug-in function and allows an end user to customize his or her environment.

Figure 13:
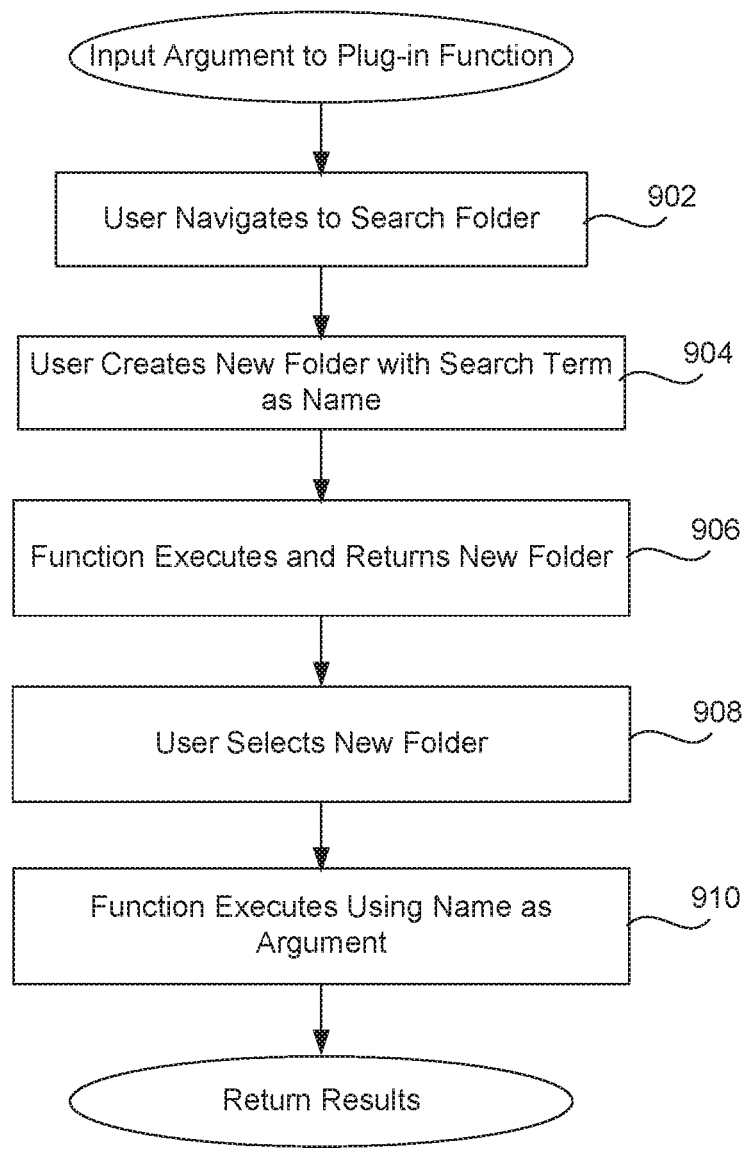
FIG. 13 is a flow diagram describing one embodiment by which an argument is passed to a plug-in function via the name of a folder.

FIG. 13 is a flow diagram describing one embodiment by which an argument is passed to a plug-in function via the name of a folder. In this example, a plug-in function "Photo" has previously been created, stored in repository 234, and has been deployed within server computer 132 as previously described. The function Photo presents a folder to the user into which any photographs, videos, etc., may be uploaded, tagged, stored, and made available for later searching, downloading and display. As mentioned, one advantage of the present invention is that, as far as the user knows, all he or she is doing is uploading photographs, opening folders, creating folders, etc., the user is unaware that the plug-in function is actually executing behind-the-scenes, tagging photographs, storing them, creating search terms and searching for photographs. While it appears to the user that certain photographs actually exist inside of a particular folder, the photographs are not searched for and found until the user selects the folder and the photographs are not retrieved until the user selects the photograph.

FIGS. 14A-14D illustrate any end-user computing device 242-246 used to access the plug-in function, add, retrieve and display data. In this example, the computing device is a mobile telephone, although it could be any of a variety of end-user computing devices. The user has taken a photograph in the town of Geel, Belgium with his or her telephone 760 and desires to upload that photograph to storage in order to have it available for later retrieval. Of course, it is possible that the user has taken hundreds or thousands (or more) of photographs that have been uploaded, or that any number of other users will also upload photographs using the Photo function to be stored in the same storage location for later retrieval by any user.

Figure 14B:
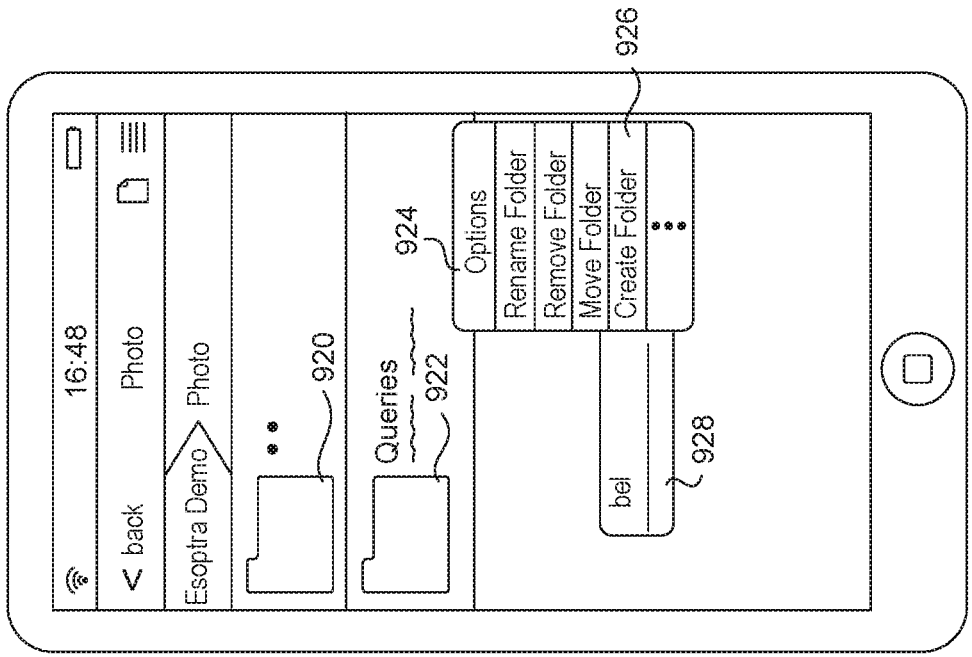
FIG. 14B illustrates how device 760 appears after the folder "Photo" has been selected; shown is a folder 920 (used to go up one level) and a child folder "Queries" 922.
Figure 14A:
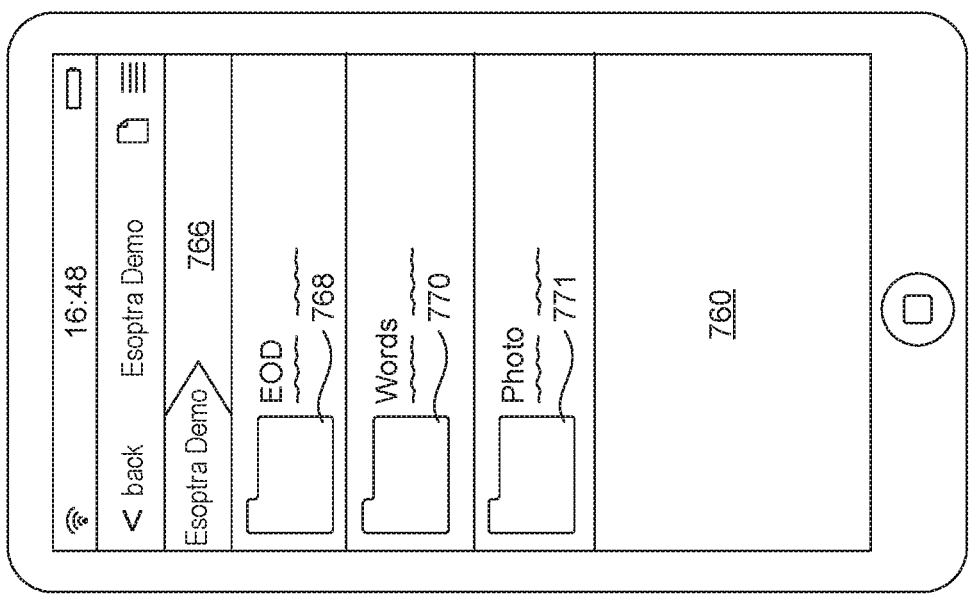
FIG. 14A illustrates one view of a mobile telephone 760 showing functions 768, 770 and 771 available for use by a user.

FIG. 14A illustrates one view of a mobile telephone 760 showing functions 768, 770 and 771 available for use by a user. Function Photo 771 appears to the user as a familiar folder into which may be dragged, dropped, uploaded, etc., any number of photos, videos or similar files. Of course, in a different embodiment, any type of digital object (such as a document) may be placed into folder 771 for later retrieval using the techniques discussed herein. The user need not be aware that as he or she places photographs into the folder and then later searches for them, that there is a plug-in function executing in the background. Any of a variety of techniques may be used by the user to place a photograph into folder 771 including dragging, dropping, selecting, etc., using the standard user interface provided by device 760 or by another computing device. In one specific embodiment, a user may implement steps 802-824 of FIG. 11A in order to log in, display the high-level folders, select folder 771, and upload the photograph from Geel into that folder. The photograph may originate from the user's telephone, from an archive such as Dropbox, or from any other remote location.

Steps 802-824 may be modified for the purposes of this example. The user may first open folder 771 (as has been described above) before placing the photograph into it, or may simply drag or otherwise place a photograph into folder 771 as it is shown in FIG. 14A. In particular, step 824 in which the plug-in function "Photo" processes the incoming photograph is modified as follows. The function receives the photograph and extracts metadata such as location (e.g., X-Y coordinates, longitude, latitude, etc.) and a timestamp. Next, the function sends this location data to a backend service 46 (such as a Google location service) which will take the location data and return a string indicating where the photograph was taken, e.g., "Geel, Belgium." The function then takes this location string and stores it as metadata along with the photograph in an object store 220. The photograph has now been stored and is available for searching and retrieval as will now be described. Of course, the plug-in function "Photo" may take any other processing steps desired by the developer and may store many thousands (if not more) photographs in the same manner And, any other variety of metadata produced or retrieved by the plug-in function may be stored along with a photograph or other digital object.

At a later time, the user (or any other user) desires to search through all the photographs that have been stored by the function "Photo" using a search term indicating where the photograph was taken. Accordingly, the user takes steps to log in and view the folders (i.e., functions) available on his device such as has been described in steps 702-706 or 802-804. FIG. 14A illustrates how the user's device 760 appears showing the folder Photo 771.

In step 902 of FIG. 13 the user navigates to the appropriate folder within folder Photo 771 in order to provide a search term to find photographs. The user selects folder 771 in FIG. 14A and its subfolders will be displayed in a similar manner as has been described above in steps 708-712. FIG. 14B illustrates how device 760 appears after the folder "Photo" has been selected; shown is a folder 920 (used to go up one level) and a child folder "Queries" 922. The developer of the function has created the folder "Queries" to permanently reside within the folder "Photo" and to hold subfolders whose names will be used as search terms. The plug-in function "Photo" knows (rather, the developer knows) that the name of any such subfolder will actually be a search term used to find photographs. Of course, the developer may also dispense with the folder "Queries" and may allow a user to directly create subfolders in the folder "Photo."

Next, in step 904, the user decides to perform a search through all the photographs saved to storage to find any photographs that have been taken in Belgium. Accordingly, the user opens the Options drop-down menu 924 in order to select the "Create Folder" option 926. A new folder may be created on a particular computing device using a variety of standard user interface techniques depending upon the device, the operating system and the presentation application. The user may click a button within a browser, may perform a "right-click" within an operating system or on a disk drive icon, within a folder, etc. In this example, the user selects an option within the WebDAV Nav+ application in order to view a menu 924. The user may also choose to open the "Queries" folder before creating a new folder within it, although in this example the context dictates that any new folder will be created within folder 922.

Once the user selects option 926 a blank sub-window 928 opens allowing the user to enter a search term. The user types in the characters "bel" as the name of the new subfolder which will be used as a search term in all of the stored photographs. The user then hits "return" or otherwise ends the input and the "Create Folder" command and the name "bel" are sent to the plug-in function "Photo."

Figure 14D:
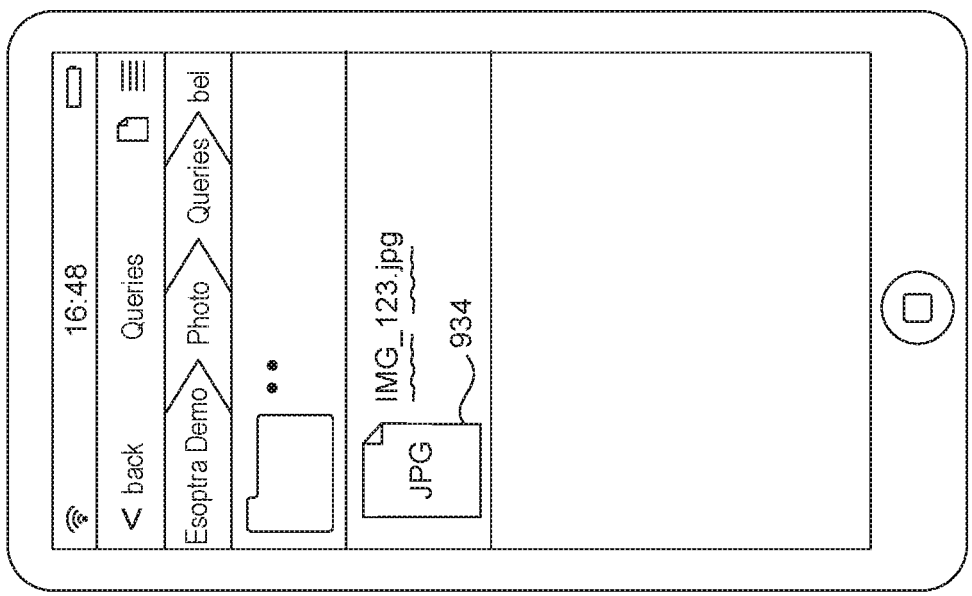
FIG. 14D illustrate any end-user computing device 242-246 used to access the plug-in function, add, retrieve and display data.
Figure 14C:
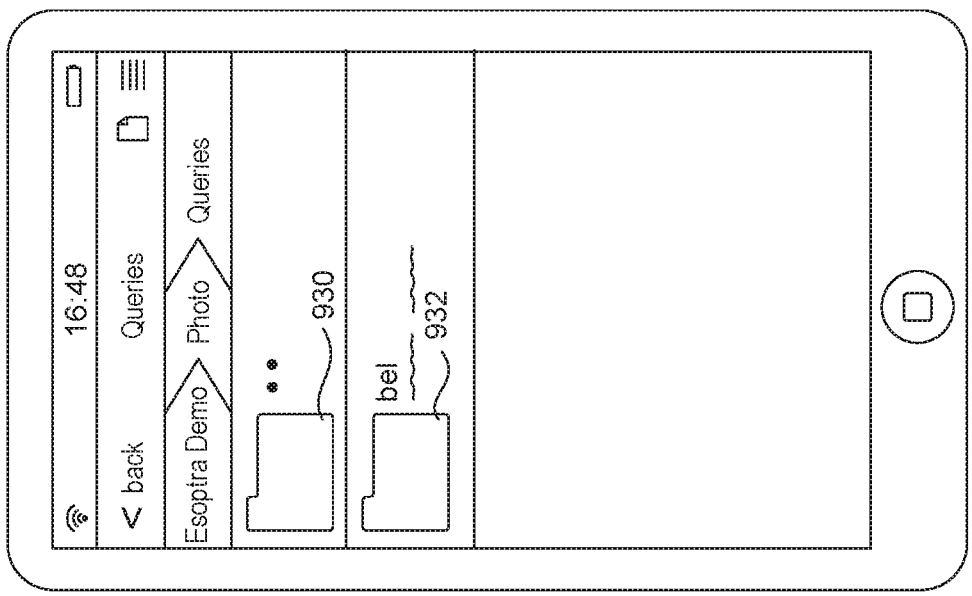
FIG. 14C illustrates how device 760 now appears, showing new subfolder "bel" 932.

In a similar manner in which the "list" command along with a path was sent to a plug-in function in steps 710, 716-732 and 712, in step 906 the client device sends the "mkdir" command along with the path "Photo/Queries/bel" to the plug-in function which interprets this command and path as a request to create a new folder under "Queries" named "bel". The function also knows that the string "bel" is also to be used as an argument for searching. The response generated by the server is thus a listing of this new subfolder under "Queries." FIG. 14C illustrates how device 760 now appears, showing new subfolder "bel" 932. As far as the user is concerned, subfolder "bel" now contains all photographs previously stored that were taken in a location that includes the string "bel." In one specific embodiment, though, all that the plug-in function has done is to have created the subfolder "bel" and stored it in its cache. The subfolder does not yet contain any photographs because the user has not selected or otherwise opened the subfolder yet. In another embodiment, however, this subfolder may be populated with the appropriate photographs in this step when the subfolder is created, as is described below. For example, the plug-in function searches for and retrieves the photographs when the subfolder "bel" is created (before the user opens the subfolder), and stores the photographs into its cache. This embodiment is less efficient because it may retrieve photographs that the user will not open.

In step 908 the user desires to see all photographs which were taken in Belgium and thus selects folder 932. This folder is opened, the plug-in function again executes in step 910, and a result is returned in a similar manner as has been described above with respect to steps 740-744, except processing occurs in a manner unique to the plug-in function "Photo" and using the argument "bel". When the function is executed and it receives the path "Photo/Queries/bel" and the command "list," it knows that it must return names of all photographs in its storage which have a metadata location string that includes the search term "bel", thus using the name of the subfolder as an argument. The function may return names of photographs, thumbnails, the entire JPEG file, etc., depending upon how the developer has programmed the function.

Preferably, the function returns enough information to present a list of names but it may also store some internal information such as a content address (UUID—universally unique identifier) or URL of the photograph in order to quickly retrieve the photograph later when necessary. Thus, a plug-in function can store intermediate (meta) information about the photograph, including a thumbnail, yet the returned list need only include basic properties such as name, size, modification date or POSIX mode flags, saving time and resources. In a variation, it is possible for the function to return the actual photographs in response to the "bel" argument, depending on the developer of the function, but this is not required.

Thus, the function will return the name of the photograph taken in Geel, Belgium described above, as well as any other photograph names containing that search term (including photographs taken in Belarus). The user could search exclusively for photographs from Belgium by naming the subfolder "Belgium". The flow ends when the photograph name is returned to the client device. FIG. 14D illustrates how device 760 appears once the photograph name has been returned. Although not shown, the user may now at this point select photograph 934 to be downloaded or opened for display using any file opening technique, such as those discussed above with respect to FIG. 10E or 12E. Thus, the photograph need not be downloaded to the user device until actually selected, at which point a "get" is performed.

Of course, there are many other situations where a user creates a folder (or document, for that matter) and gives it a name which will be used functionally as metadata further down in the use and the execution of the plug-in function. For example, in a function "iMov' which uses a public data interface to the well-known IMDB international movie database, a similar mechanism as described in FIGS. 13 and 14 is used. When a user creates a folder named "Bear," a list will be shown inside of all movies having the text string "Bear" in their title. Or, a function with a folder having a name "PDF" will convert files dropped into it into PDF files, or convert output into PDF files, thus using "PDF" as an argument to the plug-in function.

In another technique we allow the end-user creation of folders which have associated metadata properties (stored in a hidden file inside of the folder in question) under the form of a key/value pair. Within a plug-in function, "Vacations," for example, a user creates a folder named "2016" (sending the path "/vacations/2016" and command "mkdir," using steps 902-906). In this example, the function "Vacations" is programmed to create new folders as directed by a user, to accept photographs dragged into a folder by a user, add a metadata property to a photograph, and to then store that photograph along with its metadata property to an object store.

When the new folder "2016" is returned to the user, a micro Web server is created as in steps 644-652, and the user is allowed to enter a value for the metadata property "vacation type" for that new folder, such as "beach," i.e., the key/value pair is "vacation type?/beach." The function is thus provided with the value "beach" associated with the folder "2016." Therefore, when any object (e.g., a photograph) is uploaded (or dragged) into that folder, the object is "stamped" with the value "beach," is transmitted to an object storage system (e.g., Caringo Swarm object store) and stored there, using "vacation type"="beach" as a metadata header for that object. The function does not store the objects in the folder "Vacations" (i.e., opening the folder shows nothing); the objects are sent directly to storage. Accordingly, that metadata property can then be used for querying objects in the object store. For example, the function "Photos" as described in FIG. 13 or similar may be used to input a search string, and the function searches the metadata header of objects in the object store using that search string.

In a variation on writing objects, the function "Vacations" need not run as a daemon as in FIG. 8B, and the user need not interact with a micro Web server in order to provide the value "beach" for the metadata property. The function "Vacations" is programmed to use the name of any created subfolder as the metadata property value that is "stamped" onto any added photograph. Thus, the user creates a subfolder "beach" under "Vacations" and the key "vacation type"={ParentFolder} as programmed by the function. Upon uploading a photograph into the folder "beach," the metadata key/value pair associated with that photograph will be "beach," and the photograph stored in Caringo Swarm will then have "vacation type"="beach" injected as a key/value metadata pair.

Any number of users may upload tagged photographs in this way to an object store, and any number of users may search for photographs in the object store using plug-in functions. The invention scales easily for any number of users.

In a similar example, a plug-in function allows users to drop text documents into a folder with a case name or number. Each document is automatically "stamped" with that name or number and stored in an object store. Retrieval of any document is performed by using a plug-in function to which is provided a search string as a folder name (as in FIG. 13) or a plug-in function in daemon mode having a micro Web server for minimal user input.

Caching Subsystem

Another embodiment of the invention provides a caching subsystem which provides (from a plug-in function developer perspective) what seems to be infinite storage, thus relieving a developer from having to worry about filling up a disk, as disk capacity is allocated dynamically by the caching subsystem.

A disk becoming full is often a difficult problem for administrators (and developers). Typically, a local folder on disk has a limited of amount of byte-space, i.e., space for file data, and a limited amount of inode-space, which limits the number of files and folders (object count limit) that can be stored on a disk. Applications usually have little option but to fail when the disk is full. Disk capacity (like CPU, memory and bandwidth) are precious resources that an administrator needs to carefully manage or its user applications will stop functioning. In most cases when a disk is full an application displays a message to the user. In some cases, the application (or server) simply crashes. Depending upon the host, an administrator has few options to deal with this, none being optimal; e.g., Linux LVM allows for extending a file system across multiple disks, but this only works when one has spare disks and extra server space in which to put these disks. In many cases an expensive disk array and iSCSI are used to solve the problem. When one is executing a service (i.e., a server) where an unpredictable amount of data is being collected and stored, this problem becomes either extremely problematic, a huge expense, or often both. An object store is a much more scalable, easy to manage (grow) and cost-effective storage resource but it does not have a file system interface.

Our solution is to use the local disk 210 (e.g., a fast solid-state disk) as a buffer between an application (plug-in function or server 150) and object storage and to present a file system interface to the plug-in function while actually storing files using object storage techniques. It is the capacity of the back-end object store that ultimately determines the capacity of the file system, but our implementation makes the capacity of the file system available to the developer as large as the operating system allows, which is infinite for all practical purposes. Of course, an administrator still must manage the capacity and usage of the object store but this management is much easier done and much more cost effective than actual server storage or iSCSI arrays of disks.

In particular, we implement a file system using FUSE (an open source library) inside of server 150 and present that file system to plug-in function processes that will simply see a local folder with three known subfolders as described below. FUSE implements a Linux file system; other file systems and interfaces may also be used. A plug-in function uses FUSE indirectly and transparently; a developer does not need to know anything about FUSE.

All file I/O from these functions is handled via proprietary caching subsystem code as we write to the local disk or read from the local disk. Because we access the underlying local disk the caching subsystem module 1002 can also manage its capacity in order to see how full it is. When we need more space module 1002 begins "evicting" (swapping out) files, making sure that a copy of each file still resides in the object store 220, such that we can bring a file back when needed, i.e., when a file is requested via FUSE that is not present in the cache 210. A plug-in function is unaware of this file management. Thus, because we evict least-recently used files from the cache, we can make it appear to the function that its available storage is infinitely large.

This embodiment helps to provide infinite storage for each plug-in function, known as back-side caching; a second embodiment used by server 150 provides a unique view per user, also known as front-side caching. Both front-side and back-side caching are applications that can make use of this "infinite" storage. They both use a portion of the local disk as a cache but their files may ultimately be stored in the remote object store 220. The main difference is that files stored via back-side caching will typically reside longer in the cache than files stored via front-side caching. Back-side files are stored as determined by the plug-in function developer, and may be moved to the object store as needed, as described below. Front-side files may have an expiration time, e.g., 24 hours (as determined by the developer); when a front-side file has an expiration time and is not yet expired but space is needed, such a file is temporarily swapped out to object storage. If a front-side file has already expired, it is not stored in the object store when evicted.

Caching Subsystem Block Diagrams

Figure 15:
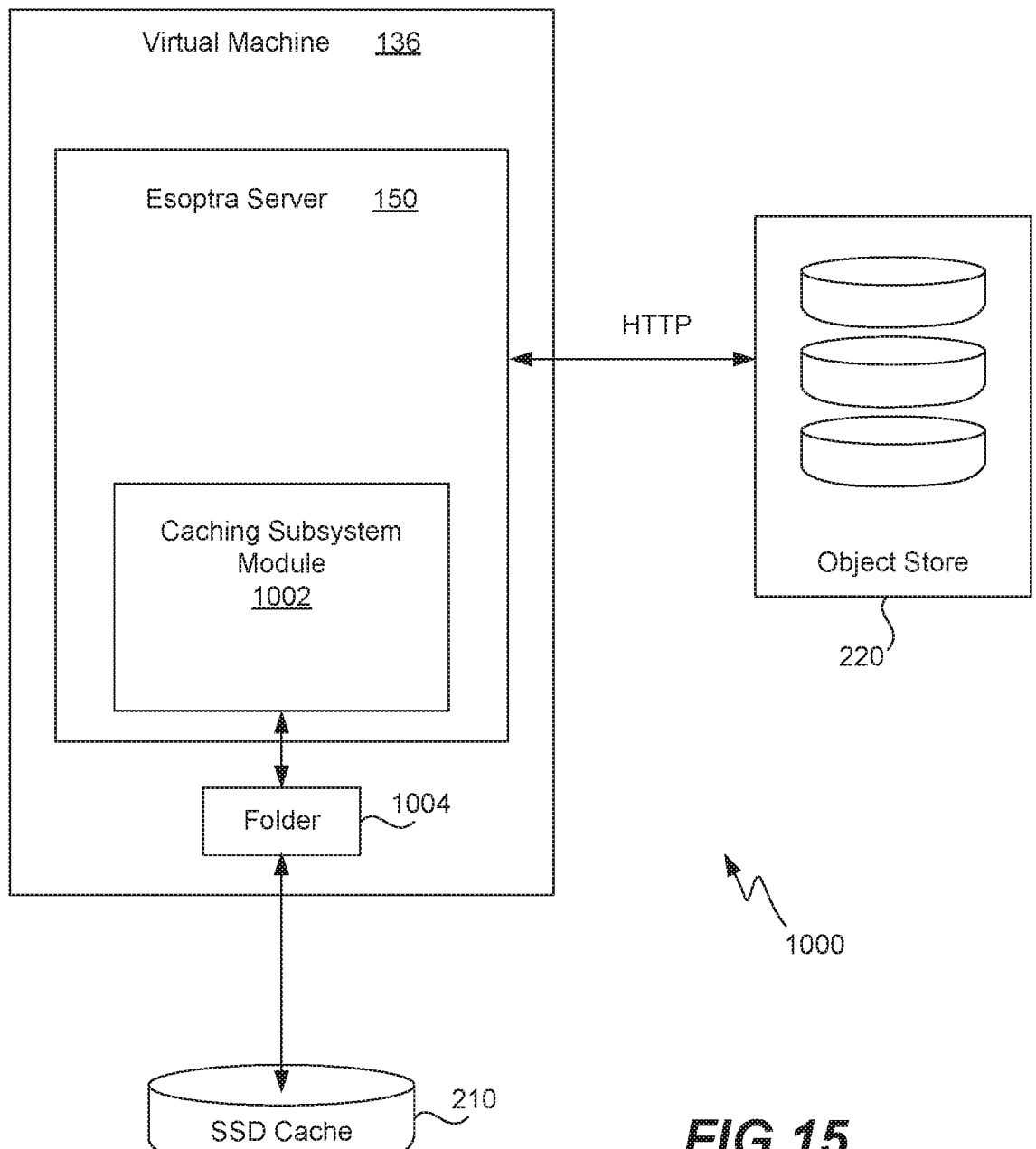
FIG. 15 is a block diagram of the caching subsystem.

FIG. 15 is a block diagram of the caching subsystem 1000. Shown are the virtual machine 136, server 150, cache 210 and object store 220 as described earlier. The local, directly-attached disk 210 provides for short term, temporary file storage while the network-attached object storage 220 provides for long-term persistent storage of objects in a so-called "bucket." Generally, a cache is limited in capacity while, for practical purposes, a bucket in object storage is seemingly infinite capacity from the perspective of a plug-in function. A cache is fast and expensive while object storage is slow but cost effective. Caching subsystem module 1002 is the software code that implements the functionality described below; it has an API by which other server modules read or write files and manage folders. A plug-in function, for example, uses the API (such as POSIX) which then allows the plug-in function to store files in a hierarchical file system on a local or remote disk. Local folder 1004 is a regular folder on a file system present on disk 210 that is directly attached to the virtual machine host. The disk technology may be of type SSD or equivalent for high speed I/O and low latency access.

Caching subsystem module 1002 subsumes caching module 324 and object storage module 328 of FIG. 4. As mentioned, caching module 324 makes use of FUSE open source software in order to implement a file system so that any plug-in function may make use of the file system in which to store files into cache 210. Using this file system, a plug-in function has access to two folders (in addition to a folder for temporary files) in the context of a particular user who is logged in. One folder is a user-specific folder into which the plug-in function may only write data for that particular user, while the other folder is function-specific folder that may be used by the plug-in function for any users. The advantage of the user-specific folder is that this provides a guarantee that the user's data will not be inadvertently overwritten. In one implementation, the file system is provided in a layer on top of the object store and the cache.

Because object storage module 328 and caching module 324 handle all management aspects of their respective data repositories, including keeping track of whether a particular disk or disks are becoming full, each plug-in function is provided with what appears to be infinite storage—from the perspective of the plug-in function. The developer of the plug-in function need not be concerned about keeping track of disk capacity and from his or her point of view, and may continue to store data infinitely. When more disk space is needed, either the object storage module or the caching module is responsible for allocating more disk space; the plug-in function need not perform this task.

Figure 16:
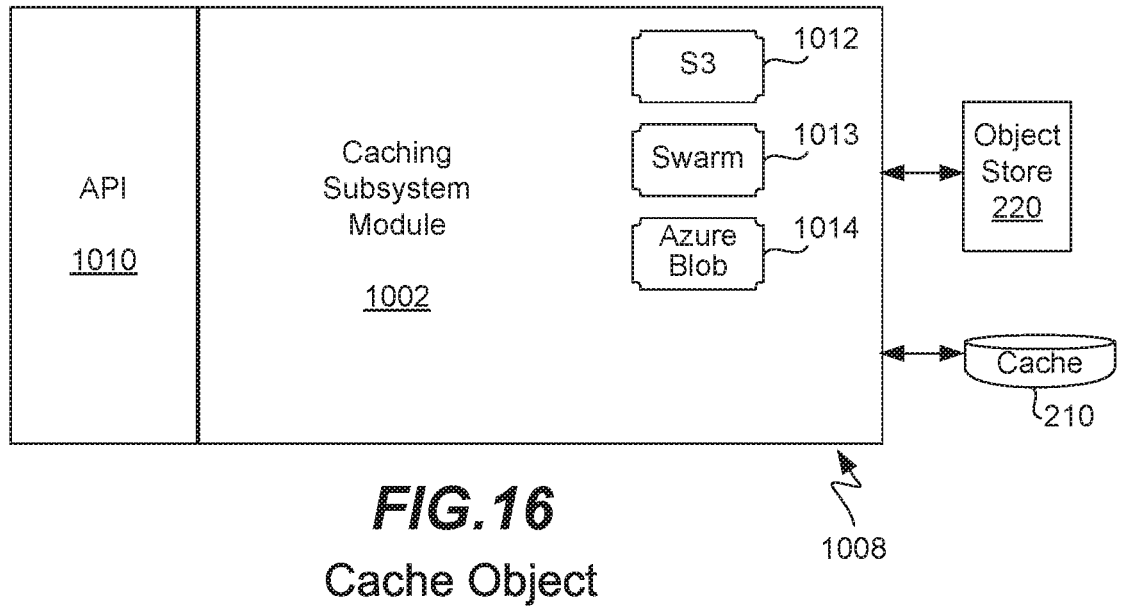
FIG. 16 shows a representation of an in-memory cache object used to implement the caching subsystem module.

FIG. 16 shows a representation of an in-memory cache object 1008 used to implement caching subsystem module 1002. The cache object (meaning an instantiated chunk of RAM in server memory corresponding to a class of type Cache) is configured with a local folder property and a back-end object store property. The in-memory cache object has a callable API 1010 for internal components to call and embeds one or more object storage proxy objects 1012, 1013 and 1014 that are clients of remote object storage systems, e.g., object store 220. There may be many such remote systems, but typically only one remote object storage system is made active at a time. The module supports various type of remote objects stores such as Amazon S3, Caringo Swarm or Azure Blob. The remote store implementations are abstract behind a store interface to facilitate cache implementation. Both front-side and back-side caching use an instance of the same cache object. When API 1010 is used to write file data, the cache object 1008 in turn writes the file data and related metadata to the local disk 210. As soon as that operation completes, the result of the operation (write or read) is returned to the caller. In the background the caching subsystem module writes new data to the remote object store as needed, as described below.

Server 150 uses front-side caching directly by calling API 1010 inline when processing user requests, unlike a plug-in function which uses back-side caching. The server is typically storing documents via front-side caching after being retrieved from a function (GET) or prior to going to a function (PUT). Requests are made by end-users and there is a front-side cache portion per end user reflecting the view that the user sees. Both front-side and back-side caching are implemented in the cache subsystem module and run inside the server process. Since plug-in function processes are distinct from the server process, we make back-side caching available via a file system (via the kernel and FUSE as described below). Front-side caching is accessed directly by the server and does not use the FUSE layer. Front-side caching sits in the path where we process HTTP GET/PUT requests. Back-side caching is used by a function via file I/O requests and is at the liberty of the developer.

Figure 17:
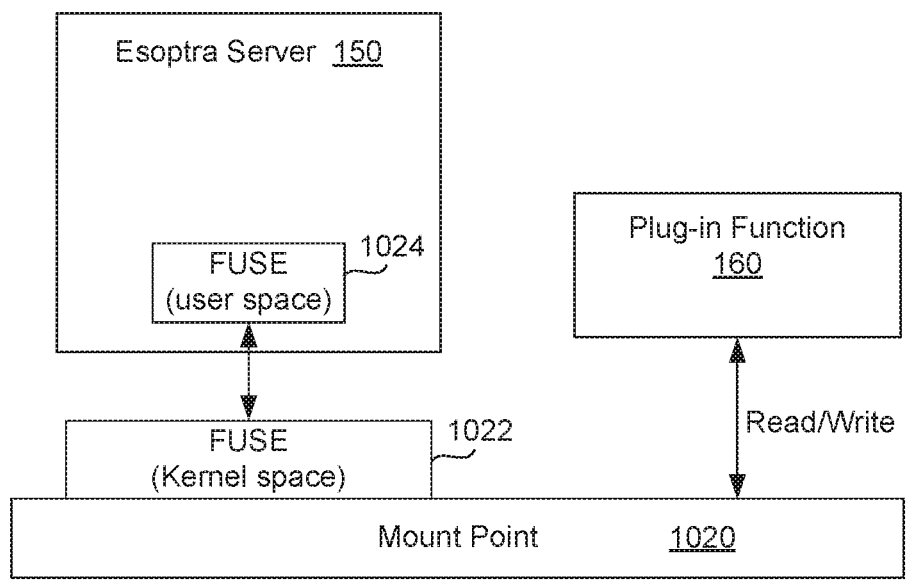
FIG. 17 is a block diagram of a back-side caching architecture.

FIG. 17 is a block diagram of a back-side caching architecture. Shown is server 150, function 160 and other components. As mentioned, the server and plug-in functions are distinct processes. While it is the server that provides for storage that a function can use, it does so via a mount point 1020 and thus via the kernel of the operating system. We use the FUSE (file system in user space) open source technology that is part of the Linux kernel and which allows server 150 to implement a true file system in its own process. FUSE includes a user space portion 1024 and a kernel space portion 1022.

To any plug-in function process 160, it looks as if it were given a set of folders that it can simply read from and write to. Yet, it is the server that will handle those read and write requests. Because the server handles all of these file system requests, it can use its internal caching subsystem module to make it look like the mount point has infinite capacity from the perspective of a plug-in function process. Neither a function developer nor a system administrator need worry about a disk becoming full—thus providing a distinct advantage in our attempt to lower any barriers for developers and administrators using plug-in functions.

Figure 18:
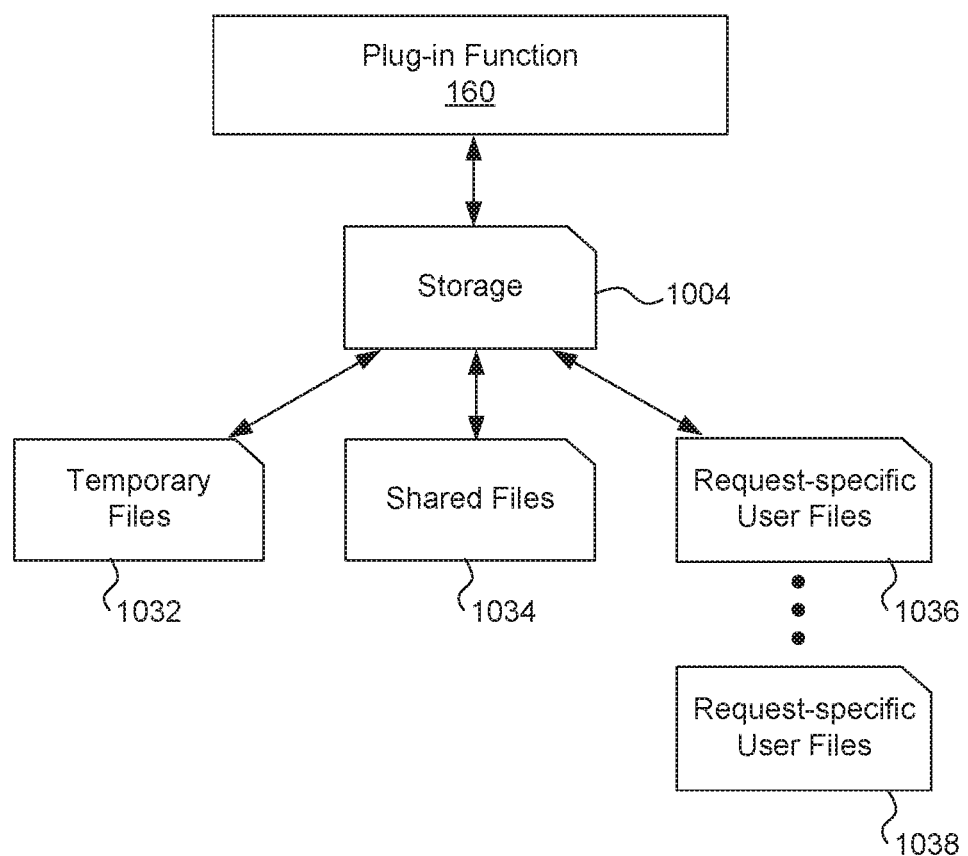
FIG. 18 is a block diagram of a symbolic view of the folders available to a plug-in function.

FIG. 18 is a block diagram of a symbolic view of the folders available to a plug-in function. Server 150 via module 1002 maps these folders to local cache 210, and from the cache to remote storage 220. In addition to providing seemingly infinite storage capacity, server 150 also provides for the access controls to the data and protects user data from being accidentally overwritten by a function. The infinite storage as seen by a function is a single mount point 1020 exposing a set of folders. The mount point 1020 presents to function 160 a local folder 1004, having three sub-folders 1032, 1034 and 1036, one for temporary files 1032, one for function-owned state 1034 (shared files owned by the function in which the function can write data to or read data from independent of the user making the I/O request), and one for user-owned state 1036 (a folder owned by the user making the I/O request and is only accessible by that user and no one else). As there may be many users each invoking a function, numerous user folders 1036-1038 are shown. In particular, a plug-in function sees "/mnt/storage" 1004 and these three sub-folders:

/mnt/storage/tempdir: a scratch area for temporary files
/mnt/storage/function: function shared state
/mnt/storage/private: per user private state An important consequence of this architecture is that while each plug-in function sees the same mount point 1020 and its same three folders for temporary, function-owned and user-owned state, a function developer does not need to worry about who actually is the user nor which function is actually being executed. The function can simply read from or write to the mount point. In a classical file system or file server where such a hierarchy might also exist, files and subfolders could easily be overwritten. In this architecture, the visible state folders are truly unique and depend on the request and the user making that request despite these folders having a constant well-known name. Only function-specific or user-specific state exists in these folders 1034 and 1036. It is not possible for a function that is executing on behalf of user X to list, read, write or overwrite data belonging to a user Y. Nor is possible for a function A to list, read, write or overwrite a state of function B. Further details are provided below. The pathname scheme described below ensures that folder/mnt/storage/private is truly private to the user on which behalf a function is being executed. Thus, a user's private data cannot be overwritten while the function is executing on behalf of another user.

Caching Subsystem User Files and Prefix Pathnames

Each function process is invoked on behalf of the user making the request. For example, a user making a PUT request to a function causes the function to be invoked on behalf of that user. What this means is that the UID and GID properties of that function process are set such that a UID corresponds with the user making the request and a GID with the function being addressed. These UID/GID numbers are ephemeral. A server assigns GID numbers to functions and UID numbers to authenticated user sessions but these numbers only exist in memory within the server and kernel. They are not persisted.

When the server forks a process for a plug-in function it sets the UID and GID properties of that process. Any file system calls made in a function process to the exposed mount point is done so on behalf of the UID/GID pair and for each I/O request that pair is passed through the FUSE layer back to the server. Back in the server we find the corresponding run-time objects related to this UID/GID pair to find the user-uuid and function-uuid. Together with a share-uuid and a tenant-uuid the server has all the information needed to properly access the cache subsystem and corresponding remote storage as described below.

Object storage systems have a number of drawbacks, which why user data files and file- and folder-related metadata is not directly written to object storage by the caching subsystem. While object storage systems appear to have an object hierarchy, in fact they present a flat namespace with possible "/" characters in the name. Further, object storage buckets do not have file system-like operations nor semantics and typically lack "move" or "rename" operations. And, support for file-related metadata operations similar to POSIX-extended attributes is missing. In addition, we want to be able to compress and encrypt data and metadata before it is stored in a remote bucket. We also need to be able to account for all storage at the level of functions, users, shares and tenants, and all this across multiple servers that all use the same backing object store.

The caching subsystem module takes care of these problems. Data lives unencrypted and uncompressed on the locally-attached disk, but when files are stored remotely the server will first encrypt and compresses any files before sending them to the object storage. The reverse operation happens when a file is read from object storage.

Folder information and file and folder metadata is packed into roster files. Roster files have a custom binary format that allows for efficient storage and fast access to metadata. A roster file contains standard POSIX attributes such as entity name, mode, creation timestamps, etc., but it also encodes custom metadata properties that are specific to the server. Roster files do not contain any file data. Each user file is stored separately but its true file name (e.g., "Works Shakespeare") is recorded in a roster file allowing the system to use an alternate name such as a universally unique identifier (UUID) to be used for each user file when storing remotely. A secondary advantage of this solution is that both user data and user metadata can be kept secret when storing information remotely. Thus, roster files are serialized folders containing file and subfolder names and mappings of names to UUIDs. They use a binary serialization format and are encrypted and compressed before storing in object storage. The caching subsystem module also implements the needed file system-like operations such as "move" and "rename" The subsystem API 1010 provides for all file system-like properties including cross-folder operations, management of standard and extended metadata, and namespace operations.

On the local disk 210 and in the remote bucket 220 only UUID-named objects exist. Remote objects are encrypted and compressed while local objects are decrypted and uncompressed, but a unique name of a file (for both user files and roster files) has the same UUID, whether on a local disk or in object storage. All file and folder operations occur in the context of a folder object. Any folder resides in some hierarchy. The hierarchy starts from a designated root formed by prefixing paths.

When storing objects (user files and roster files) in a remote bucket 220 we prefix the object name with four path components that form the root for a folder hierarchy. An example of an object name is a UUID plus an extension like ".folder" (for roster files) or ".file" (for user files). The object name is prefixed with the four path components whether it is stored in the local cache or in the object store. Requests that come into the server are first authenticated and authorized. Once we know who the user is we also have its UUID and because a request is made to a specific share we also know the UUID of that share and the UUID of the tenant that owns the share. The first path component of each request maps to a function which provides a function UUID. So, for each request we can find all four UUIDs to form a prefix. The top-level path component is a tenant UUID. The next path component is a share UUID. Below the share UUID there is a combination of a function UUID or a user UUID. Possible prefixed paths are:

tenant-uuid/share-uuid/user-uuid/user-uuid
tenant-uuid/share-uuid/function-uuid/function-uuid
tenant-uuid/share-uuid/function-uuid/user-uuid The first prefix, with a double "user-uuid," is used for files and folders related to per-user front-side caching. All users have a unique view of their function and its files and folders. This view is stored in the cache with the prefix tenant-uuid/share-uuid/user-uuid/user-uuid.

The two other prefixes are used for back-side caching. The infinite storage as seen by a function is a single mount point exposing a set of three known folders as described above. Objects written to the function folder are prefixed with a tenant-uuid/share-uuid/function-uuid/function-uuid path while objects written to the per-user folder within the function are prefixed with a tenant-uuid/share-uuid/function-uuid/user-uuid path. Using these prefixes a server can also account for the various objects that are stored and calculate aggregates such as storage used by a user, function, share or tenant. A file name with these prefixes thus produces a UUID for that file, whether stored on a local disk or in an object store.

Advantageously, a function cannot overwrite a file written by another function (even if both have the same true file name and even if both are written into the same user folder) because of the unique prefixes that are added to the file name A traditional file system uses access controls (POSIX attributes) to organize read/write access control. Thus, a file name may be visible in a folder but cannot be read or written by someone other than the owner. The problem with this traditional file system is that the name is still "visible" and that this name is "taken," i.e., the name is no longer available to someone else. By contrast, in the embodiment of the present invention, each user has essentially its own private file system or private folder.

Caching Subsystem Flow Diagrams

Figure 19:
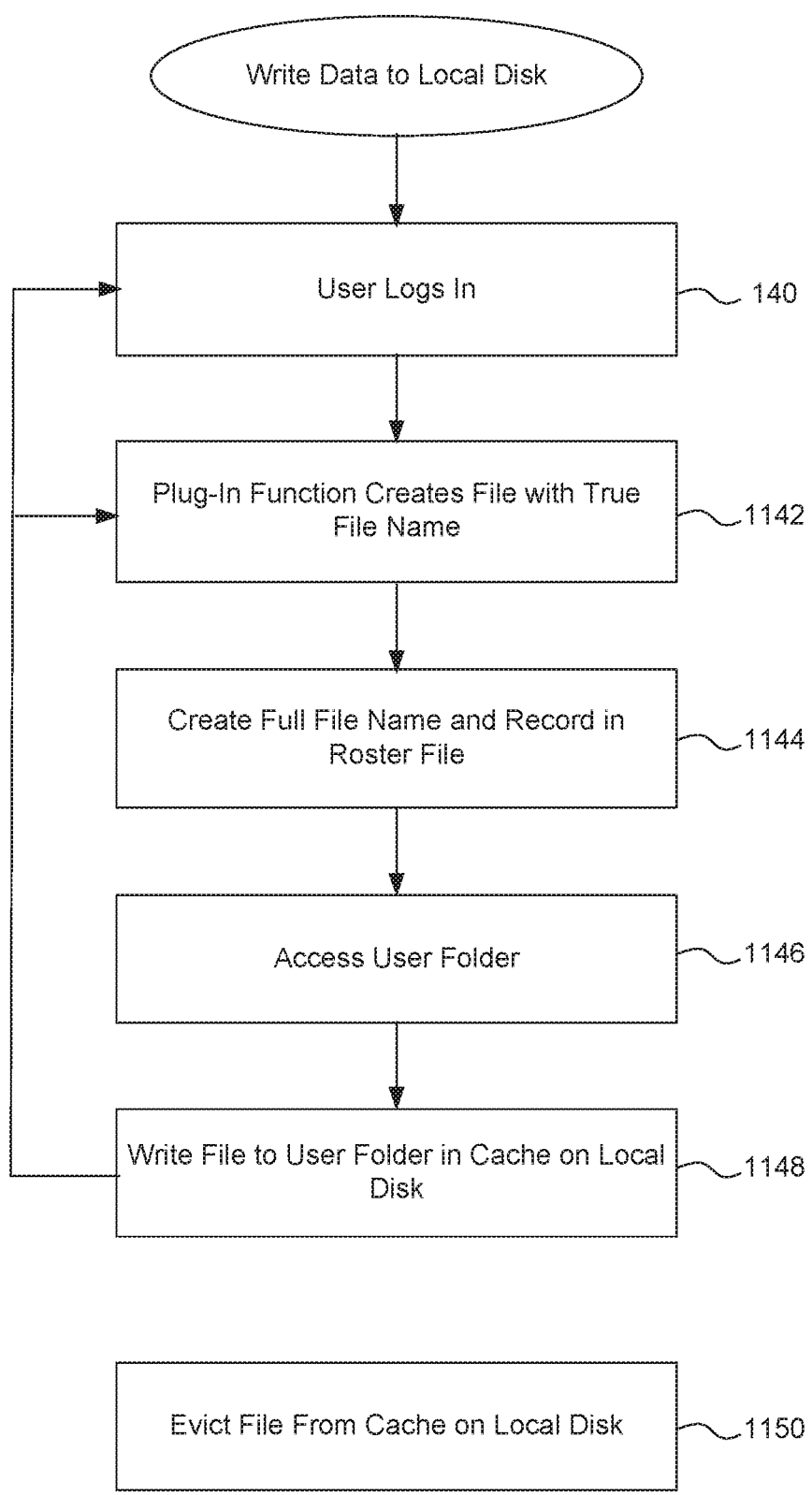
FIG. 19 is a flow diagram describing one embodiment by which a plug-in function writes data to a local disk.

FIG. 19 is a flow diagram describing one embodiment by which a plug-in function writes data to a local disk. This flow describes back-side caching by which a plug-in function writes any data to a folder of the cache on local disk 210, without needing to be concerned about how much disk space is available. In a first step 1140, a user logs in on a computing device such as has been described in steps 702-708 or 802-804 and invokes any of a variety of plug-in functions as has been described above. The plug-in function begins executing, and according to its code, at some point in step 1142 will create a data file, may obtain a data file that has been uploaded by the user, or may obtain a data file in some other fashion, for example, from a data repository or remote service. Examples are also discussed above in steps 806 and 824. This file will have a true file named used by the plug-in function for writing and reading the file (and perhaps also displayed to the user) such as "Works Shakespeare."

In step 1144 the server creates a full file name by concatenating the true file name with four prefix components as is described above. The full file name is thus a universally unique identifier corresponding to the true file name, and both are recorded in association in a roster file as is described above. Of course, a universally unique identifier corresponding to the true file name may also be created in other ways known to those of skill in the art. This step may also be performed after step 1148 after the plug-in function has requested that the file be written to the user folder on the local disk.

In step 1146 the plug-in function desires to save this file into a folder specific for this user and accesses the folder "/mnt/storage/private". Advantageously, the plug-in function (or rather, the developer of the function) need not be aware of who specifically the user is. The plug-in function simply writes the file into the folder "private" using the true file name with the guarantee that no file will be overwritten inadvertently even when the plug-in function is invoked by a different user. The naming convention described above that is implemented by the server guarantees that files will not be overwritten inadvertently.

In step 1148 the plug-in function writes this file to the user-specific folder "private" in the cache on the local disk via the mount point and FUSE file system as has been described above using the true file name of the file. The roster file may be written at this time as well or may be written later in a periodic fashion. At this time, module 1002 may create the complete file name based upon the true file name as described above in step 1144. The file is then written to the cache by the module using its full file name which is a universally unique identifier. As shown in FIG. 18, plug-in function 160 has access to folder 1036 which is the "private" folder available for user-specific data. Advantageously, each time plug-in function 160 writes data into folder 1036 it will not inadvertently overwrite other user data, no matter which user is logged in at the time.

Next, at some point in time, the function may terminate and control returns to step 1140 where another user will log in and the same plug-in function will continue to write data into the cache (into any of folders 1032-1036). Or, control returns to step 1142 and the function continues to write data into the cache for the same user. Advantageously, the plug-in function (i.e., its developer) and the administrator of server 150 need not be concerned with how much disk space is available in the cache no matter how much data is written into the cache. In step 1150 a background process of the caching subsystem module 1002 continuously checks to see if space is available and it evicts files if more space is in needed in the cache. This step is explained in greater detail below in FIG. 20.

Figure 20:
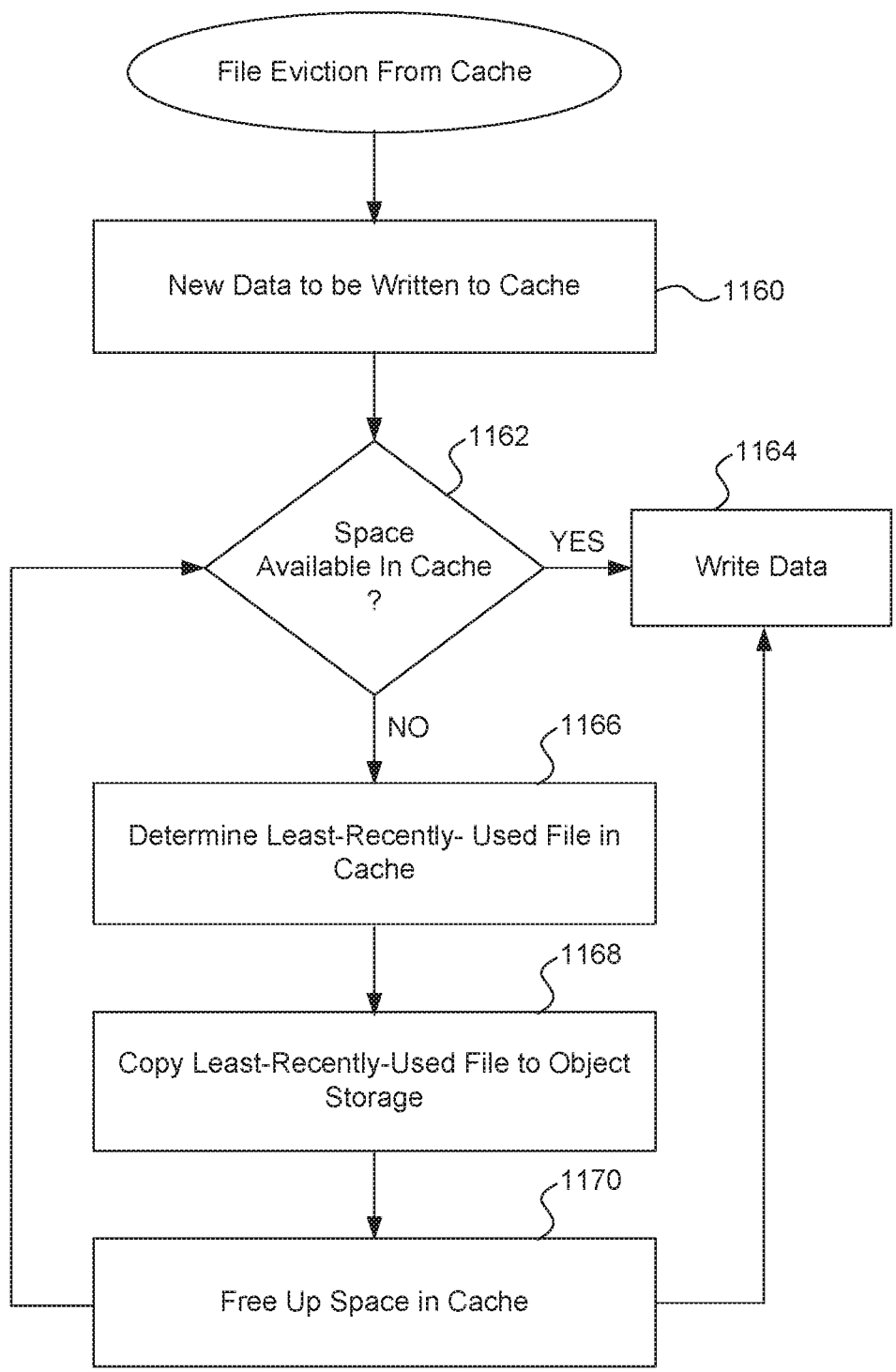
FIG. 20 is a flow diagram describing one embodiment by which data is moved from the cache to a remote object store.

FIG. 20 is a flow diagram describing one embodiment by which data is moved from the cache to a remote object store. This flow occurs during back-side caching each time a plug-in function desires to write data into the cache, may occur periodically, or may also be triggered by some alerting mechanism of module 1002 or a monitoring mechanism of available data on local disk 210. Further, this flow also occurs during front-side caching when server 150 desires to write data into the cache. In other words, there are distinct points when eviction can occur. There is a background task that is proactive and evicts some files to free up a bit of cache space all the time. The other possibility is on-demand eviction which is used in high pressure circumstances when new data must be written but not enough space is available yet.

For example, in step 1160, a plug-in function determines that it desires to write a file to the cache, such as has been described in step 1148. Module 1002 intercepts this write command and in step 1162 determines if there is space available in the cache in step 1162. The size of the file may be compared to the remaining disk space in the cache, or, it may automatically be determined that no space is available when remaining space is less than a predetermined number, e.g., 1 MB. Instead of making the determination based upon physical space available, a determination may be made upon the amount of Mode space available. If space is available (i.e., both physical space and Mode space), then in step 1164 the data is written to the cache as requested by the plug-in function.

On the other hand, on cache pressure, i.e., when cache data space or Mode space is exhausted, least-recently-used files are evicted from the cache in step 1166. The file in the cache that is least recently used is determined by, for example, which file was least recently written or least recently read, using its UUID. One may also select a file randomly for eviction, among other methods for choosing a file to evict.

More than one file may be identified if a certain amount of space is needed for the file to be written, or, if a certain quantity of space must be made available. Once these file or files are identified, and prior to eviction, module 1002 makes sure that a copy of the file or files to be evicted resides in object storage in step 1168. Thus, the file or files are first copied to object storage 220, being first encrypted and compressed. As mentioned above, there is one exception; files stored via front-side caching that have been selected to be evicted and that have expired will not be copied to object storage but will simply be removed. One way to look at this operation is to view it as a swapping operation whereby the local file is swapped out of cache and into remote storage. Once copied, the local file is effectively removed from the disk.

In step 1170 the space that had been used by the file or files to be evicted is freed up in the cache. Next, if space was needed because of a write request from the plug-in function, then in step 1164 the data is written to the cache as discussed above. If files were evicted because of a background proactive process, rather than on-demand evection, then step 1164 is not performed at this time.

When a swapped-out file is needed at some later time by a plug-in function (or by the server) a reverse operation occurs. Advantageously, it is transparent to the plug-in function that the file it may need has been removed from the local disk and is now in the remote object store. Thus, the plug-in function simply requests to read the file it needs from its user-specific folder 1036 (using the same true file name and folder name that it used to write the file to the cache in step 1148). The complete file name corresponding to the true file name is retrieved from the roster file (or may be created as discussed above), the read request passes through mount point 1020, FUSE 1022, 1024 as discussed above, and module 1002 receives the request. When the module realizes that the desired file is not present in the local cache, it searches for and finds the file in the remote object store 220 using its complete file name, and then the file is copied from the remote object store, uncompressed, decrypted, and stored locally on disk 210. The file may or may not be removed from the object store. The file that is now stored locally on disk 210 is then returned to the requesting plug-in function.

Thus, because this file eviction process happens in the background automatically, and also happens as needed on-demand when a function or the server attempts to write a file into the cache, neither a plug-in function nor the server need be concerned with how much disk space is available in the cache. Each may continue to write data into the cache as if storage were infinite.

Additional Embodiments

Many of the method embodiments of the invention may also be implemented as a system and these include the following.

A first embodiment includes a system for reading data on a client computing device, the system including apparatuses arranged to perform the following steps: sending, from a computer server to a client computing device, user interface data that includes an icon representing a folder of information for display, whereby said icon is displayed on said client computing device; receiving at a remote computer a pathname and a command from said computing device indicating a selection of a user on said user interface to open said folder; executing a plug-in function of said remote computer with said pathname and said command; and returning from said plug-in function to said computing device a list of contents of said folder, whereby said contents of said folder are displayed in a hierarchy on said user interface, said contents not yet existing on any storage device.

A second embodiment includes a system for reading data on a client computing device, the system including apparatuses arranged to perform the following steps: sending, from a computer server to a client computing device, user interface data that includes an icon representing a file of information for display, said file not yet existing on any storage device, whereby said icon is displayed on said client computing device; receiving at a remote computer a pathname and a command from said computing device indicating a selection of a user on said user interface to open said file; executing a plug-in function of said remote computer with said pathname and said command in order to create said file; and returning from said plug-in function to said computing device the contents of said file, whereby said contents of said file are displayed on said client computing device using an application of said client computing device.

A third embodiment includes a system for writing data from a client computing device, the system including apparatuses arranged to perform the following steps: sending, from a computer server to a client computing device, user interface data that includes an icon representing a folder of information for display, whereby said icon is displayed on said client computing device; receiving at a remote computer from said client computing device, a pathname, contents of a file, and a command indicating a selection of a user on said user interface to add said file to said folder; executing a plug-in function of said remote computer with said pathname and said command and storing said file in storage, said plug-in function not implementing any user interface for displaying said file on said client computing device; and returning from said plug-in function to said computing device a name of said file for displaying on said client device within said folder of said user interface.

A fourth embodiment includes a system for executing plug-in functions on a computer server, the system including apparatuses arranged to perform the following steps: fetching layers of executable code for first and second plug-in functions from a repository and unpacking said layers into a root file system folder for each of said plug-in functions onto a local disk of said computer server; loading, by a server process executing on a virtual machine of said computer server said executable code of said plug-in functions and executing each of said plug-in functions, each of said plug-in functions having its own root file system and each of said plug-in functions sharing the same namespace; retrieving, by said first plug-in function, first data from a remote enterprise computer using a network of said virtual machine; retrieving, by said second plug-in function, second data from a remote enterprise computer using said network of said virtual machine; and each of said first and second plug-in functions using said respective first and second data to create respective first and second data files which are each sent to a client computing device.

A fifth embodiment includes a system for executing a plug-in function on a computer server, the system including apparatuses arranged to perform the following steps: calling a plug-in function by a server process on a server computer, said plug-in function having its own root file system but not having its own namespace; executing on said computer server said plug-in function and receiving a command from a remote user computing device; reading data from a data source; and creating a file based on said data and sending said file to said remote user computing device for display of said file, said plug-in function not implementing any user interface on said remote user computing device.

A sixth embodiment includes a system for reading data on a client computing device, the system including apparatuses arranged to perform the following steps: sending, from a computer server to a client computing device, user interface data that includes an icon representing a folder of information for display, whereby said icon is displayed on said client computing device; receiving at a remote computer a command from said computing device indicating a selection by a user on said user interface to create a new folder having a folder name input by said user; executing a plug-in function of said remote computer to create said new folder with said folder name and to return said new folder for display on said user interface of said computing device; and executing said plug-in function using said folder name as input in order to produce a result that is dependent upon said folder name.

A seventh embodiment includes a system for writing data from a client computing device, the system including apparatuses arranged to perform the following steps: receiving at a remote computer a command from a client computing device indicating a selection by a user on a user interface to create a new folder having a folder name input by said user; executing a plug-in function of said remote computer to create said new folder with said folder name and to return said new folder for display on said user interface of said computing device; receiving at said remote computer a digital object that was added to said new folder by said user using said user interface of said computing device; and executing said plug-in function and processing said digital object using said folder name to produce a result that is dependent upon said folder name.

An eighth embodiment includes a system for inputting metadata from a client computing device, the system including apparatuses arranged to perform the following steps: executing a plug-in function of a remote computer in daemon mode and displaying on a client computing device a user interface that includes a folder icon representing said plug-in function and a user input icon; receiving at said remote computer a command from said computing device indicating a selection by a user on said user interface of said user input icon; sending, by said plug-in function, a Web page for display on said computing device; receiving, by said plug-in function, a metadata value input by said user on said Web page; and executing said plug-in function using said metadata value as input in order to produce a result that is dependent upon said metadata value.

A ninth embodiment includes a system for inputting metadata from a client computing device, the system including apparatuses arranged to perform the following steps: receiving at a remote computer a command from a client computing device indicating a selection by a user on a user interface to create a new folder having a folder name input by said user; executing a plug-in function of said remote computer to create said new folder with said folder name and to return said new folder for display on said user interface of said computing device; assigning, by said plug-in function, a metadata value to said folder name input by said user; and executing said plug-in function using said metadata value as input in order to produce a result that is dependent upon said metadata value.

A tenth embodiment includes a system for communicating with a database from a client computing device, the system including apparatuses arranged to perform the following steps: executing a first plug-in function of a remote computer in daemon mode and opening a connection with a database by said first plug-in function; receiving a request at said remote computer from said client computing device to access said database via a second plug-in function of said remote computer; executing said second plug-in function of said remote computer and sending said request to said executing first plug-in function; accessing said database by said first plug-in function with said request and receiving a response from said database; sending said response from said first plug-in function to said second plug-in function; and delivering said response from said second plug-in function to said client computing device.

An eleventh embodiment includes a system for displaying data on a client computing device, the system including apparatuses arranged to perform the following steps: sending, from a computer server to a client computing device, user interface data that includes an icon representing a folder of information for display, whereby said icon is displayed on said client computing device; receiving at said computer server a pathname and a user interface command from said client computing device indicating an action with respect to said icon of said user interface; executing a plug-in function of said computer server using said pathname and said user interface command to implement said user interface command; executing said plug-in function in order to implement an additional step not included within said user interface command; and returning a result to said client computing device for display.

A twelfth embodiment includes a system for writing from a plug-in function to a file system, the system including apparatuses arranged to perform the following steps: executing a plug-in function of said virtual machine at the request of a first user of a remote computing device; receiving a file at said plug-in function having a file name; creating a unique file name for said file name based upon an identifier of said plug-in function and an identifier of said first user; and writing said file to a user folder of a file system on a local disk of said computer by said plug-in function using said unique file name to identify said file on said local disk.

A thirteenth embodiment includes a system for managing space of a local disk of a computer, the system including apparatuses arranged to perform the following steps: determining, by a server process of said virtual machine, whether to make more storage space available on said local disk; when it is determined to make more storage space available, selecting a stored file to be removed from said local disk; copying said stored file from said local disk to remote storage; and freeing up space on said local disk that had been used by said stored file.

Computer System Embodiment

Figure 21A:
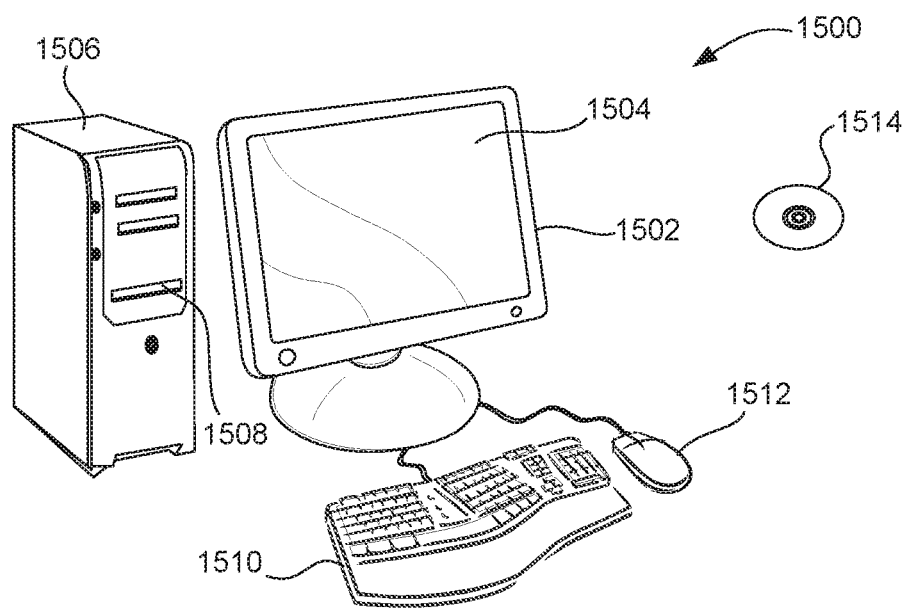
FIGS. 21A and 21B illustrate a computer system suitable for implementing embodiments of the present invention.
Figure 21B:
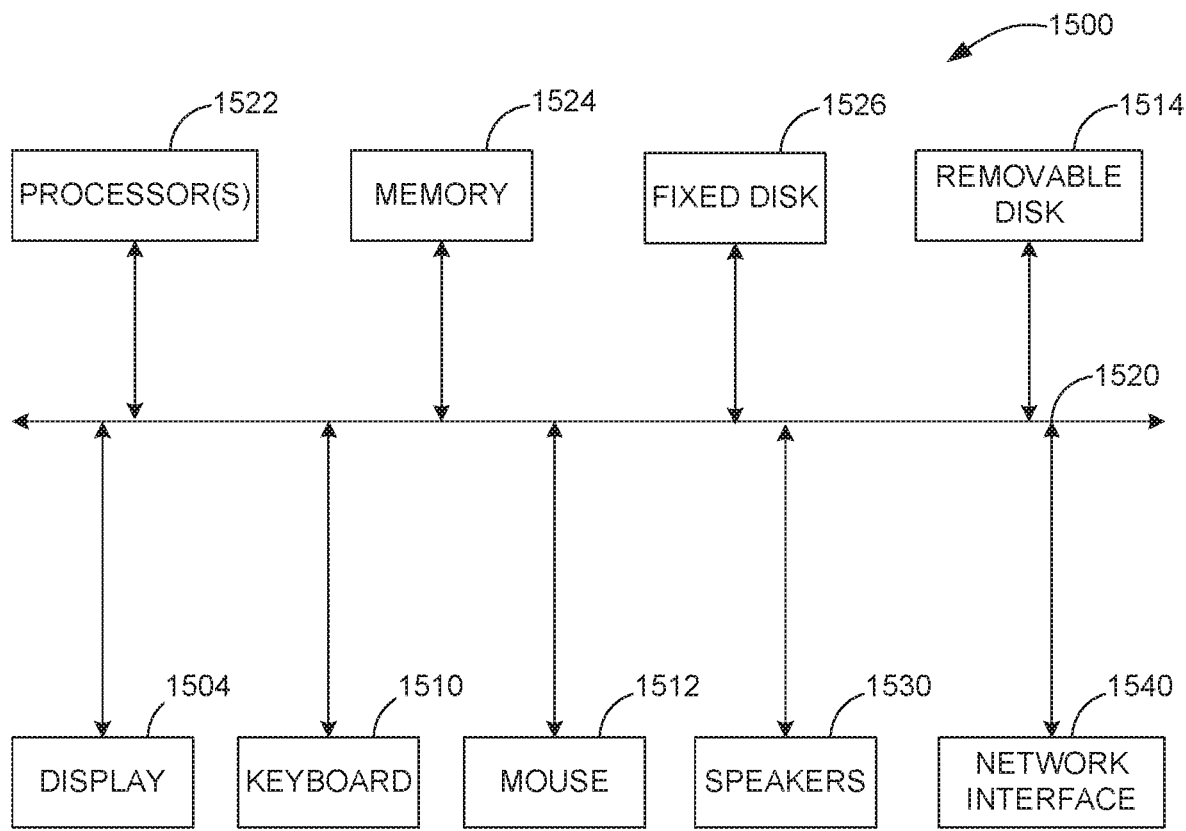

FIGS. 21A and 21B illustrate a computer system 1500 and suitable for implementing embodiments of the present invention. FIG. 21A shows one possible physical form of the computer system. Of course, the computer system may have many physical forms including an integrated circuit, a printed circuit board, a small handheld device (such as a mobile telephone, tablet or PDA), a personal computer or a supercomputer. Computer system 1500 includes a monitor 1502, a display 1504, a housing 1506, a disk drive 1508, a keyboard 1510 and a mouse 1512. Disk 1514 is a computer-readable medium used to transfer data to and from computer system 1500.

FIG. 21B is an example of a block diagram for computer system 1500.

Attached to system bus 1520 are a wide variety of subsystems. Processor(s) 1522 (also referred to as central processing units, or CPUs) are coupled to storage devices including memory 1524. Memory 1524 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 1526 is also coupled bi-directionally to CPU 1522; it provides additional data storage capacity and may also include any of the computer-readable media described below. Fixed disk 1526 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 1526, may, in appropriate cases, be incorporated in standard fashion as virtual memory in memory 1524. Removable disk 1514 may take the form of any of the computer-readable media described below.

CPU 1522 is also coupled to a variety of input/output devices such as display 1504, keyboard 1510, mouse 1512 and speakers 1530. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1522 optionally may be coupled to another computer or telecommunications network using network interface 1540. With such a network interface, it is contemplated that the CPU might receive information from the network, or might output information to the network in the course of performing the above-described method steps. Furthermore, method embodiments of the present invention may execute solely upon CPU 1522 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should defined by the following claims and their full scope of equivalents.

We claim:

1. A method of reading data on a client computing device, said method comprising:
sending, from a computer server to a client computing device, a name of an icon representing a folder of information;
displaying on said client computing device said name and said icon in a hierarchical user interface implemented by an application of said client computing device;
receiving at said computer server a command from said client computing device indicating a selection by a user on said hierarchical user interface to create a new folder within said icon, said new folder having a folder name input by said user;
executing a plug-in function of said computer server upon receipt of said command to create said new folder with said folder name and to return said new folder for display on said user interface of said client computing device, said new folder not having any contents;
executing said plug-in function using said folder name as input in order to produce a digital object that is dependent upon said folder name only after receiving a command indicating that said user has selected said new folder to be opened; and
returning said digital object from said plug-in function to said client computing device and displaying said digital object on said client computing device using said hierarchical user interface in a hierarchy of said new folder and said digital object, wherein said hierarchy does not exist in computer memory or computer storage until said plug-in function executes.

2. A method as recited in claim 1 further comprising:
using said folder name as a search term by said plug-in function and finding at least one digital object based upon said search term; and
sending an identifier of said at least one digital object to said computing device for display within said new folder.

3. A method as recited in claim 1 further comprising:
creating at least one digital object based upon said search term; and
sending an identifier of said at least one digital object to said computing device for display within said new folder.

4. A system of reading data on a client computing device, said system including apparatuses arranged to perform the following steps:
sending, from a computer server to a client computing device, a name of an icon representing a folder of information;
displaying on said client computing device said name and said icon in a hierarchical user interface implemented by an application of said client computing device;
receiving at said computer server a command from said client computing device indicating a selection by a user on said hierarchical user interface to create a new folder within said icon, said new folder having a folder name input by said user;
executing a plug-in function of said computer server upon receipt of said command to create said new folder with said folder name and to return said new folder for display on said user interface of said client computing device, said new folder not having any contents;
executing said plug-in function using said folder name as input in order to produce a digital object that is dependent upon said folder name only after receiving a command indicating that said user has selected said new folder to be opened; and
returning said digital object from said plug-in function to said client computing device and displaying said digital object on said client computing device using said hierarchical user interface in a hierarchy of said new folder and said digital object, wherein said hierarchy does not exist in computer memory or computer storage until said plug-in function executes.

* * * * *